US012610418B2

(12) United States Patent
Ishii

(10) Patent No.: US 12,610,418 B2
(45) Date of Patent: Apr. 21, 2026

(54) UPDATING RADIO RESOURCE CONTROL CONNECTIONS IN IAB NETWORK

(71) Applicant: SHARP KABUSHIKI KAISHA, Sakai City (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 562 days.

(21) Appl. No.: 17/797,376

(22) PCT Filed: Feb. 3, 2021

(86) PCT No.: PCT/JP2021/003895
§ 371 (c)(1),
(2) Date: Aug. 3, 2022

(87) PCT Pub. No.: WO2021/161866
PCT Pub. Date: Aug. 19, 2021

(65) Prior Publication Data
US 2023/0098848 A1 Mar. 30, 2023

Related U.S. Application Data

(60) Provisional application No. 62/975,687, filed on Feb. 12, 2020.

(51) Int. Cl.
*H04W 76/19* (2018.01)
*H04W 36/00* (2009.01)

(52) U.S. Cl.
CPC ....... *H04W 76/19* (2018.02); *H04W 36/0033* (2013.01); *H04W 36/0064* (2023.05)

(58) Field of Classification Search
CPC .............................. H04W 76/19; H04W 92/12
See application file for complete search history.

(56) References Cited

U.S. PATENT DOCUMENTS

2021/0160735 A1* 5/2021 Fujishiro ........... H04W 74/0833
2022/0191960 A1* 6/2022 Wu ........................ H04W 76/19

OTHER PUBLICATIONS

"3rd Generation Partnership Project; Technical Specification Group Radio Access Network; NG-RAN; Xn application protocol (XnAP)(Release 16)", 3GPP TS 38.423 V16.0.0 (Dec. 2019).
(Continued)

*Primary Examiner* — Pamit Kaur
(74) *Attorney, Agent, or Firm* — ScienBiziP, P.C.

(57) ABSTRACT

An IAB node communicates over at least two radio interfaces including a first interface and a second interface, the first interface being configured to establish a radio resource control (RRC) connection with a donor node, the second interface being configured to serve one or more cells to communicate with one or more child nodes. In an example embodiment and mode the IAB node comprises processor circuitry and transmitter circuitry. The processor circuitry is configured to establish an RRC connection with a first donor node, and perform an update of the RRC connection to be used for a second donor node. The transmitter circuitry is configured to transmit, using the second interface, a re-establishment indication, upon performing the update of the RRC connection. The re-establishment indication is used to request that each of the one or more child nodes initiate an RRC re-establishment procedure. During the RRC re-establishment procedure, the one or more cells are considered as candidate cells.

7 Claims, 59 Drawing Sheets

(56) References Cited

OTHER PUBLICATIONS

"3rd Generation Partnership Project; Technical Specification Group Radio Access Network; NR; Radio Resource Control (RRC) protocol specification(Release 15)", 3GPP TS 38.331 V15.8.0 (Dec. 2019).

"3rd Generation Partnership Project; Technical Specification Group Radio Access Network; NG-RAN; F1 application protocol (F1AP)(Release 16)", 3GPP TS 38.473 V16.0.0 (Dec. 2019).

"3rd Generation Partnership Project; Technical Specification Group Radio Access Network; NR; Radio Link Control (RLC) protocol specification(Release 15)", 3GPP TS 38.322 V15.5.0 (Mar. 2019).

"3rd Generation Partnership Project; Technical Specification Group Radio Access Network; NR; Packet Data Convergence Protocol (PDCP) specification(Release 15)", 3GPP TS 38.323 V15.6.0 (Jun. 2019).

"3rd Generation Partnership Project; Technical Specification Group Radio Access Network; E-UTRA and NR; Service Data Adaptation Protocol (SDAP) specification(Release 15)", 3GPP TS 37.324 V15.1.0 (Sep. 2018).

"3rd Generation Partnership Project; Technical Specification Group Radio Access Network; NR; NR and NG-RAN Overall Description; Stage 2(Release 16)", 3GPP TS 38.300 V16.0.0 (Dec. 2019).

LG Electronics, "Resolving open issues on BH RLF", R2-1916169, 3GPP TSG-RAN WG2 Meeting #108, Reno, USA, Nov. 17-23, 2019.

LG Electronics, "BH RLF Notification Terminaton Layer", R2-1916168, 3GPP TSG-RAN WG2 Meeting #108, Reno, USA, Nov. 17-23, 2019.

Futurewei, "Cell Selection for Backhaul RLF Recovery", R2-1916061, 3GPP TSG-RAN WG2 meeting #108, Reno, Nevada, USA Nov. 18-22, 2019.

Samsung, "Remaining issues on IAB RLF", R2-1916057, 3GPP TSG RAN WG2 Meeting #108, Reno, USA, Nov. 18-22, 2019.

Ericsson, "Further details on Backhaul link RLF Notification Types to Downstream Node(s)", R2-1915783, 3GPP TSG-RAN WG2 #108, Reno, USA, Nov. 18-22, 2019.

Sharp, "Issue of loop topology after RLF", R2-1915766, 3GPP TSG RAN WG2 Meeting #108, Reno, NV, U.S.A., Nov. 18-22, 2019.

Nokia et al., "BH link failure handling", R2-1915700, 3GPP TSG-RAN WG2 Meeting #108, Reno, USA, Nov. 18-22, 2019.

Kyocera, "Possible issues on Backhaul RLF handling", R2-1915598, 3GPP TSG-RAN WG2 #108, Reno, USA, Nov. 18-22, 2019.

Ericsson, "Further details on Backhaul link RLF Notification Types to Downstream Node(s)", R2-1915477, 3GPP TSG-RAN WG2 #108, Reno, USA, Nov. 18-22, 2019.

Huawei et al., "Backhaul RLF Recovery", R2-1915461, 3GPP TSG-RAN WG2 meeting #108, Reno, US, Nov. 18-22, 2019.

Lenovo et al., "RLF notification to downstream IAB node", R2-1915129, 3GPP TSG-RAN WG2 Meeting #108, Reno, Nevada, USA, Nov. 18-22, 2019.

Lenovo et al., "Cell selection for IAB RLF recovery", R2-1915128, 3GPP TSG-RAN WG2 Meeting #108, Reno, Nevada, USA, Nov. 18-22, 2019.

Zte et al., "Discussion on IAB BH RLF handling", R2-1915119, 3GPP TSG RAN WG2 Meeting #108, Reno, USA, Nov. 18-22, 2019.

Zte et al., "Discussion on BAP control PDU", R2-1915115, 3GPP TSG RAN WG2 Meeting #108, Reno, USA, Nov. 18-22, 2019.

Nec, "IAB backhaul RLF handling", R2-1914975, 3GPP TSG-RAN WG2 #108, Reno, USA, Nov. 18-22, 2019.

Vivo, "Discussion on IAB BH RLF report mechanism", R2-1914920, 3GPP TSG-RAN WG2 Meeting #108, Reno, USA, Nov. 18-22, 2019.

Kimba Dit Adamou et al., "LS on BH RLF notification verification", R2-1914919, 3GPP TSG-RAN WG2 Meeting #108, Reno, USA, Nov. 18-22, 2019.

Vivo, "Remaining issues on BH RLF notification ", R2-1914918, 3GPP TSG-RAN WG2 Meeting #108, Reno, USA, Nov. 18-22, 2019.

Intel Corporation, "Further discussion on Backhaul RLF handling", R2-1914737, 3GPP TSG RAN WG2 Meeting #108, Reno, U.S.A., Nov. 18-22, 2019.

Catt, "On Remaining Open Issues of IAB BH RLF", R2-1914383, 3GPP TSG-RAN WG2 Meeting#108, Reno, USA, Nov. 18-22, 2019.

* cited by examiner

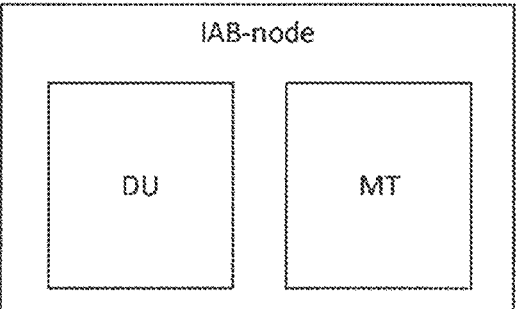
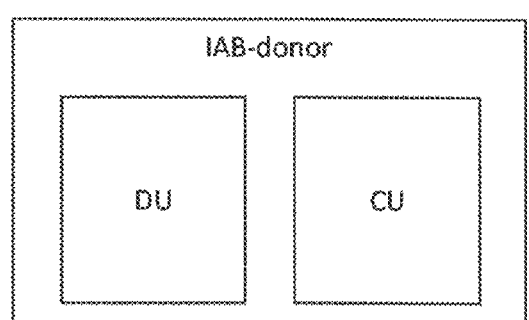
*Fig. 2*

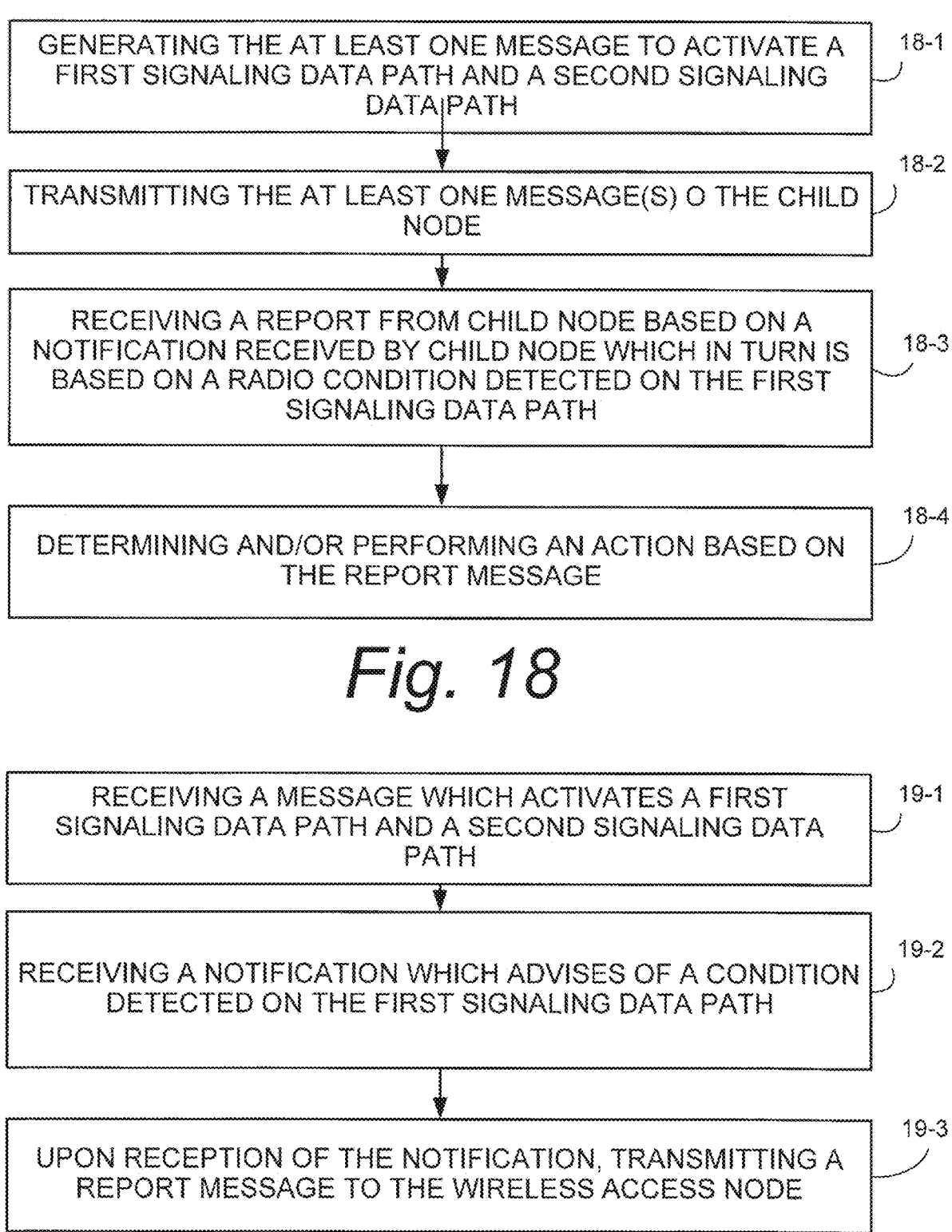

GENERATING THE AT LEAST ONE MESSAGE TO ACTIVATE A FIRST SIGNALING DATA PATH AND A SECOND SIGNALING DATA PATH — 18-1

TRANSMITTING THE AT LEAST ONE MESSAGE(S) O THE CHILD NODE — 18-2

RECEIVING A REPORT FROM CHILD NODE BASED ON A NOTIFICATION RECEIVED BY CHILD NODE WHICH IN TURN IS BASED ON A RADIO CONDITION DETECTED ON THE FIRST SIGNALING DATA PATH — 18-3

DETERMINING AND/OR PERFORMING AN ACTION BASED ON THE REPORT MESSAGE — 18-4

*Fig. 18*

RECEIVING A MESSAGE WHICH ACTIVATES A FIRST SIGNALING DATA PATH AND A SECOND SIGNALING DATA PATH — 19-1

RECEIVING A NOTIFICATION WHICH ADVISES OF A CONDITION DETECTED ON THE FIRST SIGNALING DATA PATH — 19-2

UPON RECEPTION OF THE NOTIFICATION, TRANSMITTING A REPORT MESSAGE TO THE WIRELESS ACCESS NODE — 19-3

*Fig. 19*

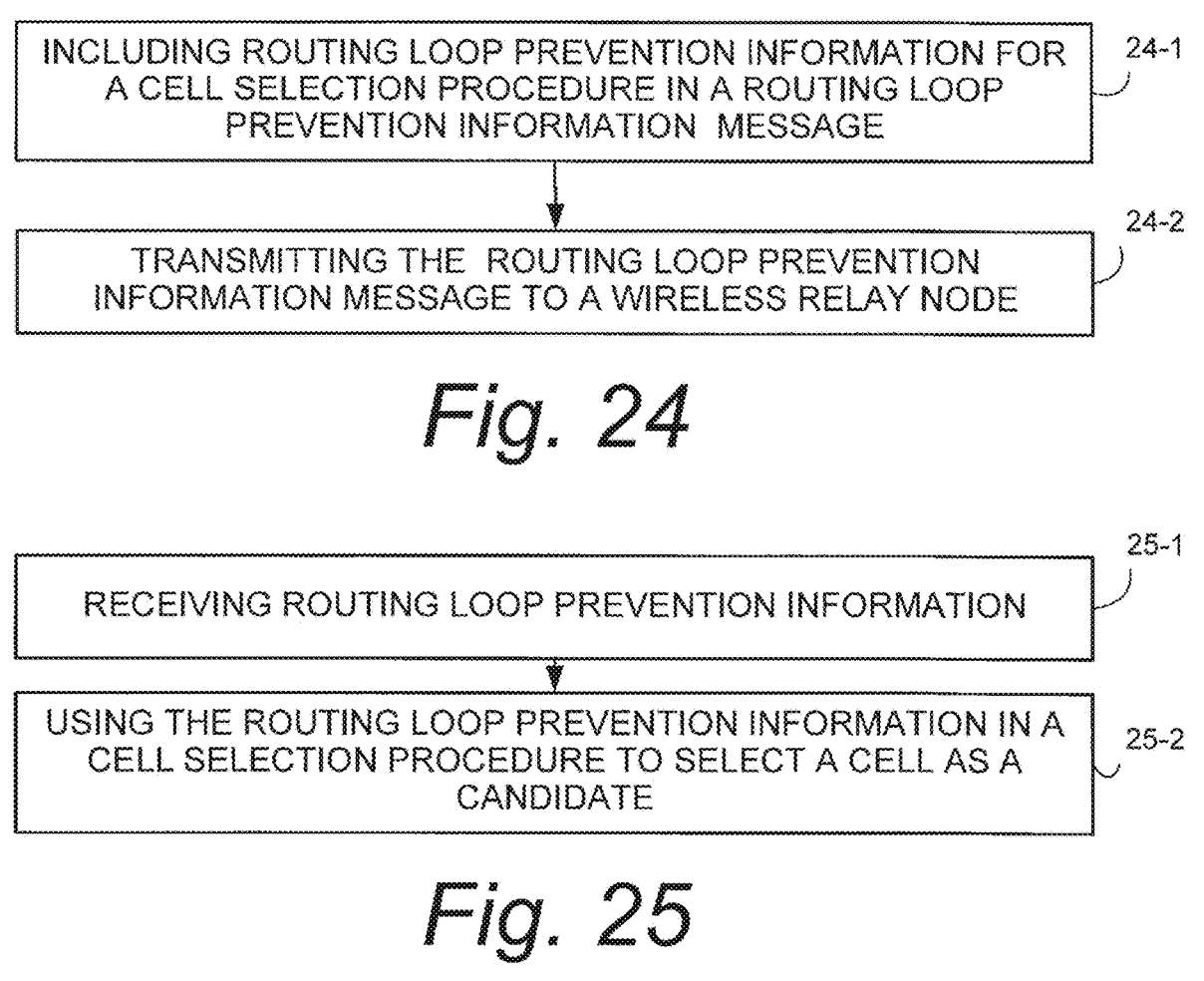

INCLUDING ROUTING LOOP PREVENTION INFORMATION FOR A CELL SELECTION PROCEDURE IN A ROUTING LOOP PREVENTION INFORMATION MESSAGE — 24-1

TRANSMITTING THE ROUTING LOOP PREVENTION INFORMATION MESSAGE TO A WIRELESS RELAY NODE — 24-2

*Fig. 24*

RECEIVING ROUTING LOOP PREVENTION INFORMATION — 25-1

USING THE ROUTING LOOP PREVENTION INFORMATION IN A CELL SELECTION PROCEDURE TO SELECT A CELL AS A CANDIDATE — 25-2

*Fig. 25*

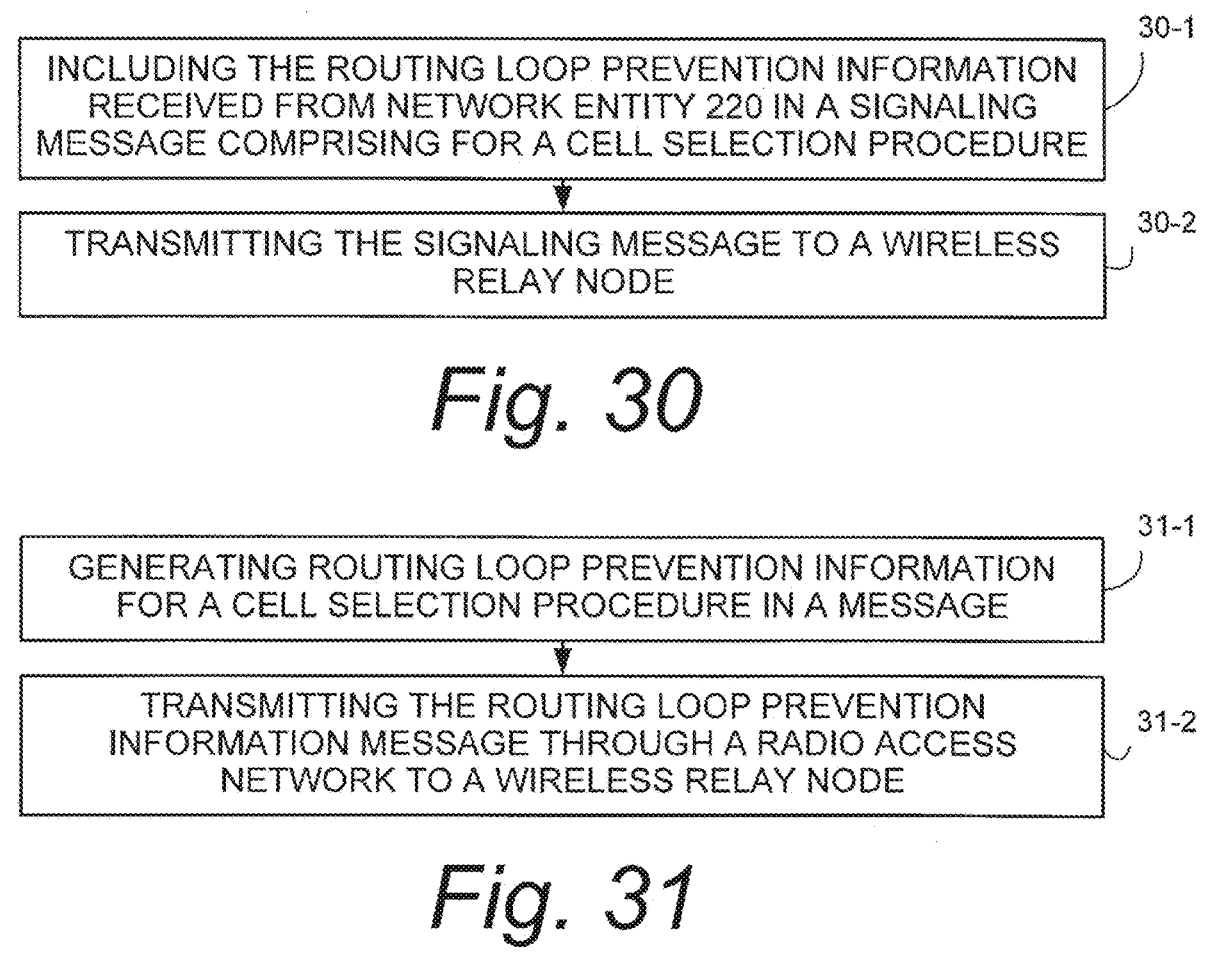

INCLUDING THE ROUTING LOOP PREVENTION INFORMATION RECEIVED FROM NETWORK ENTITY 220 IN A SIGNALING MESSAGE COMPRISING FOR A CELL SELECTION PROCEDURE — 30-1

TRANSMITTING THE SIGNALING MESSAGE TO A WIRELESS RELAY NODE — 30-2

*Fig. 30*

GENERATING ROUTING LOOP PREVENTION INFORMATION FOR A CELL SELECTION PROCEDURE IN A MESSAGE — 31-1

TRANSMITTING THE ROUTING LOOP PREVENTION INFORMATION MESSAGE THROUGH A RADIO ACCESS NETWORK TO A WIRELESS RELAY NODE — 31-2

*Fig. 31*

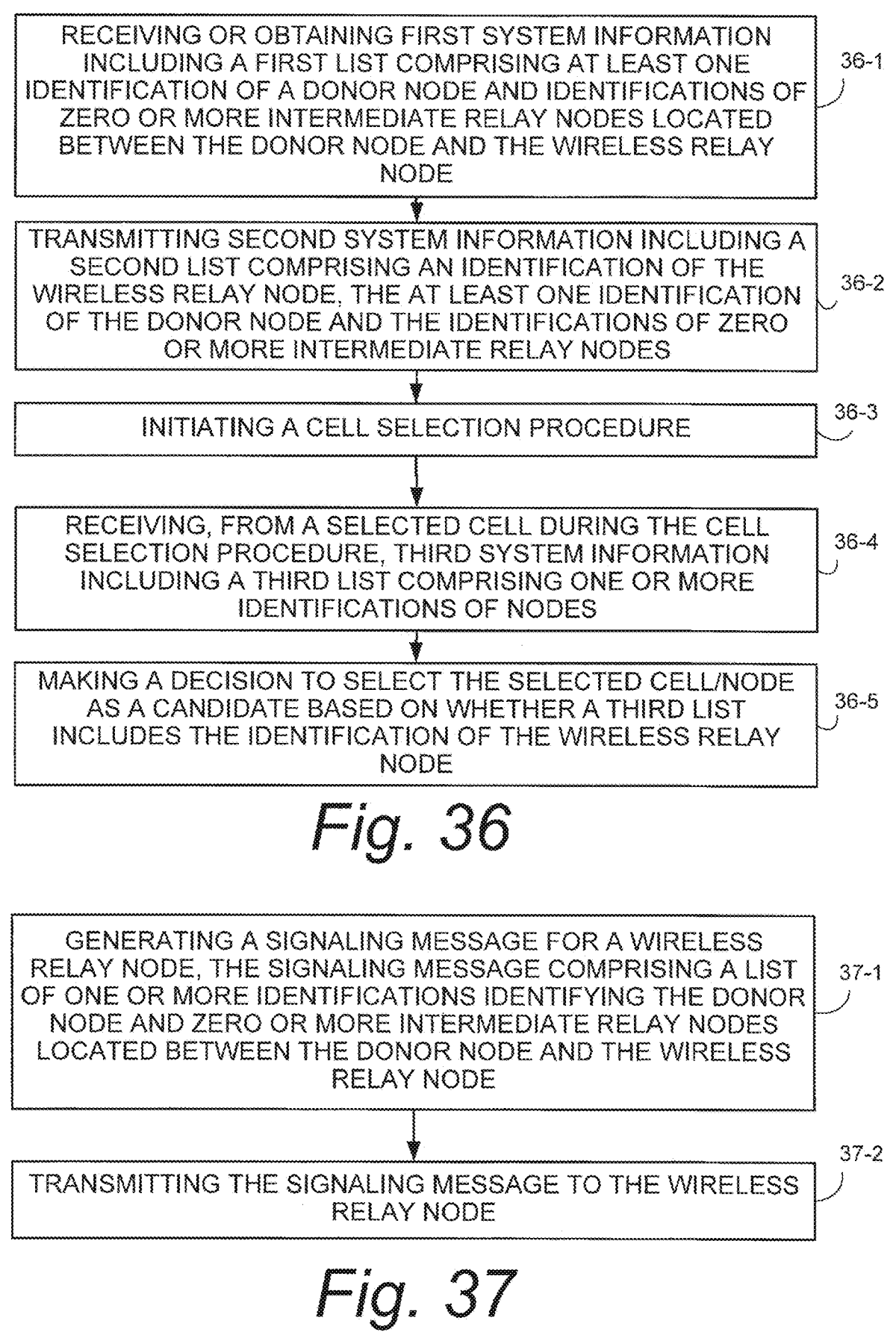

RECEIVING OR OBTAINING FIRST SYSTEM INFORMATION INCLUDING A FIRST LIST COMPRISING AT LEAST ONE IDENTIFICATION OF A DONOR NODE AND IDENTIFICATIONS OF ZERO OR MORE INTERMEDIATE RELAY NODES LOCATED BETWEEN THE DONOR NODE AND THE WIRELESS RELAY NODE — 36-1

TRANSMITTING SECOND SYSTEM INFORMATION INCLUDING A SECOND LIST COMPRISING AN IDENTIFICATION OF THE WIRELESS RELAY NODE, THE AT LEAST ONE IDENTIFICATION OF THE DONOR NODE AND THE IDENTIFICATIONS OF ZERO OR MORE INTERMEDIATE RELAY NODES — 36-2

INITIATING A CELL SELECTION PROCEDURE — 36-3

RECEIVING, FROM A SELECTED CELL DURING THE CELL SELECTION PROCEDURE, THIRD SYSTEM INFORMATION INCLUDING A THIRD LIST COMPRISING ONE OR MORE IDENTIFICATIONS OF NODES — 36-4

MAKING A DECISION TO SELECT THE SELECTED CELL/NODE AS A CANDIDATE BASED ON WHETHER A THIRD LIST INCLUDES THE IDENTIFICATION OF THE WIRELESS RELAY NODE — 36-5

*Fig. 36*

GENERATING A SIGNALING MESSAGE FOR A WIRELESS RELAY NODE, THE SIGNALING MESSAGE COMPRISING A LIST OF ONE OR MORE IDENTIFICATIONS IDENTIFYING THE DONOR NODE AND ZERO OR MORE INTERMEDIATE RELAY NODES LOCATED BETWEEN THE DONOR NODE AND THE WIRELESS RELAY NODE — 37-1

TRANSMITTING THE SIGNALING MESSAGE TO THE WIRELESS RELAY NODE — 37-2

*Fig. 37*

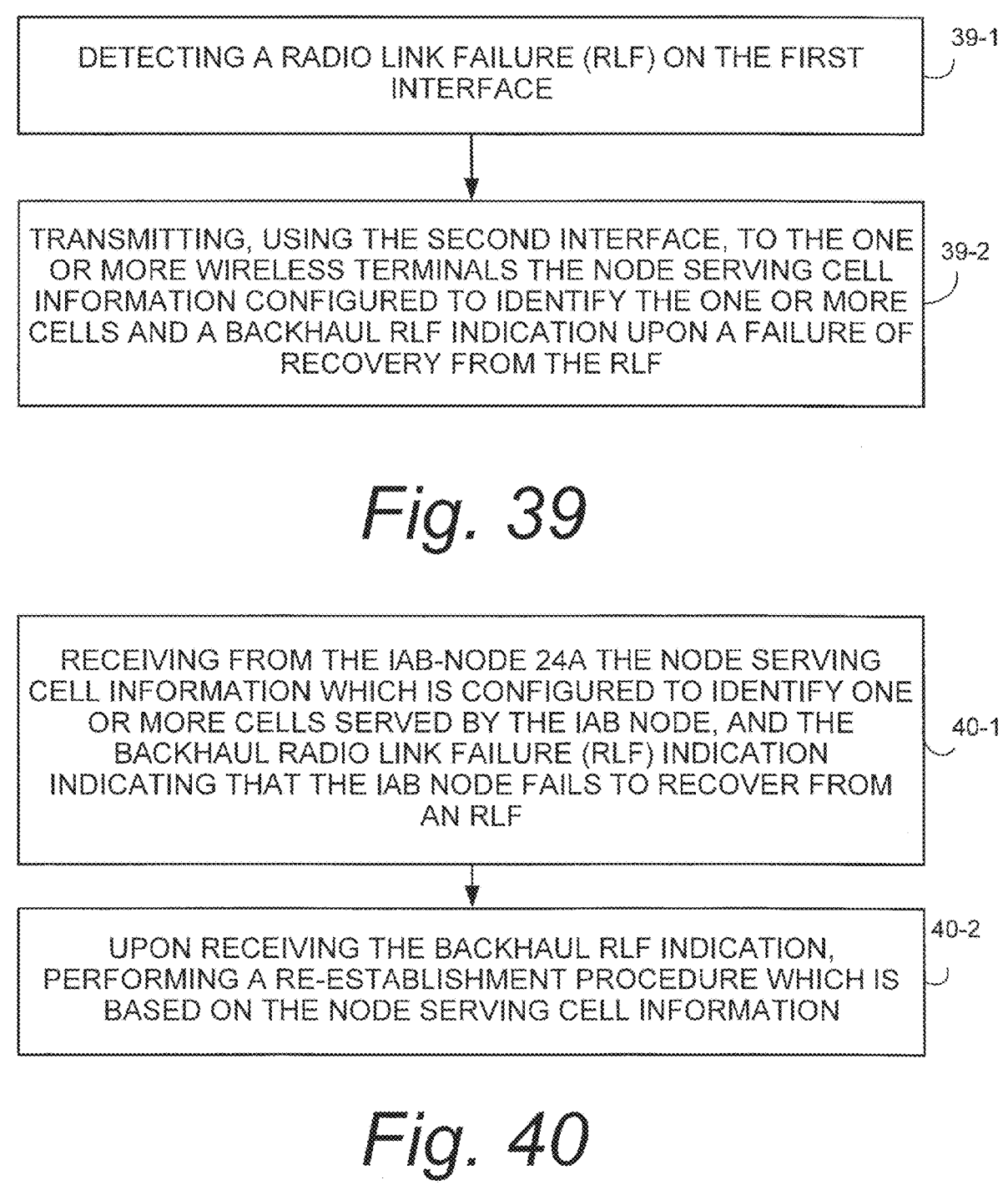

DETECTING A RADIO LINK FAILURE (RLF) ON THE FIRST INTERFACE — 39-1

TRANSMITTING, USING THE SECOND INTERFACE, TO THE ONE OR MORE WIRELESS TERMINALS THE NODE SERVING CELL INFORMATION CONFIGURED TO IDENTIFY THE ONE OR MORE CELLS AND A BACKHAUL RLF INDICATION UPON A FAILURE OF RECOVERY FROM THE RLF — 39-2

*Fig. 39*

RECEIVING FROM THE IAB-NODE 24A THE NODE SERVING CELL INFORMATION WHICH IS CONFIGURED TO IDENTIFY ONE OR MORE CELLS SERVED BY THE IAB NODE, AND THE BACKHAUL RADIO LINK FAILURE (RLF) INDICATION INDICATING THAT THE IAB NODE FAILS TO RECOVER FROM AN RLF — 40-1

UPON RECEIVING THE BACKHAUL RLF INDICATION, PERFORMING A RE-ESTABLISHMENT PROCEDURE WHICH IS BASED ON THE NODE SERVING CELL INFORMATION — 40-2

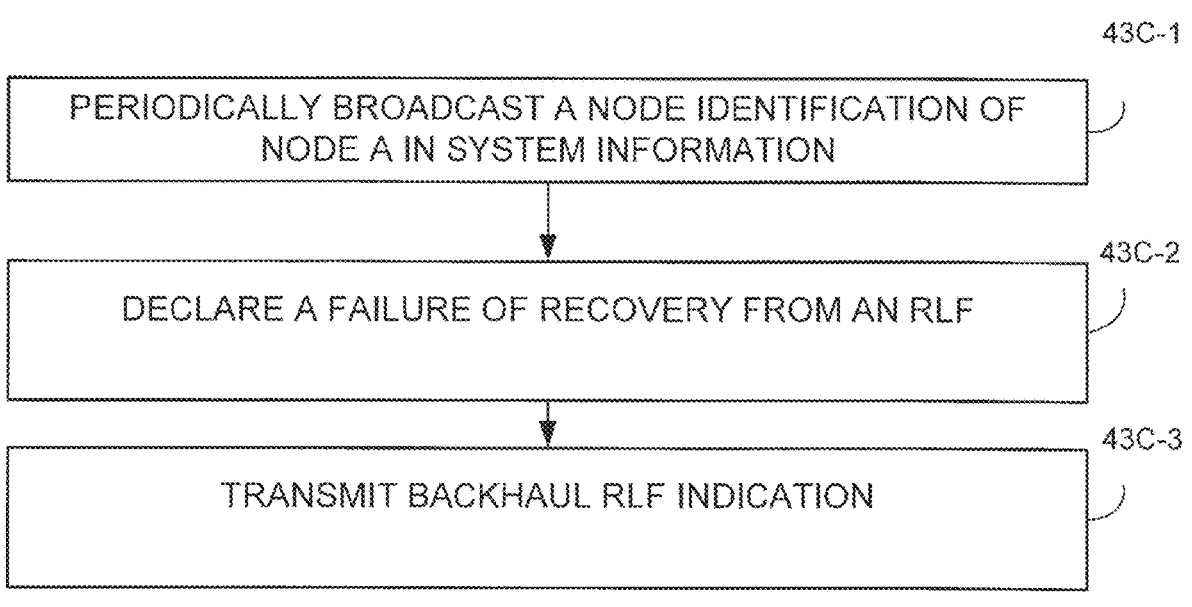

PERIODICALLY BROADCAST A NODE IDENTIFICATION OF NODE A IN SYSTEM INFORMATION 43C-2

DECLARE A FAILURE OF RECOVERY FROM AN RLF 43C-3

TRANSMIT BACKHAUL RLF INDICATION

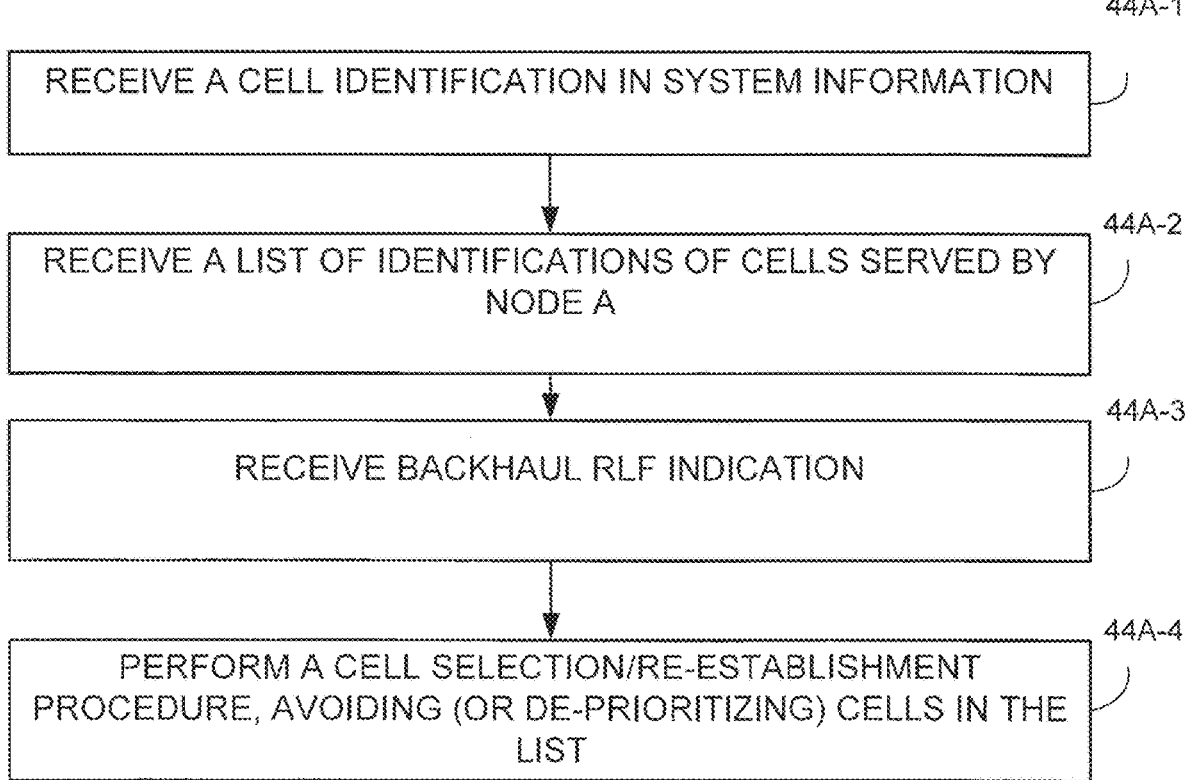

RECEIVE A CELL IDENTIFICATION IN SYSTEM INFORMATION 44A-2

RECEIVE A LIST OF IDENTIFICATIONS OF CELLS SERVED BY NODE A 44A-3

RECEIVE BACKHAUL RLF INDICATION 44A-4

PERFORM A CELL SELECTION/RE-ESTABLISHMENT PROCEDURE, AVOIDING (OR DE-PRIORITIZING) CELLS IN THE LIST

*Fig. 44A*

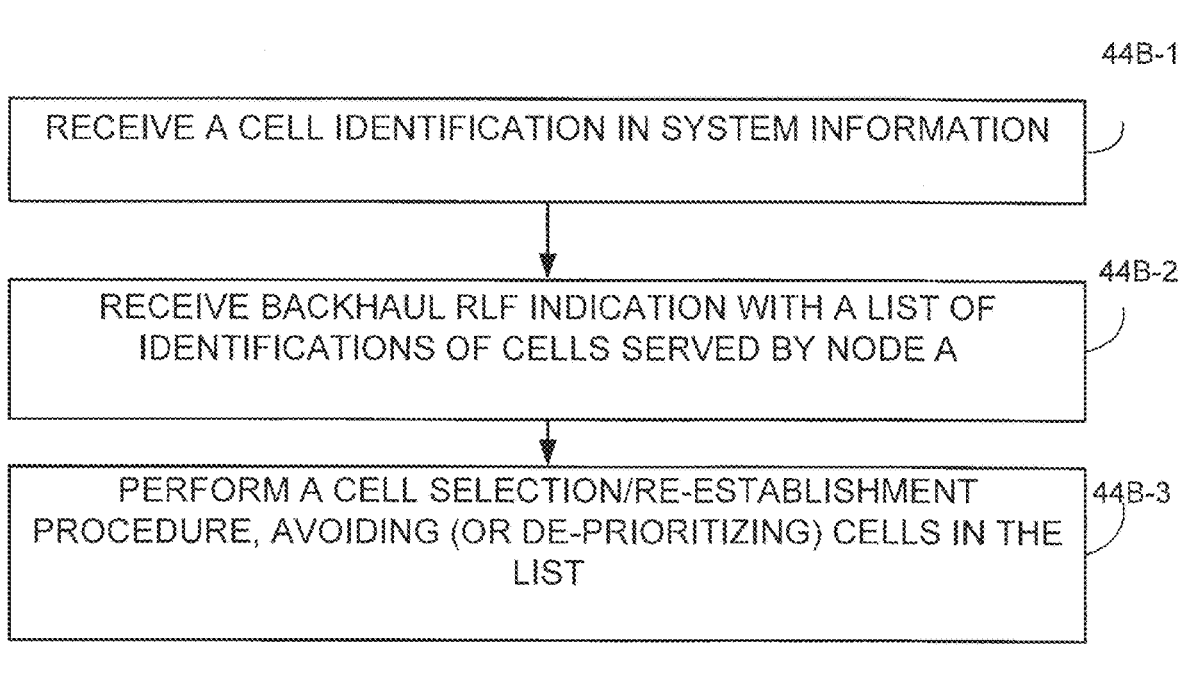

44B-1

RECEIVE A CELL IDENTIFICATION IN SYSTEM INFORMATION 44B-2

RECEIVE BACKHAUL RLF INDICATION WITH A LIST OF IDENTIFICATIONS OF CELLS SERVED BY NODE A 44B-3

PERFORM A CELL SELECTION/RE-ESTABLISHMENT PROCEDURE, AVOIDING (OR DE-PRIORITIZING) CELLS IN THE LIST

*Fig. 44B*

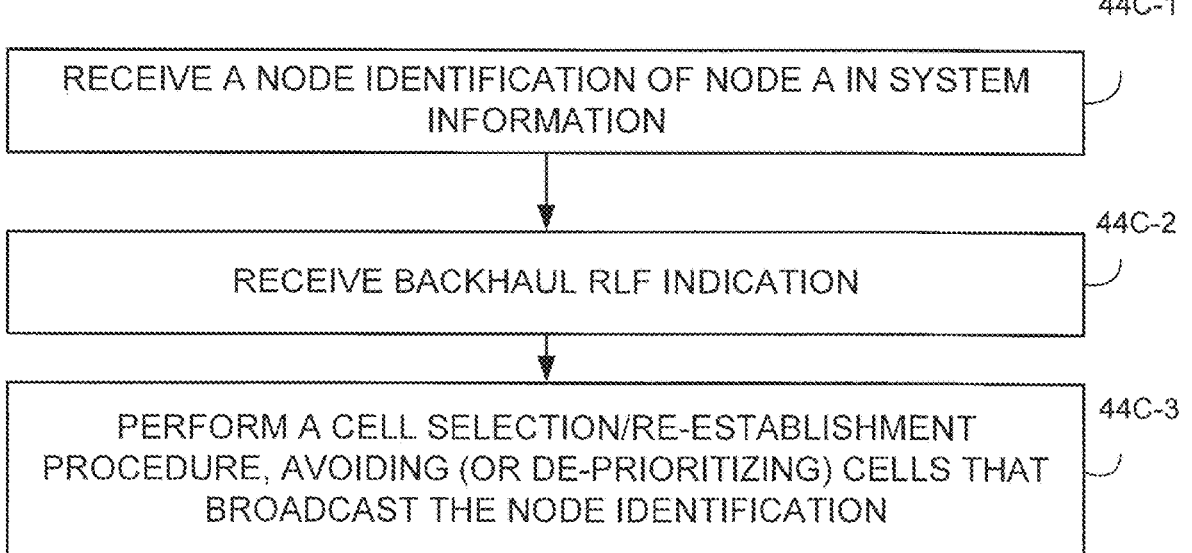

44C-1

RECEIVE A NODE IDENTIFICATION OF NODE A IN SYSTEM INFORMATION 44C-2

RECEIVE BACKHAUL RLF INDICATION 44C-3

PERFORM A CELL SELECTION/RE-ESTABLISHMENT PROCEDURE, AVOIDING (OR DE-PRIORITIZING) CELLS THAT BROADCAST THE NODE IDENTIFICATION

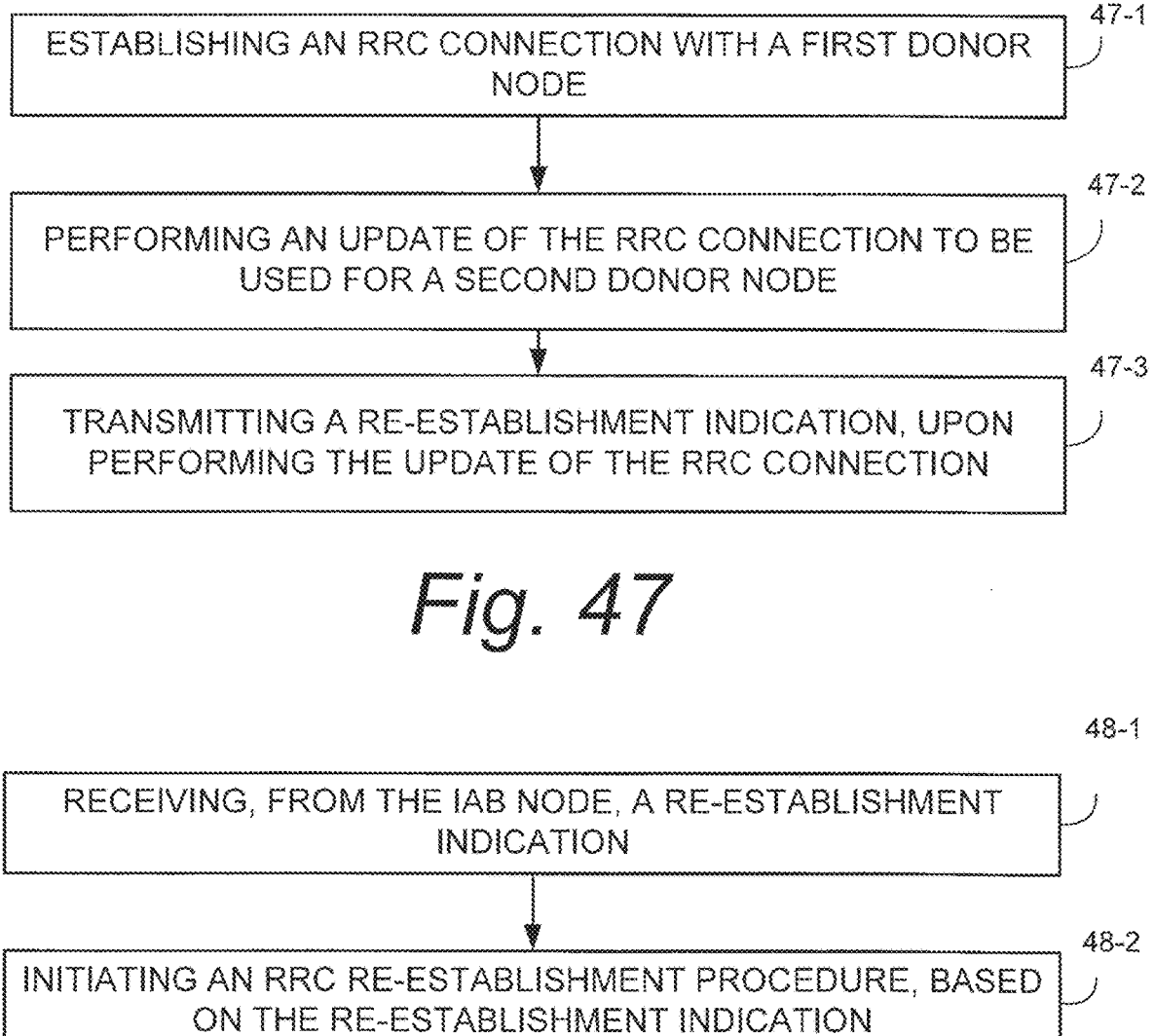

47-1

ESTABLISHING AN RRC CONNECTION WITH A FIRST DONOR NODE 47-2

PERFORMING AN UPDATE OF THE RRC CONNECTION TO BE USED FOR A SECOND DONOR NODE 47-3

TRANSMITTING A RE-ESTABLISHMENT INDICATION, UPON PERFORMING THE UPDATE OF THE RRC CONNECTION

RECEIVING, FROM THE IAB NODE, A RE-ESTABLISHMENT INDICATION 48-2

INITIATING AN RRC RE-ESTABLISHMENT PROCEDURE, BASED ON THE RE-ESTABLISHMENT INDICATION

*Fig. 48*

PERFORMING A FIRST CONTEXT TRANSFER TO SEND AN RRC CONTEXT OF THE IAB NODE  55-1

INITIATING, BASED ON THE FIRST CONTEXT TRANSFER, A SECOND CONTEXT TRANSFER TO SEND RRC CONTEXTS OF WIRELESS TERMINALS THAT THE IAB DONOR IS SERVING THROUGH THE IAB NODE  55-2

TRANSMITTING, TO THE ACCESS NODE, E.G., TO DONOR IAB NODE 22-2, THE RRC CONTEXT OF THE IAB NODE AND THE RRC CONTEXTS OF WIRELESS TERMINALS  55-3

*Fig. 55*

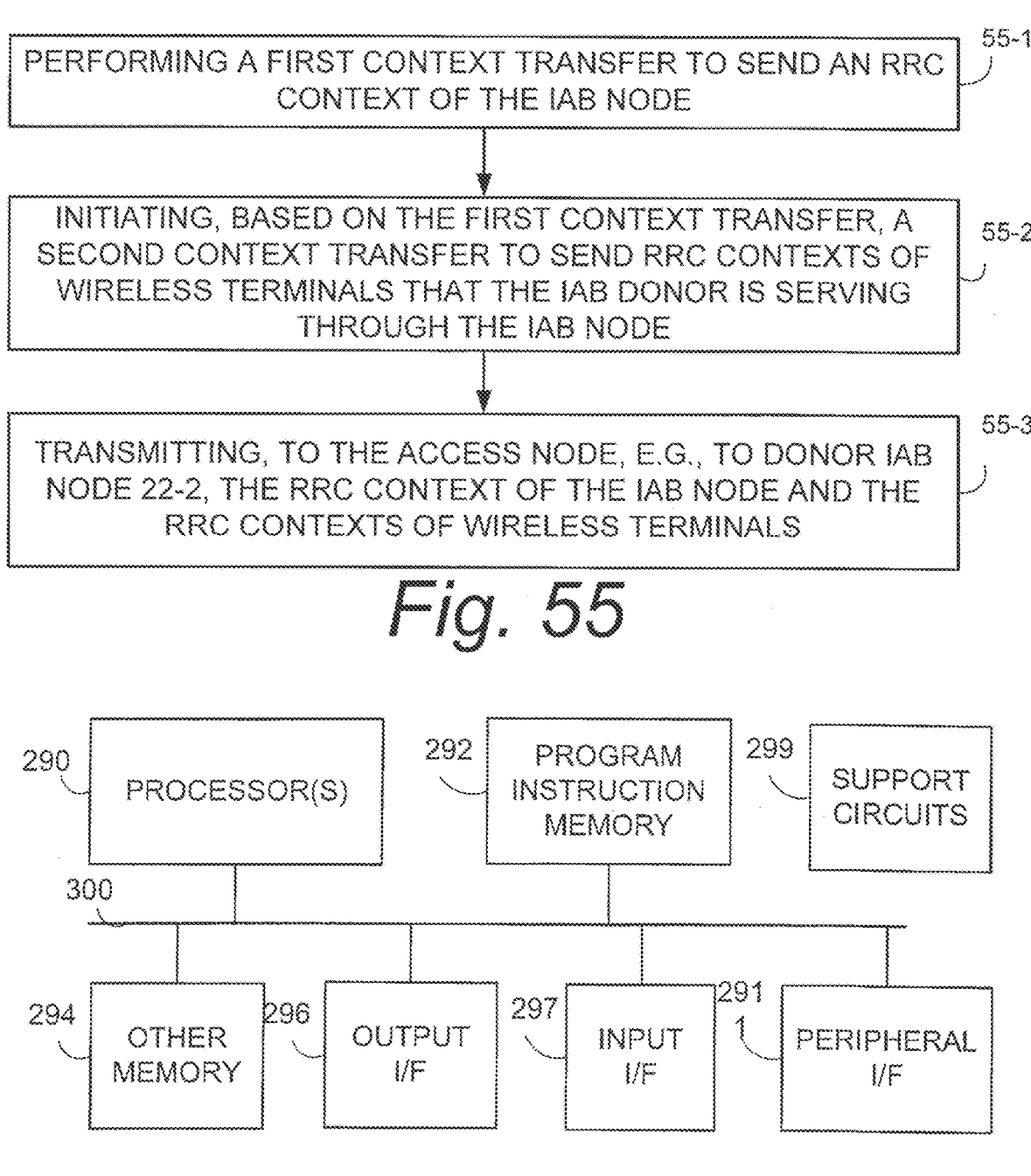

290 PROCESSOR(S)

292 PROGRAM INSTRUCTION MEMORY

299 SUPPORT CIRCUITS

300

294 OTHER MEMORY

296 OUTPUT I/F

297 INPUT I/F

291 PERIPHERAL I/F

*Fig. 56*

UPDATING RADIO RESOURCE CONTROL CONNECTIONS IN IAB NETWORK

TECHNICAL FIELD

The technology relates to wireless communications, and particularly to radio architecture and operation of wireless relay networks.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 57, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links, e.g., optical fiber cables. In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In 3rd Generation Partnership Project (3GPP), the relay node concept for the fifth generation (5G) cellular system has been discussed and standardized, where the relay nodes may utilize the same 5G radio access technologies (e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes. Additionally, an IAB-node may provide IAB functionality combined with wireless self-backhauling capabilities. IAB-nodes may need to periodically perform inter-IAB-node discovery to detect new IAB-nodes in their vicinity based on cell-specific reference signals, e.g., Synchronization Signal and PBCH block SSB). The cell-specific reference signals may be broadcasted on a Physical Broadcast Channel (PBCH) where packets may be carried or broadcasted on the Master Information Block (MIB) section.

Demand for wireless traffic has increased significantly over time and IAB systems are expected to be reliable and robust against various kinds of possible failures. Considerations have been given for IAB backhaul design. In particular, to provide methods and procedures to address radio link failures on the backhaul link.

What is needed are methods, apparatus, and/or techniques to cope with unfavorable conditions or problems on a wireless backhaul link, and particularly involving RRC update procedures.

SUMMARY OF INVENTION

In one example, an integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more child nodes, the IAB node comprising: processor circuitry configured to: establish an RRC connection with a first donor node, and; perform an update of the RRC connection to be used for a second donor node; transmitter circuitry configured to transmit, using the second interface, a re-establishment indication, upon performing the update of the RRC connection, wherein: the re-establishment indication is used to request that each of the one or more child nodes initiate an RRC re-establishment procedure, and; during the RRC re-establishment procedure, the one or more cells are considered as candidate cells.

In one example, a child node that communicates with an integrated access and backhaul (IAB) node, the child node comprising: receiver circuitry configured to receive, from the IAB node, a re-establishment indication: processor circuitry configured to initiate an RRC re-establishment procedure, based on the re-establishment indication; wherein during the re-establishment procedure, one or more cells that served by the IAB node are considered as candidate cells.

In one example, an integrated access and backhaul (IAB) donor equipped with at least one radio interface to serve an IAB node, and at least one inter-node interface to communicate with an access node, the IAB donor comprising: processor circuitry configured to: perform a first context transfer to send an RRC context of the IAB node; initiate, based on the first context transfer, a second context transfer to send RRC contexts of child nodes that the IAB donor is serving through the IAB node; transmitter circuitry configured to transmit, to the access node, the RRC context of the IAB node and the RRC contexts of child nodes.

In one example, a method for an integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more child nodes, the method comprising: establishing an RRC connection with a first donor node, and; performing an update of the RRC connection to be used for a second donor node; transmitting, using the second interface, a re-establishment indication, upon performing the update of the RRC connection; wherein: the re-establishment indication is configured to enforce each of the one or more child nodes initiate an RRC re-establishment procedure, and; during the RRC re-establishment procedure, the one or more cells are considered as candidate cells.

In one example, a method for a child node that communicates with an integrated access and backhaul (IAB) node, the method comprising: receiving, from the IAB node, a re-establishment indication: initiating an RRC re-establishment procedure, based on the re-establishment indication, wherein during the re-establishment procedure, one or more cells that served by the IAB node are considered as candidate cells.

In one example, a method for an integrated access and backhaul (IAB) donor which communicates over at least one radio interface to serve an IAB node and at least one inter-node interface to communicate with an access node, the method comprising: performing a first context transfer to send an RRC context of the IAB node; initiating, based on the first context transfer, a second context transfer to send RRC contexts of child nodes that the IAB donor is serving through the IAB node; transmitting, to the access node, the RRC context of the IAB node and the RRC contexts of child nodes.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2 is a diagrammatic view depicting an example of functional block diagrams for the IAB-donor and the IAB-node.

FIG. 18 is a flowchart showing example, non-limiting, basic acts or steps that may be performed by a wireless access node of FIG. 16.

FIG. 19 is a flowchart showing example, non-limiting, basic acts or steps that may be performed by a child node of FIG. 16.

FIG. 24 is a flowchart showing example, non-limiting, basic acts or steps that may be performed by a wireless access donor node of FIG. 23.

FIG. 25 is a flowchart showing example, non-limiting, basic acts or steps that may be performed by a non-donor Integrated Access and Backhaul (IAB) node of FIG. 23.

FIG. 30 is a flowchart showing example, representative acts or steps which may be performed by the wireless access donor node of FIG. 26B.

FIG. 31 is a flowchart showing example, representative acts or steps which may be performed by the network entity FIG. 26B.

FIG. 36 is a flowchart showing example, representative acts or steps which may be performed by the wireless access donor node of FIG. 33-FIG. 35.

FIG. 37 is a flowchart showing example, representative acts or steps which may be performed by the wireless access donor node of FIG. 33-FIG. 35.

FIG. 39 is a flowchart showing example, representative, acts or steps performed by a generic IAB node of the system of FIG. 38.

FIG. 40 is a flowchart showing example, representative, acts or steps performed by a generic child node of the system of FIG. 38.

FIG. 43C is a flowchart showing example, representative acts or steps performed by an IAB node of the implementations of FIG. 41A, 41B, and 41C, respectively.

FIG. 44A is a flowchart showing example, representative acts or steps performed by a child node of the implementations of FIG. 41A, 41B, and 41C, respectively.

FIG. 44B is a flowchart showing example, representative acts or steps performed by a child node of the implementations of FIG. 41A, 41B, and 41C, respectively.

FIG. 44C is a flowchart showing example, representative acts or steps performed by a child node of the implementations of FIG. 41A, 41B, and 41C, respectively.

FIG. 46A is an example diagrammatic view of message flow which illustrates a need for the system of FIG. 45.

FIG. 46B is an example diagrammatic view of message flow which illustrates context transfer of grandchild nodes between donor IAB nodes for the system of FIG. 45.

FIG. 46C is an example message flow of the inter-CU handover that IAB-node 24A of the system of FIG. 52 performs as directed by donor IAB node 22-1.

FIG. 47 is a flowchart showing example, representative, acts or steps performed by a generic IAB node of the system of FIG. 45.

FIG. 48 is a flowchart showing example, representative, acts or steps performed by a generic child node of the system of FIG. 45.

FIG. 55 is a flowchart showing example, representative, acts or steps performed by a donor IAB node that performs context transfer such as in the system of FIG. 49 and the system of FIG. 52.

FIG. 56 is a diagrammatic view showing example elements comprising electronic machinery which may comprise a wireless terminal, a radio access node, and a core network node according to an example embodiment and mode.

DESCRIPTION OF EMBODIMENTS

Figure 1:
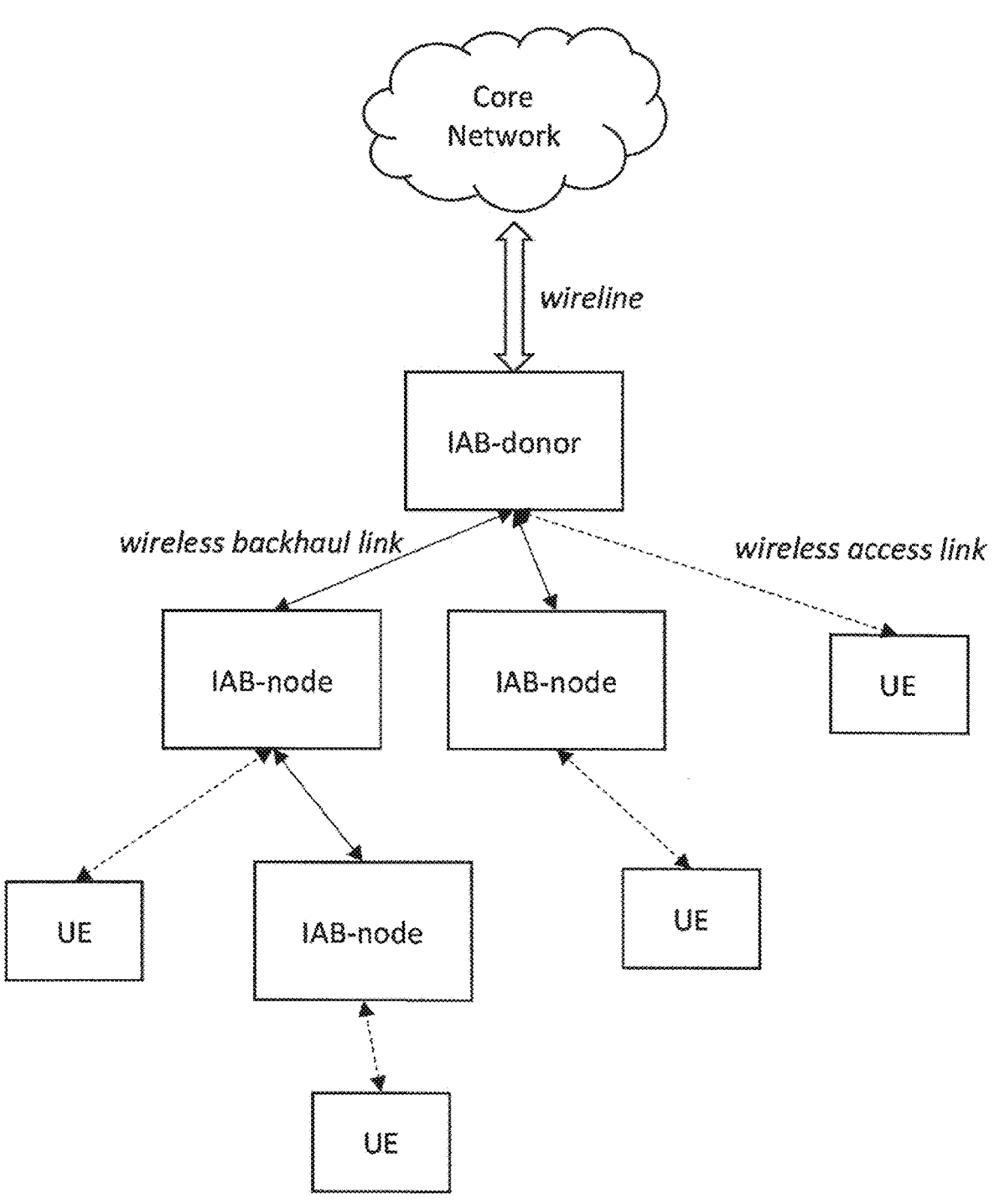
FIG. 1 is a diagrammatic view illustrating a mobile network infrastructure using 5G signals and 5G base stations.

In one of its example aspects, the technology disclosed herein concerns a node of an Integrated Access and Backhaul (IAB) network and method of operating the same. The IAB node communicates over at least two radio interfaces including a first interface and a second interface, the first interface being configured to establish a radio resource control (RRC) connection with a donor node, the second interface being configured to serve one or more cells to communicate with one or more wireless terminals. In an example embodiment and mode the IAB node comprises processor circuitry and transmitter circuitry. The processor circuitry is configured to detect a radio link failure (RLF) on the first interface. The transmitter circuitry is configured to transmit, using the second interface, to the one or more wireless terminals: node serving cell information configured to identify the one or more cells, and; a backhaul RLF indication upon a failure of recovery from the RLF. A method of operating such IAB node is also provided.

In another of its example aspects the technology disclosed herein concerns a child node that communicates with an integrated access and backhaul (IAB) node. The child node may be an IAB node, such as a child IAB node or a wireless terminal. In an example embodiment and mode the child node comprises receiver circuitry and processor circuitry. The receiver circuitry is configured to receive from the IAB node: node serving cell information configured to identify one or more cells served by the IAB node, and, a backhaul radio link failure (RLF) indication indicating that the IAB node fails to recover from an RLF. The processor circuitry is configured to perform, upon receiving the backhaul RLF indication, a re-establishment procedure based on the node serving cell information. A method of operation such child node is also provided.

In another of its example aspects, the technology disclosed herein concerns an integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more wireless terminals. In an example embodiment and mode the IAB node comprises processor circuitry and transmitter circuitry. The processor circuitry is configured to establish an RRC connection with a first donor node, and to perform an update of the RRC connection to be used for a second donor node. The transmitter circuitry is configured to transmit, using the second interface, a re-establishment indication, upon performing the update of the RRC connection. The re-establishment indication is used to request that each of the one or more wireless terminals initiate an RRC re-establishment procedure. During the RRC re-establishment procedure, the one or more cells are considered as candidate cells. In one example implementation the update of the RRC connection includes an RRC re-establishment procedure to the second donor node. In another example implementation the update of the RRC connection includes an RRC reconfiguration with sync procedure to the second donor node. A method of operating such IAB node is also provided.

In another of its example aspects the technology disclosed herein concerns a wireless terminal that communicates with an integrated access and backhaul (IAB) node. In an example embodiment and mode the wireless terminal comprises receiver circuitry and processor circuitry. The receiver circuitry is configured to receive, from the IAB node, a re-establishment indication. The processor circuitry is configured to initiate an RRC re-establishment procedure, based on the re-establishment indication. During the re-establishment procedure, one or more cells that served by the IAB node are considered as candidate cells. A method of operating such wireless terminal is also provided.

In another of its example aspects the technology disclosed herein concerns a donor integrated access and backhaul (IAB) donor equipped with at least one radio interface to serve an IAB node, and at least one inter-node interface to communicate with an access node. In an example embodiment and mode the IAB donor comprises processor circuitry and transmitter circuitry. The processor circuitry is configured to perform a first context transfer to send an RRC context of the IAB node; and to initiate, based on the first context transfer, a second context transfer to send RRC contexts of wireless terminals that the IAB donor is serving through the IAB node. Transmitter circuitry configured to transmit, to the access node, the RRC context of the IAB node and the RRC contexts of wireless terminals. A method of operating such IAB donor node is also provided.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having lms duration similar to LTE. Each subframe consists of slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

In some aspects of the embodiments for handling of radio link failures in wireless relay networks, disclosed is a Mobile Termination (MT) functionality-typically provided by the User Equipment (UE) terminals-that may be implemented by Base Transceiver Stations (BTSs or BSs) nodes, for example, IAB nodes. In one embodiment, the MT functions may comprise common functions such as: radio transmission and reception, encoding and decoding, error detection and correction, signaling, and access to a SIM.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

At least some example embodiments herein disclose methods and devices for an IAB-node to inform child nodes and/or UEs of upstream radio conditions and accordingly, the term IAB-node may be used to represent either a parent IAB-node or a child IAB-node, depending on where the IAB-node is in the network communication with the IAB-donor which is responsible for the physical connection with the core network. Embodiments are disclosed where an IAB-node, e.g., child IAB-node, may follow the same initial access procedure as a UE, including cell search, system information acquisition, and random access, in order to initially set up a connection to a parent IAB-node or an IAB-donor. That is, when an IAB base station (eNB/gNB) needs to establish a backhaul connection to, or camp on, a parent IAB-node or an IAB-donor, the IAB-node may perform the same procedures and steps as a UE, where the IAB-node may be treated as a UE but distinguished from a UE by the parent IAB-node or the IAB-donor.

In at least some example embodiments for handling radio link failures in wireless relay networks, MT functionality-typically offered by a UE-may be implemented on an IAB-node. In some examples of the disclosed systems, methods, and device embodiments, consideration may be made in order for a child IAB-node to monitor a radio condition on a radio link to a parent IAB-node-where the parent IAB-node may itself be a child IAB-node in communication with an IAB-donor.

With reference to FIG. 1, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, the IAB nodes may be referred to as IAB relay nodes. The IAB-node may be a Radio Access Network (RAN) node that supports wireless access to UEs and wirelessly backhauls the access traffic. The IAB-donor may be a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 1, a number of UEs are depicted as in communication with IAB nodes, for example, IAB nodes and IAB donor node, via wireless access link. Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

FIG. 2 depicts an example of functional block diagrams for the IAB-donor and the IAB-node (see FIG. 1). The IAB-donor may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). An IAB-node may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP*) which is a wireless backhaul protocol that provides signaling services between the DU of an IAB-node and the CU of an IAB-donor. That is, as further described below, the protocol stack configuration may be interchangeable, and different mechanism may be used.

Figure 3:
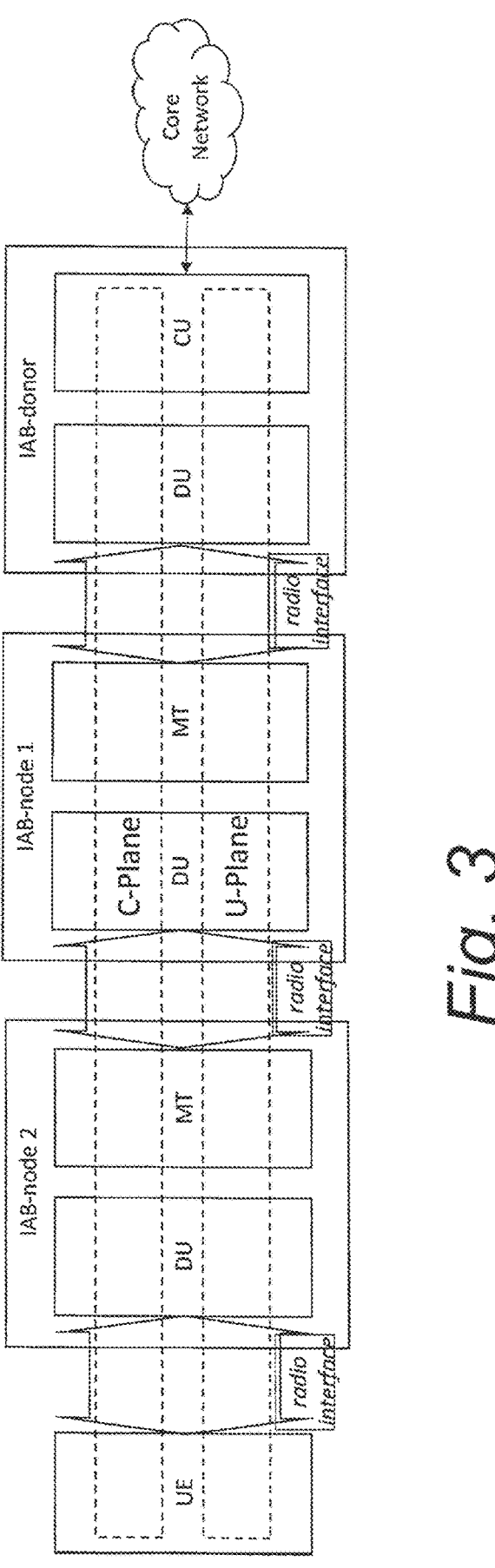
FIG. 3 is a diagrammatic view illustrating Control Plane (C-Plane) and User Plane (U-Plane) protocols among the UE, IAB-nodes, and IAB-donor.

As illustrated by the diagram shown in FIG. 3, the protocols among the UE, IAB-nodes, and IAB donor are grouped into Control Plane (C-Plane) and User Plane (U-Plane). C-Plane carries control signals (signaling data), whereas the U-Plane carries user data. FIG. 3 shows an example of the embodiment where there are two IAB-nodes, IAB-node 1 and IAB-node 2, between the UE and the IAB-donor (two hops). Other embodiments may comprise a network with a single hop or multiple hops where there may be more than two IAB-nodes present.

Figure 4:
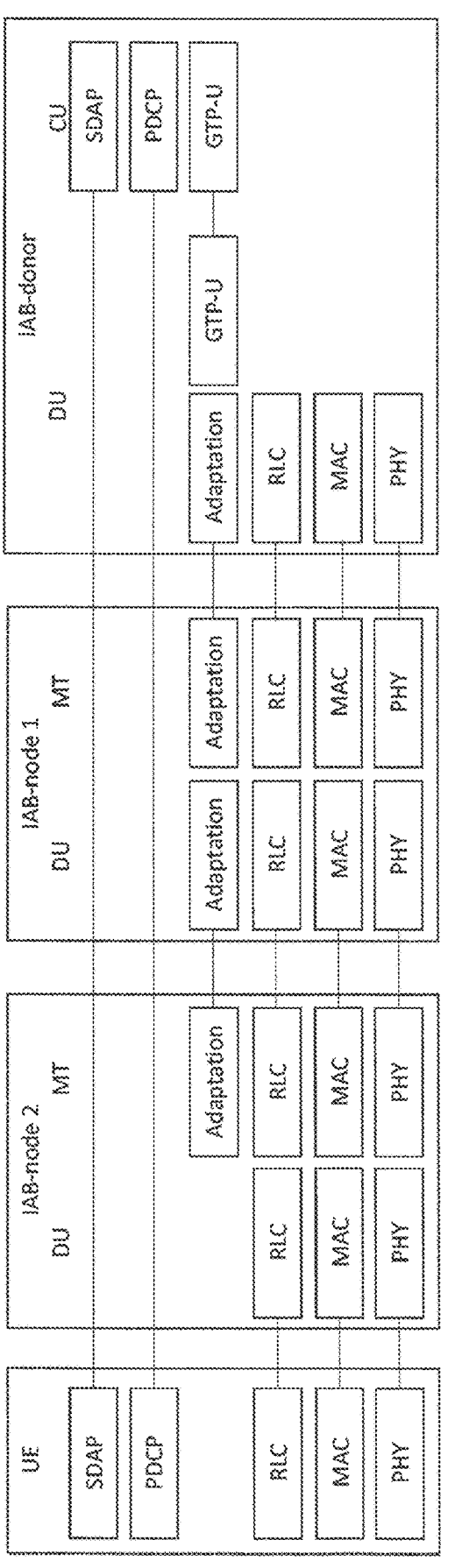
FIG. 4 is a functional block diagram of an example protocol stack configuration for the U-Plane.

FIG. 4 depicts a functional block diagram of an example protocol stack configuration for the U-Plane, the stack comprising Service Data Protocol (e.g., SDAP, 3GPP TS 37.324) which may carry user data (e.g., via IP packets). In one embodiment, the SDAP runs on top of PDCP (3GPP TS 38.323) and the L2/Physical layers. In one embodiment, an Adaptation Layer is introduced between the IAB-node and the IAB-node/donor, where the Adaptation Layer carries relay-specific information, such as IAB-node/donor addresses, QoS information, UE identifiers, and potentially other information. In this embodiment, RLC (3GPP TS 38.322) may provide reliable transmission in a hop-by-hop manner while PDCP may perform end-to-end (UE-CU) error recovery. GTP-U (GPRS Tunneling Protocol User Plane) may be used for routing user data between CU and DU inside the IAB-donor.

Figure 5A:
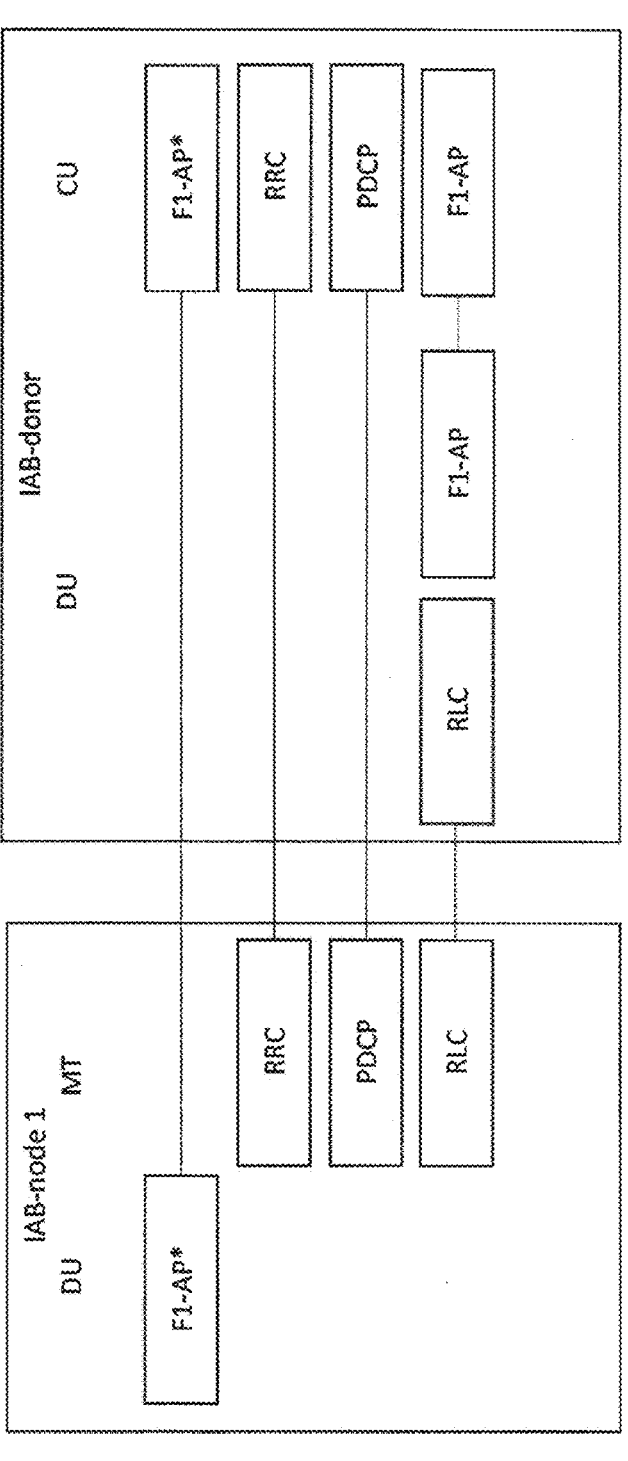
FIG. 5A depicts a functional block diagram of an example protocol stack configuration for the C-Plane between an IAB-node connected to an IAB-donor.

FIG. 5A is a functional block diagram of an example protocol stack configuration for the C-Plane between an IAB-node (IAB-node 1) directly connected to the IAB-donor (via a single hop). In this embodiment, the MT component of IAB-node 1 may establish an RRC connection with the CU component of the IAB-donor. In parallel, RRC may be used for carrying another signaling protocol in order for CU/IAB-donor to control the DU component resident in the IAB-node 1. In one embodiment, such a signaling protocol may be referred to as F2 Application Protocol* (F1-AP*), either the protocol referred as F1-AP specified in 3GPP TS 38.473 or a protocol based on the F1-AP with potential extended features to accommodate wireless backhauls (the original F1-AP is designed for wirelines). In other embodiments, F1-AP may be used for CU-DU connection inside the IAB-donor. It is assumed that below RLC, MAC/PHY layers are shared with the U-Plane.

Figure 5B:
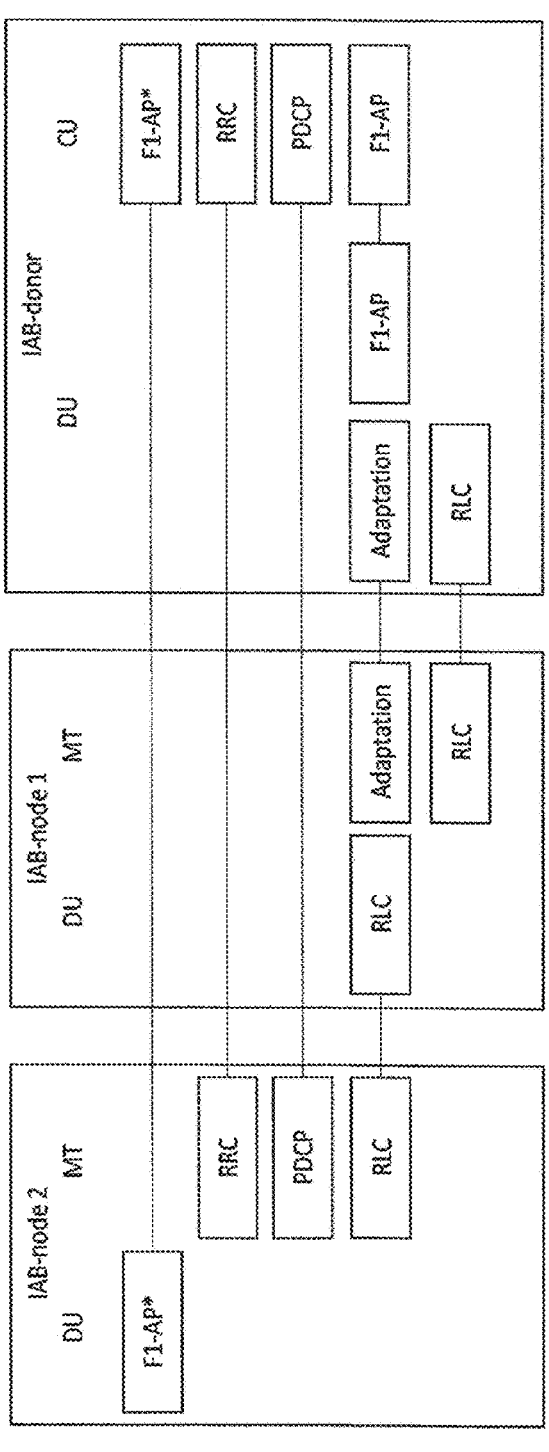
FIG. 5B depicts a functional block diagram of an example configuration of the C-Plane protocol stack for an IAB-node connected to another IAB-node which is connected to an IAB-donor.

FIG. 5B depicts a functional block diagram of an example configuration of the C-Plane protocol stack for IAB-node 2, an IAB-node connected to the aforementioned IAB-node 1 (2 hops). In one embodiment, it may be assumed that the IAB-node 1 has already established RRC/F1-AP* connections with the IAB-donor as shown in FIG. 5A. In IAB-node 1 the signaling bearer for IAB-node 2 RRC/PDCP may be carried by the Adaptation Layer to the IAB-donor. Similar to FIG. 5A, the F1-AP* signaling is carried by the RRC of IAB-node 2.

Figure 5C:
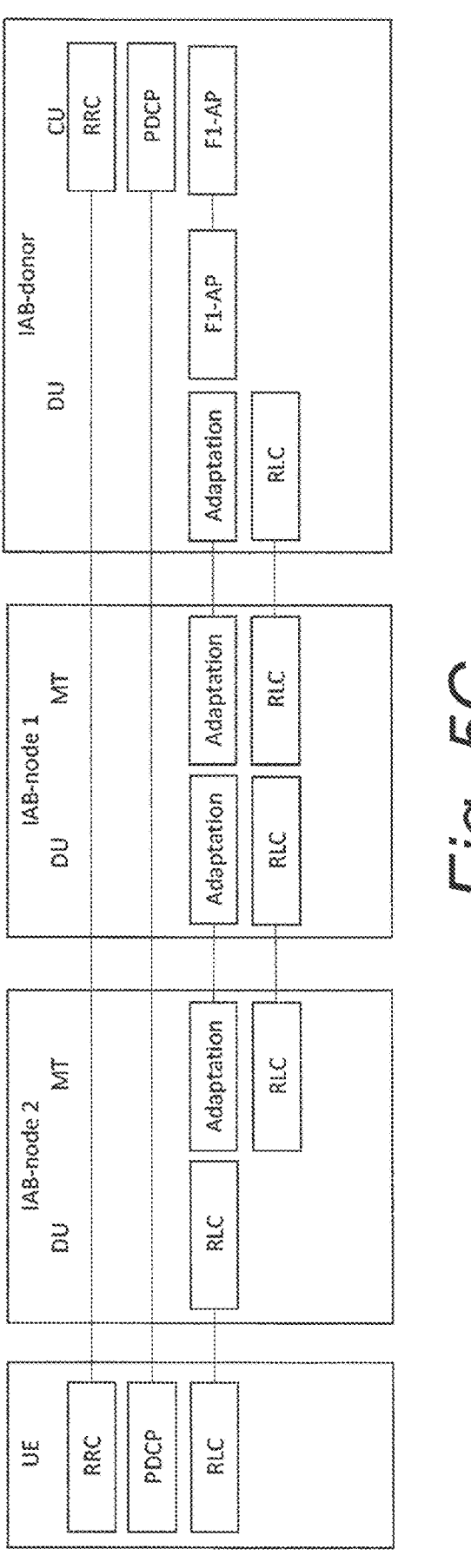
FIG. 5C depicts a functional block diagram of an example configuration of the C-Plane protocol stack for a UE's RRC signaling.

FIG. 5C depicts yet another functional block diagram of an example configuration of the C-Plane protocol stack for UE's RRC signaling under the 2-hop relay configuration shown in FIG. 5B. Accordingly, the UE having an MT component and functionality, via the C-Plane, may be connected to the CU of the IAB-donor. Though traffic is routed through IAB-node 2 and IAB-node 1, as depicted, the two nodes are passive nodes in that the data is passed to the next node(s) without manipulation. That is, data is transmitted by the UE to the node it is connected to, e.g., IAB-node 2, and then IAB-node 2 transmits the data to the node that is connected to, e.g., IAB-node 1, and then IAB-node 1 transmits the data (without manipulation) to the IAB-donor.

FIGS. 5A, 5B, and 5C illustrate that the MT of each IAB-node or UE has its own end-to-end RRC connection with the CU of the IAB-donor. Likewise, the DU of each IAB-node has an end-to-end F1-AP* connection with the CU of the IAB-donor. Any IAB nodes present between such end points transparently convey RRC or F1-AP signaling traffic.

Figure 6A:
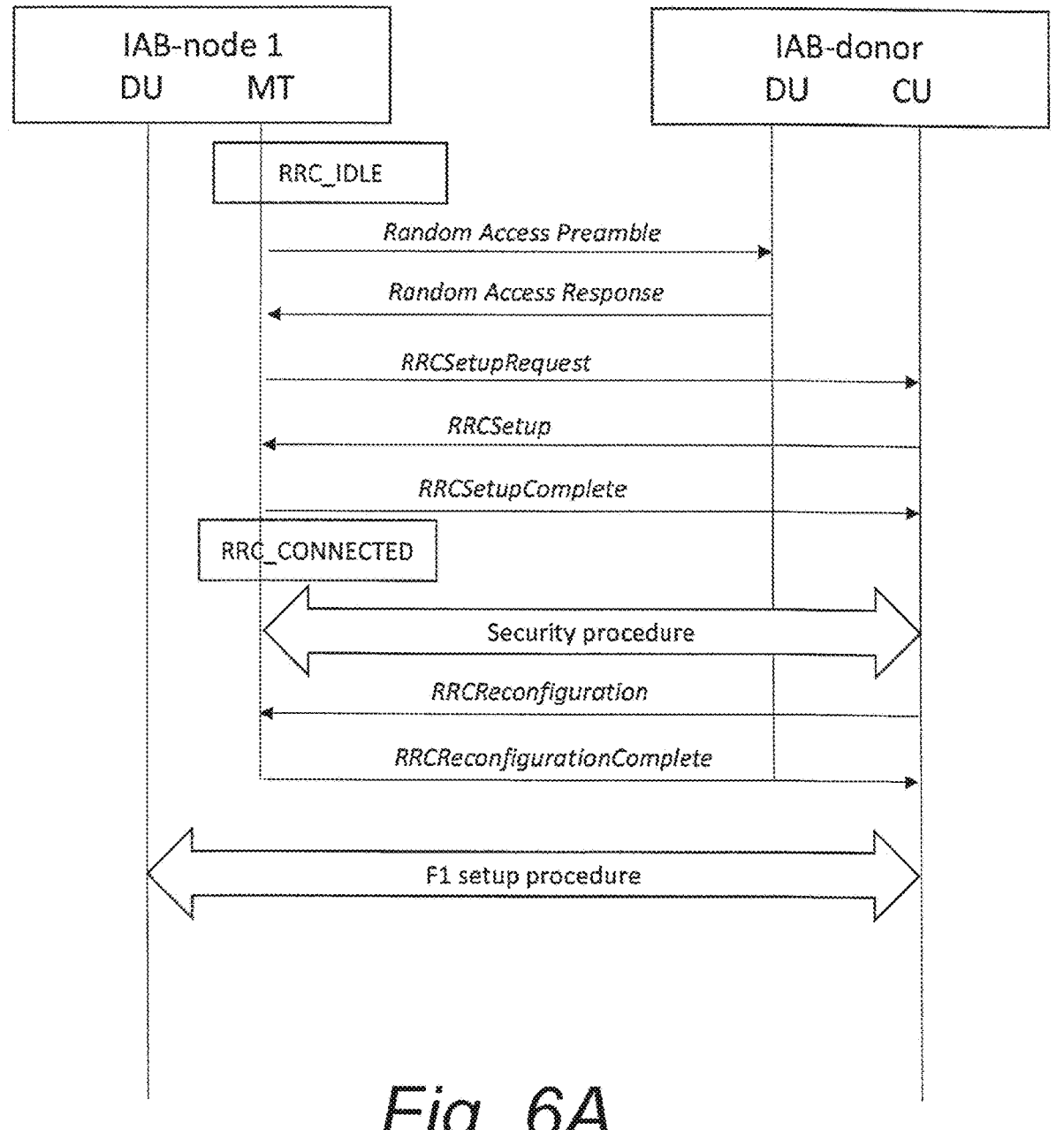
FIG. 6A depicts an example message sequence for an IAB-node to establish an RRC connection, followed by F1-AP* connection.
Figure 6B:
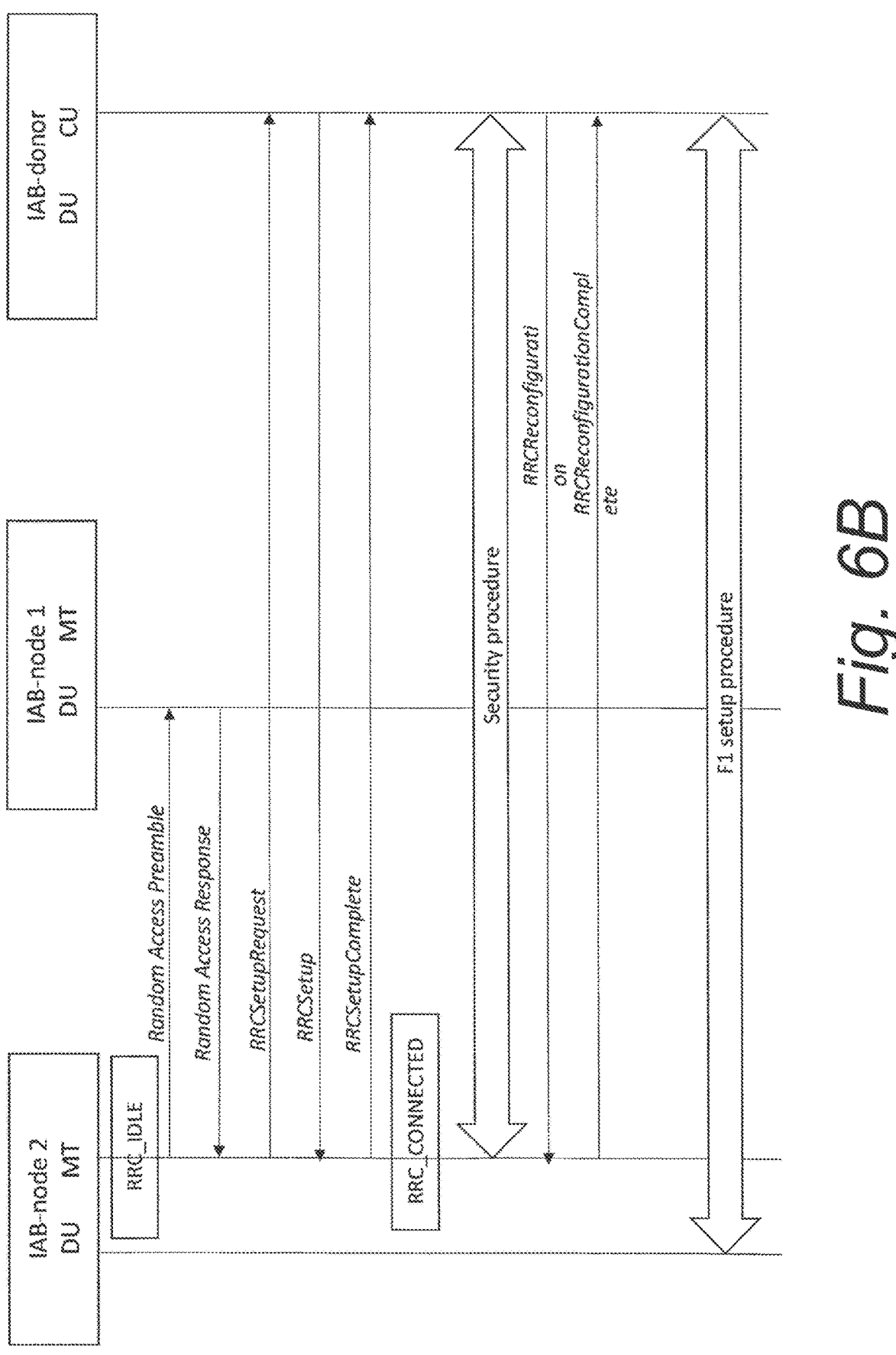
FIG. 6B depicts an example message sequence for IAB-node to establish an RRC connection with an IAB-donor, followed by the F1 setup procedure.

FIGS. 6A and 6B are diagrams of an example flow of information transmit/receive and/or processing by IAB-node(s) and an IAB-donor according to aspects of the present embodiments.

FIG. 6A depicts an example message sequence for IAB-node 1 to establish an RRC connection, followed by F1-AP* connection. It is assumed that IAB-node 1 has been pre-configured (or configured by the network) with information that instructs how to select a cell served by the IAB-donor. As shown in the figure, IAB-node 1-in an idle state (RRC_IDLE)-may initiate an RRC connection establishment procedure by sending Random Access Preamble to the IAB-donor, which may be received and processed by the DU of the IAB-donor. Upon successful reception of Random Access Response from the IAB-donor, IAB-node 1 may send a RRCSetupRequest, followed by reception of an RRCSetup and transmission of RRCSetupComplete. At this point of the message sequence, the IAB-node 1 may enter a connected state (RRC_CONNECTED) with the IAB-donor, and may proceed with a security procedure to configure encryption/integrity protection features. The CU of the IAB-donor may further send an RRCReconfiguration to IAB-node 1, which may comprise configuration parameters to configure radio bearers (e.g., data radio bearers (DRBs) and signaling radio bearers (SRBs)). In some embodiments, the RRCReconfiguration is sent to modify an RRC connection and establish Radio Connection between a UE and the network, however, in the present embodiment, the RRCReconfiguration may also be sent to configure a connection between an IAB-node and the network. RRC Connection Reconfiguration messages may be used to, for example, establish/modify/release Radio Bearers, and/or perform handover, etc. In one embodiment, any of the RRC messages transmitted from IAB-node 1 may include information identifying the IAB-node 1 as an IAB-node (not as a UE). For example, the Donor CU may be configured with a list of node identities (e.g., IMSI or S-TMSI) that may be allowed to use the service from the donor. The information may be used by the CU in the subsequence operations, for example, to distinguish a UE from an IAB-node.

As described above, following the RRC connection establishment procedure, the DU of IAB-node 1 and IAB-donor may proceed with F1 setup procedure using the F1-APS' protocol, which may activate one or more cells served by the DU of IAB-node 1—thereby allowing other IAB nodes and/or UEs to camp on the cell. In this procedure, the Adaptation Layer for IAB-node 1 and IAB-donor may be configured and activated as well.

FIG. 6B depicts an example message sequence or flow of information for IAB-node 2 to establish an RRC connection with IAB-donor, followed by the F1 setup procedure. It is assumed in this embodiment that IAB-node 1 has already performed the process disclosed in FIG. 6A to establish an RRC and F1-APS' connection. Referring back to FIG. 3, the IAB-node 2 shown in communication via the radio interface with IAB-node 1, may be also depicted in FIG. 6B as a child node of IAB-node 1 according to aspects of the present embodiments.

It should be understood that upon or after establishing the RRC/F1-AP connection the IAB-donor may acquire knowledge of the IAB-node location within the relay network topology. In one configuration, this may be achieved by intermediate IAB-nodes relaying identifications of nodes located in its downstream to its upstream nodes.

Due to the nature of wireless communications, the wireless backhaul links are susceptible to be deteriorated or broken at any time. In aspects of the present embodiments, the MT part of an IAB-node may constantly monitor the quality of the radio link and/or signal quality on the upstream of the IAB-node, where the radio link may be to a parent IAB node/donor of the IAB-node. If radio problems cannot be recovered in a designated duration, the MT may declare Radio Link Failure (RLF), meaning a loss of communication link may have occurred or signal strength is weak to continue (e.g., below a threshold).

Figure 7:
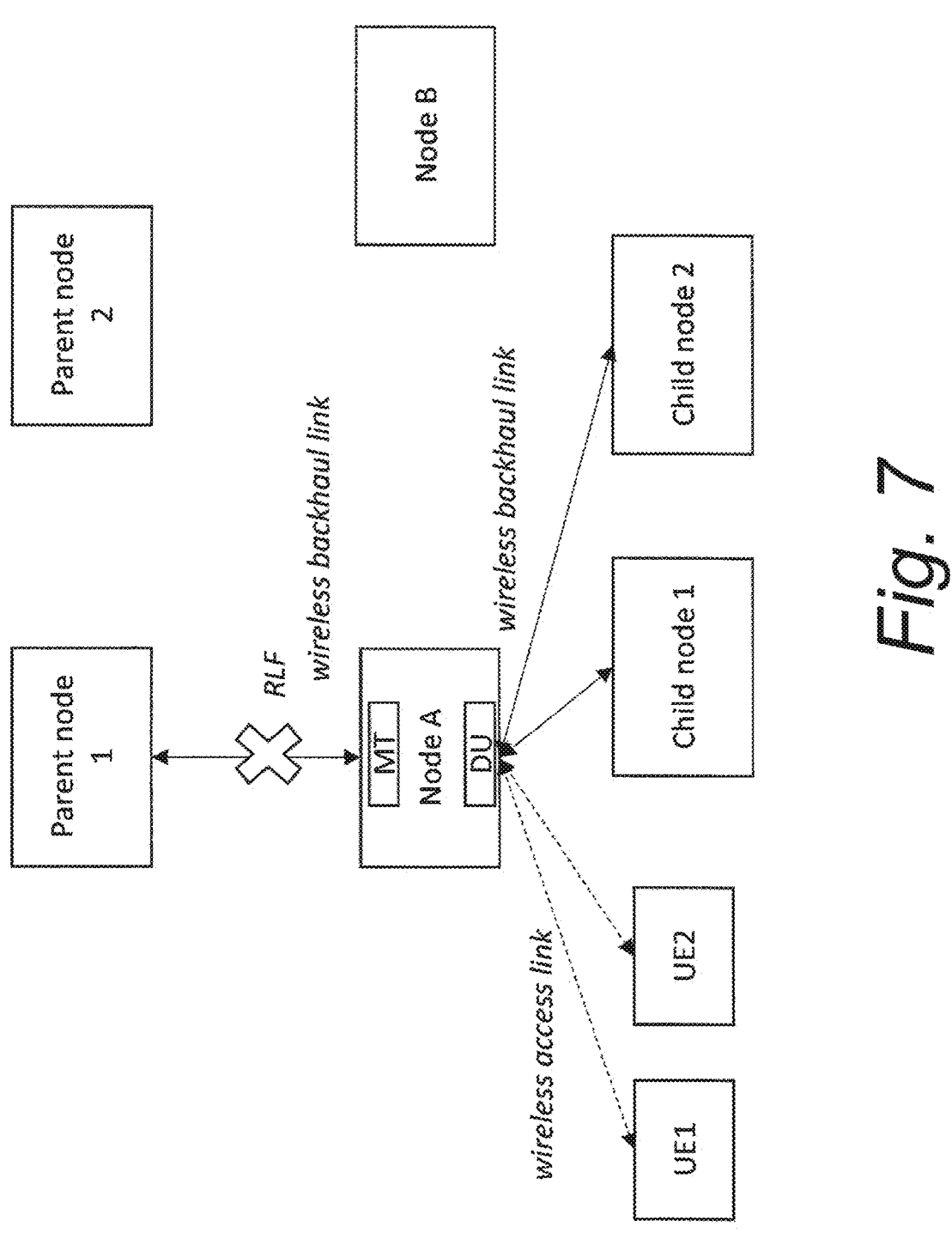
FIG. 7 is a diagrammatic view of an example scenario where an IAB-node detects a Radio Link Failure (RLF) on the upstream link to its parent node.

FIG. 7 shows an example diagram of a scenario where an IAB-node (Node A) detects RLF on the upstream link to its parent node (Parent node 1). In some embodiments, the MT component of Node A may need to find another parent that is visible from the node. In this case, the MT component may perform a cell selection procedure, and if a suitable cell, such as Parent node 2, is successfully found, the Node A may then proceed with an RRC reestablishment procedure with the suitable cell, e.g., Parent node 2. It should be noted that Node A in this scenario needs to find a cell served by either an IAB-node or an IAB-donor, e.g., non-IAB-capable cells are not suitable. In one embodiment, a cell served by either an IAB-node or an IAB-donor may broadcast a state, e.g., via a flag, as an indication indicating the IAB capability, which may further comprise an indication of the IAB functionality, a node type (IAB-node or IAB-donor), a hop count and/or the current state of the connectivity to the parent node. Such broadcast may occur using system information, such as MIB, system information block type 1 (SIB1) or any of the other SIBs. Alternatively, or in parallel, Node A may have been pre-configured or configured by the network with a list of IAB-capable cell identifications.

While Node A is trying to find a new suitable IAB-capable serving cell, the child IAB nodes, e.g., Child node 1 and Child node 2, and/or UEs, e.g., UE1 and UE2, may still be in connected mode with Node A. If Node A successfully recovers from the RLF before expiration of a pre-configured or network-configured period of time, the child nodes and/or the UEs may not be aware of the RLF. However, in the scenario where Node A fails or has failed to recover from the RLF in a timely manner, e.g., before expiration of a pre-configured/network-configured period of time, not only may these child nodes/UEs suffer discontinuity of service, but also all the nodes/UEs in the downstream may also suffer discontinuity of service.

Some example embodiments herein disclose systems, methods, and device where an IAB-node may inform connected nodes, e.g., child nodes, or UEs, of the upstream radio conditions. In some embodiments, the upstream radio condition information may enable the child nodes or UEs to decide to stay connected with the IAB-node or to look for another node to connect to.

Figure 8:
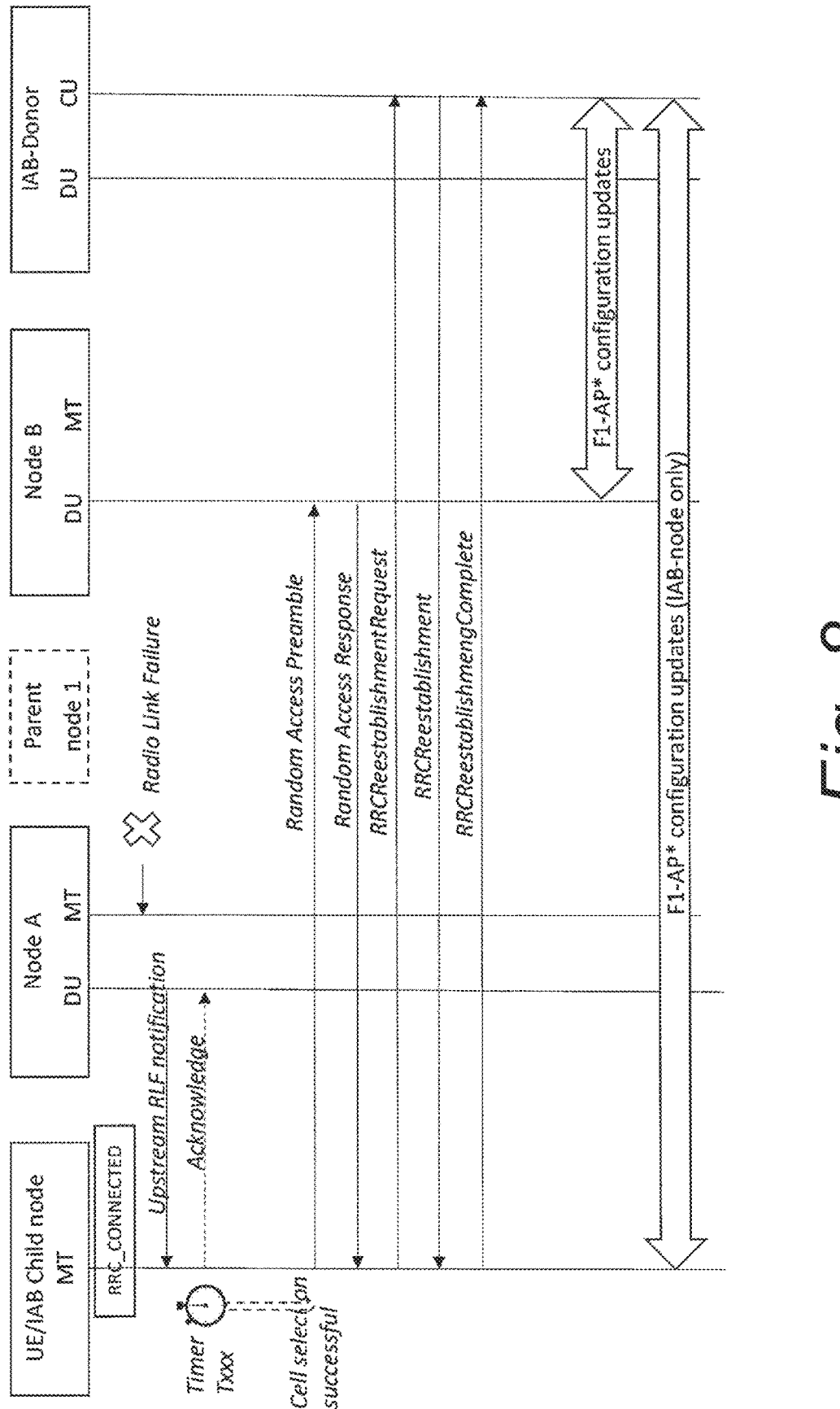
FIG. 8 illustrates an example flow of information transmit/receive and/or processing by a UE and/or IAB-node connected to a set of IAB-nodes in communication with an IAB-donor, for processing a notification of an RLF.

FIG. 8 shows an example scenario for Upstream RLF notification, a notification of an RLF, sent from a node (Node A) and detected on the node's upstream, to the child nodes and/or the directly connected UEs. In one embodiment, upon receiving the notification, each of the child nodes and/or UEs may perform cell selection and, if successful, proceed to RRC reestablishment. As shown in FIG. 8, each of the child nodes and/or UEs, after a successful selection to a new node (Node B), may start the reestablishment procedure through Node B. That is, once a successful selection is made, the child nodes and/or UEs may transmit Random Access Preamble/Response messages, followed by RRCReestablishmentRequest and subsequent messages as illustrated in FIG. 8.

In one embodiment, Upstream RLF notification may be carried by the Adaptation Layer, e.g., a header part or a message body of the Adaptation Layer protocol. In an alternate embodiment, or in addition to, the notifications may be carried by the RLC sublayer, MAC, or a physical layer signaling, e.g., PDCCH. Additionally or alternatively, the notifications may be broadcasted via system information, e.g., MIB, SIB1 or any of the other SIBs, or transmitted in a dedicated manner.

Accordingly, in one embodiment, RRC resident in each of the child nodes and/or UEs may perform cell selection upon receiving a notification indicating the reception of the Upstream RLF notification from lower layers. In at least some of the example embodiments herein, this may be performed even if the radio link to the parent node remains in good condition. The node and/or UE may then start a timer, timer Txxx, e.g., T311 specified in 3GPP TS 38.331, based on the received notification, and upon selecting a suitable cell while timer Txxx is running, the node and/or UE may stop timer Txxx and initiate transmission of RRCReestablishmentRequest to the IAB-donor.

Once the RRC connection is reestablished, the CU of the IAB-donor may update the F1-AP* configurations in Node B as well as the child IAB-node that initiated the RRC reestablishment. In the scenario where the connecting device is a UE, F1-AP* configuration updates are not needed as they do not have the F1-AP* interface. Accordingly, the updated configuration from the IAB-donor may be used to reconfigure the routing topology which was modified or changed due to the RLF.

Figure 9A:
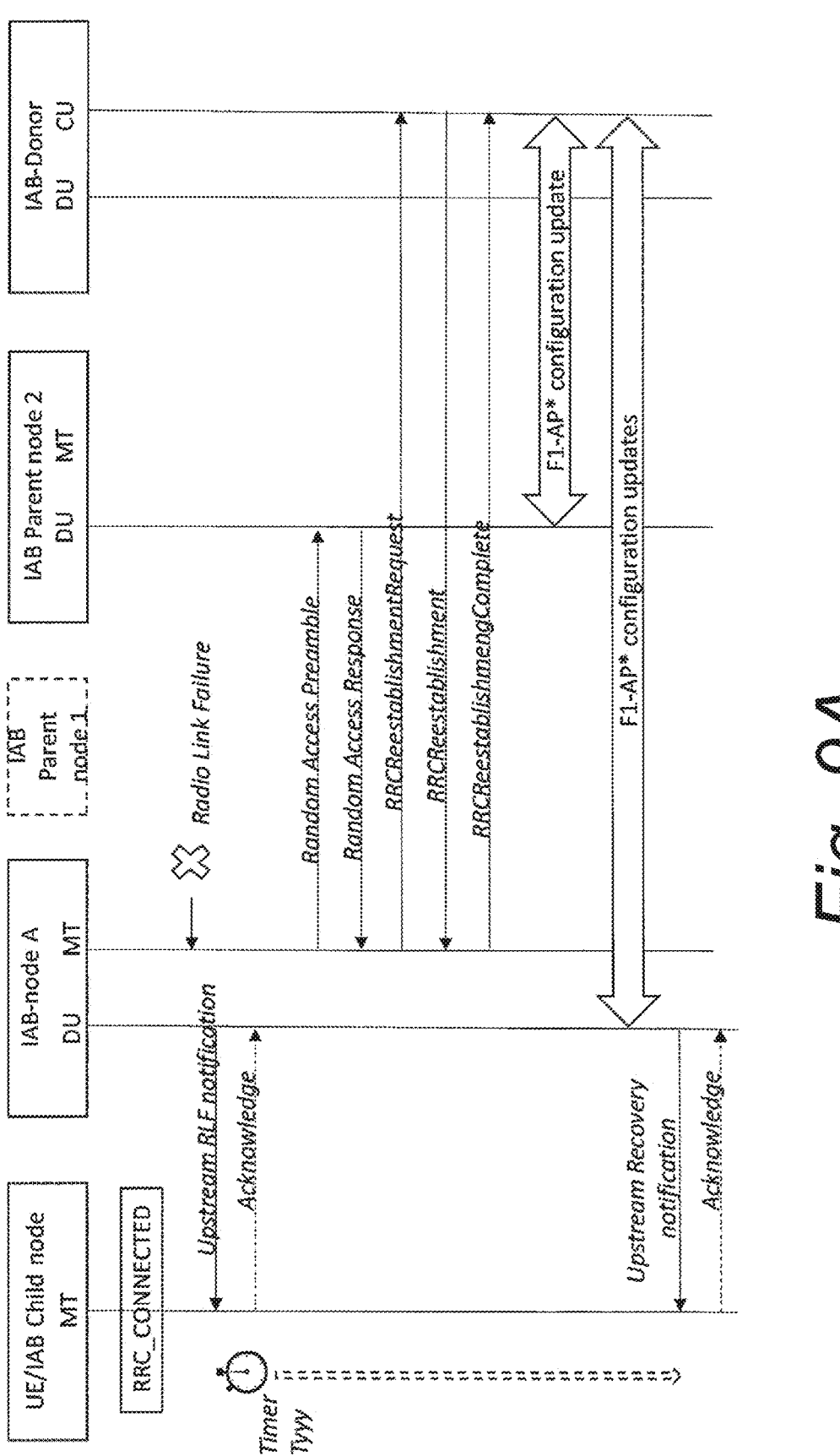
FIG. 9A illustrates an example flow of information transmit/receive and/or processing by a UE and/or IAB-node connected to a set of IAB-nodes in communication with an IAB-donor, based on receiving an Upstream RLF notification.

FIG. 9A shows another scenario where the child nodes and/or UEs may start a timer, for example, timer Tyyy, based on receiving an Upstream RLF notification. While the timer Tyyy is running, Node A may attempt to recover the upstream link by performing cell selection. In the scenario depicted in FIG. 9, Node A has successfully found a new parent node (Parent node 2) and may initiate the RRC reestablishment procedure. Node A, based on receiving F1-AP* configuration update from the CU of the IAB-donor, may transmit/send Upstream Recovery notification-a notification indicating that the upstream is recovered-to the child IAB-node and/or the UEs. If timer Tyyy has not expired yet, the child IAB-node and/or the UEs that receive the notification may stop timer Tyyy and stay connected with Node A. If the timer expires before receiving Upstream Recovery notification, the child IAB-node and/or the UEs may perform cell selection/RRC reestablishment as shown in FIG. 8. In one embodiment, the timer value/configuration may be pre-configured. In another embodiment, the timer value/configuration may be configured by the parent node (e.g., Parent node 1) via a dedicated signaling or via a broadcast signaling (e.g., system information, such as MIB, SIB1 or any of the other SIBs).

Similar to the previous scenario, in one embodiment, the Upstream RLF notification may be carried by the Adaptation Layer, RLC, MAC, or a physical layer signaling. Additionally, the notifications may be broadcasted via system information (e.g., MIB, SIB1 or any of the other SIBs) or transmitted in a dedicated manner.

In yet another embodiment for this scenario, RRC resident in each of the child nodes and/or UEs may start timer Tyyy upon receiving Upstream RLF notification from the lower layers. If the node and/or UE receive a notification indicating the reception of the Upstream RLF notification from lower layers while timer Tyyy is running, the node and/or UE may stop timer Tyyy. If timer Tyyy expires, the node and/or UE may then start timer Txxx and upon selecting a suitable cell while the timer is running, the node and/or UE may stop the timer and initiate transmission of RRCReestablishmentRequest.

Figure 9B:
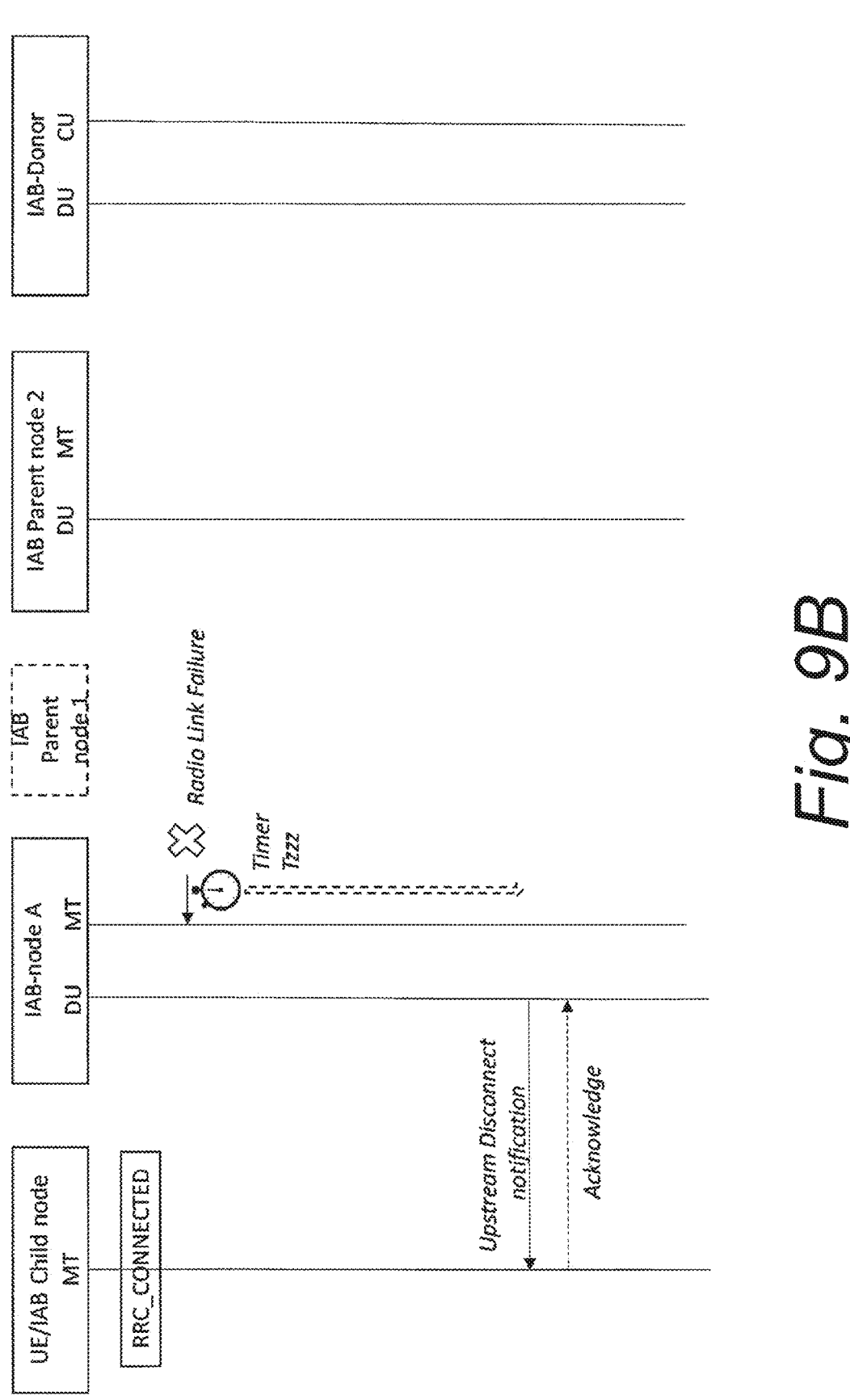
FIG. 9B illustrates another example flow of information transmit/receive and/or processing by a UE and/or IAB-node connected to a set of IAB-nodes in communication with an IAB-donor, based on not having received an Upstream RLF notification.

FIG. 9B shows yet another scenario where Node A may start a timer Tzzz upon detecting an RLF. In this scenario, Node A may or may not send the aforementioned Upstream RLF notification to the child IAB-nodes and/or UEs. While the timer Tzzz is running, Node A may attempt to recover the upstream link by performing cell selection. In the scenario depicted in FIG. 9B, at the timer Tzzz expiry (cell selection failure), Node A may send a notification (e.g. Upstream Disconnect notification) to the child IAB-nodes/UEs notifying the unsuccessful RLF recovery. In this case, the child IAB-nodes/UEs that receive the notification may start the aforementioned timer Txxx and initiate the cell selection procedure as shown in FIG. 8. The notification may be carried by the Adaptation Layer, RLC, MAC, or a physical layer signaling, in a broadcast or a dedicated manner. In one embodiment, the timers Txxx and Tzzz may be the same timer or share same configurations. In another embodiment, the timers Txxx and Tzzz may be different timers or differently configured.

Additionally, notifications that an IAB-node provides to its downstream (children/UEs) may not be limited to RLF or RLF recovery. In some embodiments, the IAB-node may inform child nodes and/or UEs of the signal quality (e.g., Reference Signal Received Power (RSRP), Reference Signal Received Quality (RSRQ)), error rates, and/or any other types of measurements that indicate the radio condition of the upstream. In this case, IAB-nodes and/or UEs may be pre-configured or configured by the network with conditions for initiating cell selection/reestablishment. The notifications may be carried by the Adaptation Layer, RLC, MAC, or a physical layer signaling, in a broadcast or a dedicated manner.

In one embodiment, upon receiving one of the notifications from the parent node, the IAB-node and/or UE may send back or respond with an acknowledgement to the parent node, as shown in FIG. 8, FIGS. 9A and 9B.

Figure 10:
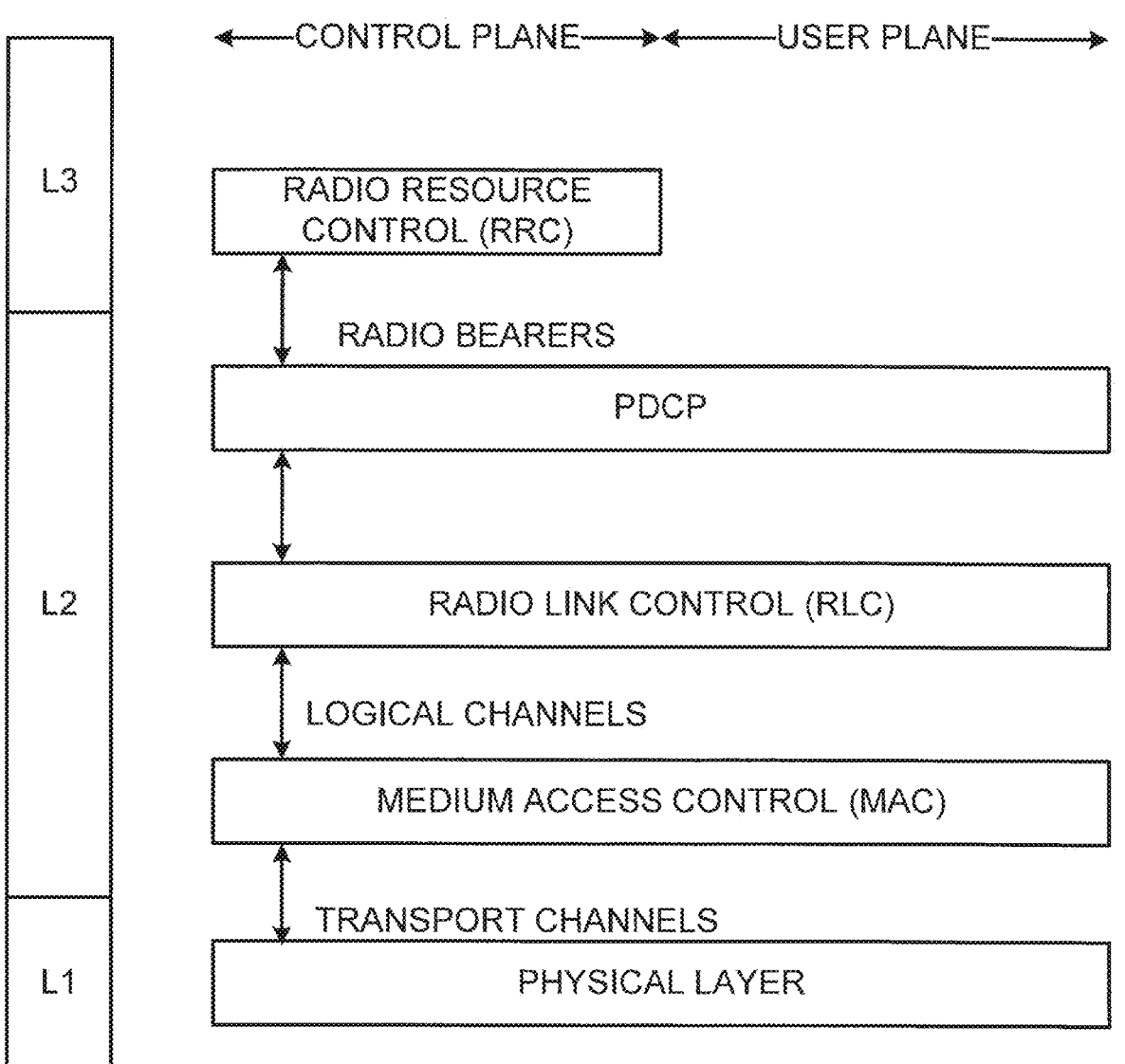
FIG. 10 is a diagrammatic view illustrating an example of a radio protocol architecture for the control and user planes in a mobile communications network.

FIG. 10 is a diagram illustrating an example of a radio protocol architecture for the control and user planes in a mobile communications network. The radio protocol architecture for the UE and/or the gNodeB may be shown with three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and/or gNodeB over the physical layer. In the user plane, the L2 layer may include a media access control (MAC) sublayer, a radio link control (RLC) sublayer, and a packet data convergence protocol (PDCP) sublayer, which are terminated at the gNodeB on the network side. Although not shown, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the IAB-nodes and/or the UE and an IAB-donor.

Addressing Backhaul Conditions with Autonomous Handover

Figure 11:
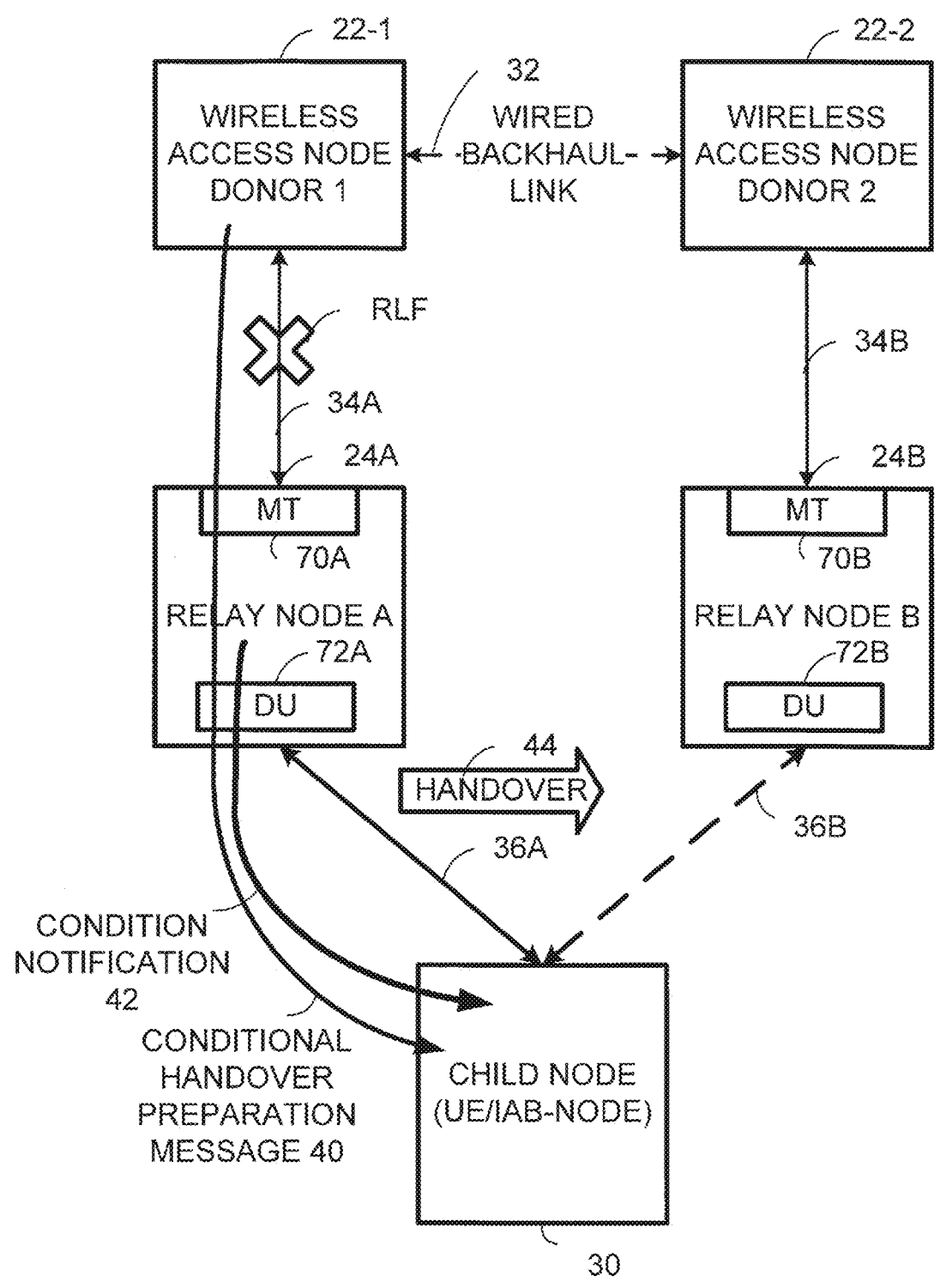
FIG. 11 is a diagrammatic view showing another example telecommunications system in which a conditional autonomous handover may be performed for resolving a wireless link backhaul condition.

FIG. 11 shows yet another example diagram of a telecommunications system 20 comprising wireless access node 22-1, also known as Donor node 1; wireless access node 22-2, also known as Donor node 2; IAB-node 24A, also known as Node A or relay node A; IAB-node 24B, also known as Node B or relay node B; and child node 1, also known as child node 30. The child node 30 may be, for example, a user equipment, UE, or Integrated Access and Backhaul (IAB) node, as previously described. The wireless access node 22-1 and wireless access node 22-2 may be connected by a wired backhaul link 32. The other elements of FIG. 11 may be connected by wireless backhaul links, e.g., the wireless access node 22-1 may be connected by wireless backhaul link 34A to IAB-node 24A; the wireless access node 22-2 may be connected by wireless backhaul link 34B to IAB-node 24B; the IAB-node 24A may be connected by wireless backhaul link 36A to child node 30; and the IAB-node 24B may be connected by 36B to child node 30.

The example embodiments and modes of FIG. 11-FIG. 15 concern addressing problematic conditions on a wireless backhaul link using an autonomous handover. In general terms, the wireless access node 22-1 generates and sends to child node 30 a message which comprises information configured to facilitate a conditional handover of the wireless terminal. As used herein, the terms "handover" and "handoff" may be used interchangeably, and generally involve transfer of a connection or communication, at least partially, from one node or set of nodes to another node. Although the message may be of any appropriate type and bear any suitable name, in an example embodiment and mode described herein the message is a reconfiguration message and, for sake of illustration, is arbitrarily and not exclusively known, and shown in FIG. 11, as the conditional handover preparation message 40. The information comprising such message, e.g., the conditional handover preparation message 40, includes at least one identity of a target cell and one or more conditions which at least partially enable the wireless terminal to perform a conditional handover autonomously. In some configurations, the identity of a target cell may comprise one of or a combination of: a physical cell identity (PCI), CellIdentity (a cell identifier to unambiguously identify a cell within a PLMN), a PLMN-identity, a tracking area identity, and a RAN area code. As understood herein, the one or more conditions include a reception of a notification from the wireless relay node, e.g., from IAB-node 24A. Such notification is also known herein and shown in FIG. 11 as condition notification 42, and may be notification of a problematic condition on a wireless backhaul link. Upon reception of the condition notification 42, the child node 30 may perform an autonomous handover, depicted as event 44 in FIG. 11. The performance of the autonomous handover 44 is based on, e.g., enabled by using at least, the information provided in the conditional handover preparation message 40.

Figure 12:
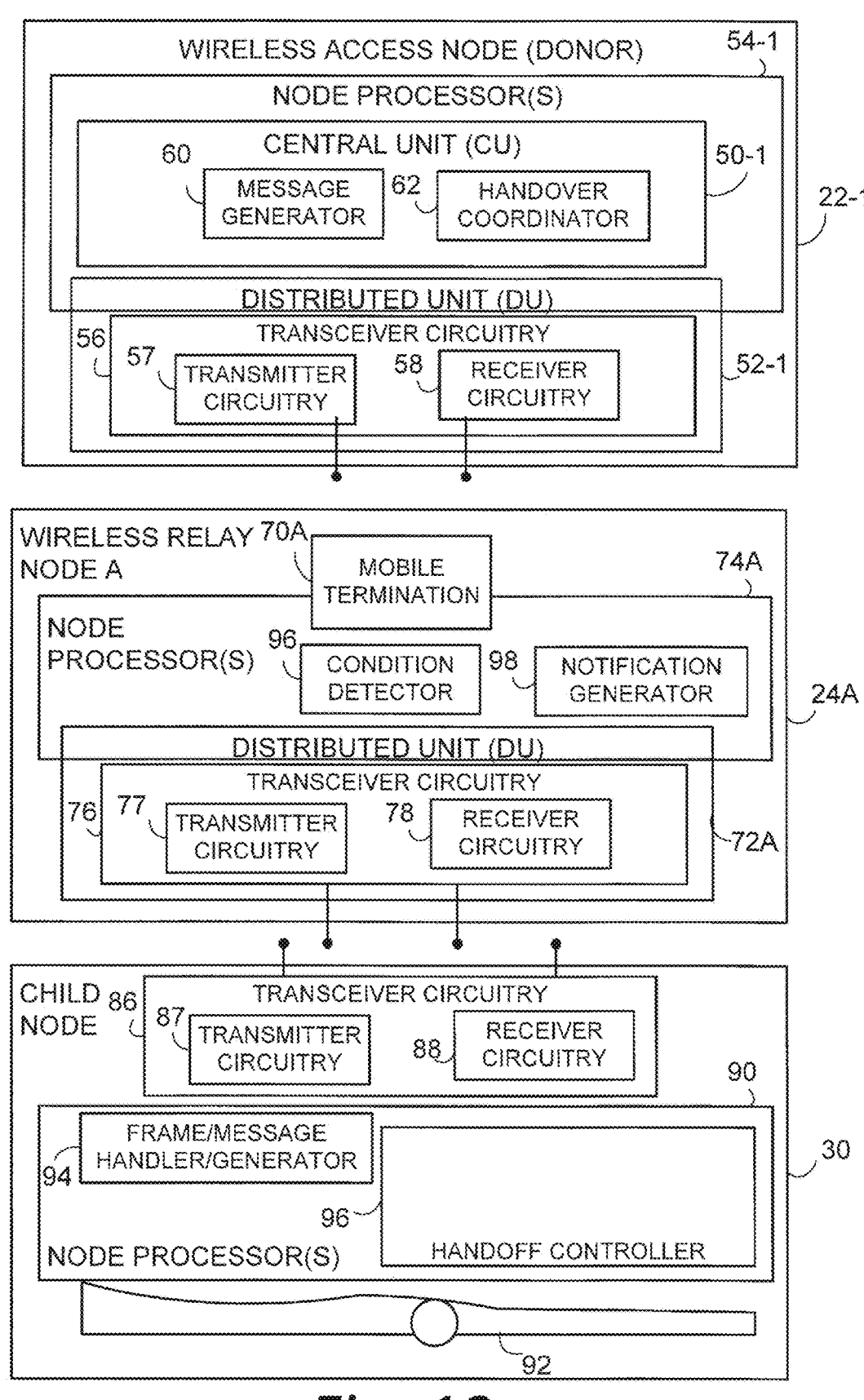
FIG. 12 is a diagrammatic view showing an example, non-limiting more detailed implementation of at least portions of the system of FIG. 11.
Figure 13:
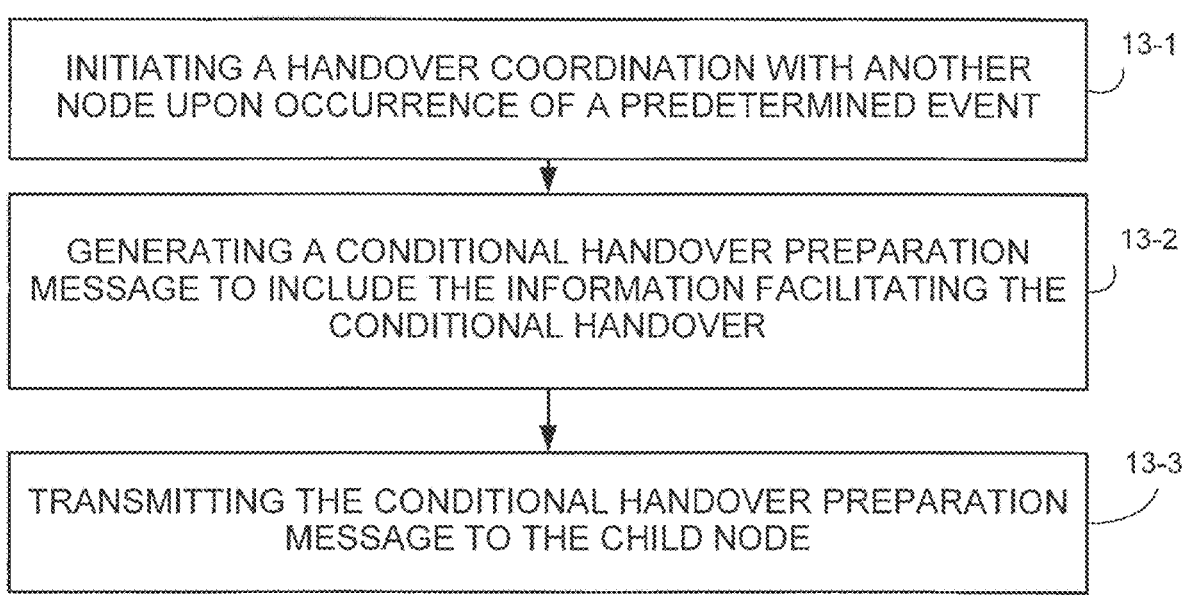
FIG. 13 is a flowchart showing example, non-limiting, basic acts or steps that may be performed by a wireless access node of FIG. 11.
Figure 14:
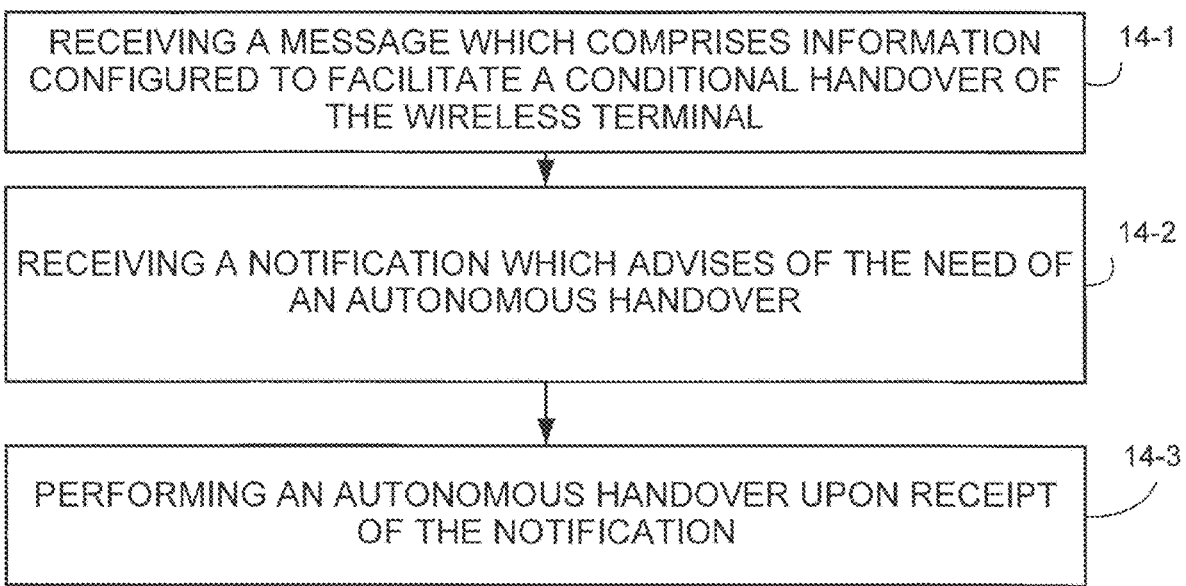
FIG. 14 is a flowchart showing example, non-limiting, basic acts or steps that may be performed by a child node of FIG. 11.

Various components and functionalities of the nodes shown in FIG. 11 are further shown in FIG. 12. FIG. 12 shows wireless access node 22-1 as comprising central unit 50-1 and distributed unit 52-1. The central unit 50-1 and distributed unit 52-1 may be realized by, e.g., be comprised of or include, one or more processor circuits, e.g., node processor(s) 54-1. The one or more node processor(s) 54-1 may be shared by central unit 50-1 and distributed unit 52-1, or each of central unit 50-1 and distributed unit 52-1 may comprise one or more node processor(s) 54-1. Moreover, central unit 50-1 and distributed unit 52-1 may be co-located at a same node site, or alternatively one or more distributed units 52- 2 may be located at sites remote from central unit 50-1 and connected thereto by a packet network. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 12, node processor(s) 54-1 of wireless access node 22-1 may comprise message generator 60 and handover coordinator 62. The message generator 60 serves to generate, e.g., the conditional handover preparation message 40 as described herein. As mentioned above, the conditional handover preparation message 40 includes information comprising at least one identity of a target cell and one or more conditions for the wireless terminal performing the conditional handover autonomously. The handover coordinator 62 serves to communicate with the target cell, e.g., with another node which may be involved in the handover, so that suitable information and preparation can be obtained for the handover. In the example scenario described herein, the target cell will be a cell served by wireless access node 22-2.

As shown in FIG. 12 the IAB-node 24A, also known as wireless relay node 24A, in an example embodiment and mode comprises relay node mobile termination unit 70A and relay node distributed unit 72A. The relay node mobile termination unit 70A and relay node distributed unit 72A may be realized by, e.g., by comprised of or include, one or more processor circuits, e.g., relay node processor(s) 74A. The one or more relay node processor(s) 74A may be shared by relay node mobile termination unit 70A and relay node distributed unit 72A, or each of relay node mobile termination unit 70A and relay node distributed unit 72A may comprise one or more relay node processor(s) 74A. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

FIG. 12 further shows that IAB-node 24A may comprise radio condition detector 80 and notification generator 82. Both condition detector 80 and notification generator 82 may be realized or comprised by relay node processor(s) 74. The notification generator 82 serves to generate the condition notification 42, based on a condition detected by condition detector 80.

Figure 15:
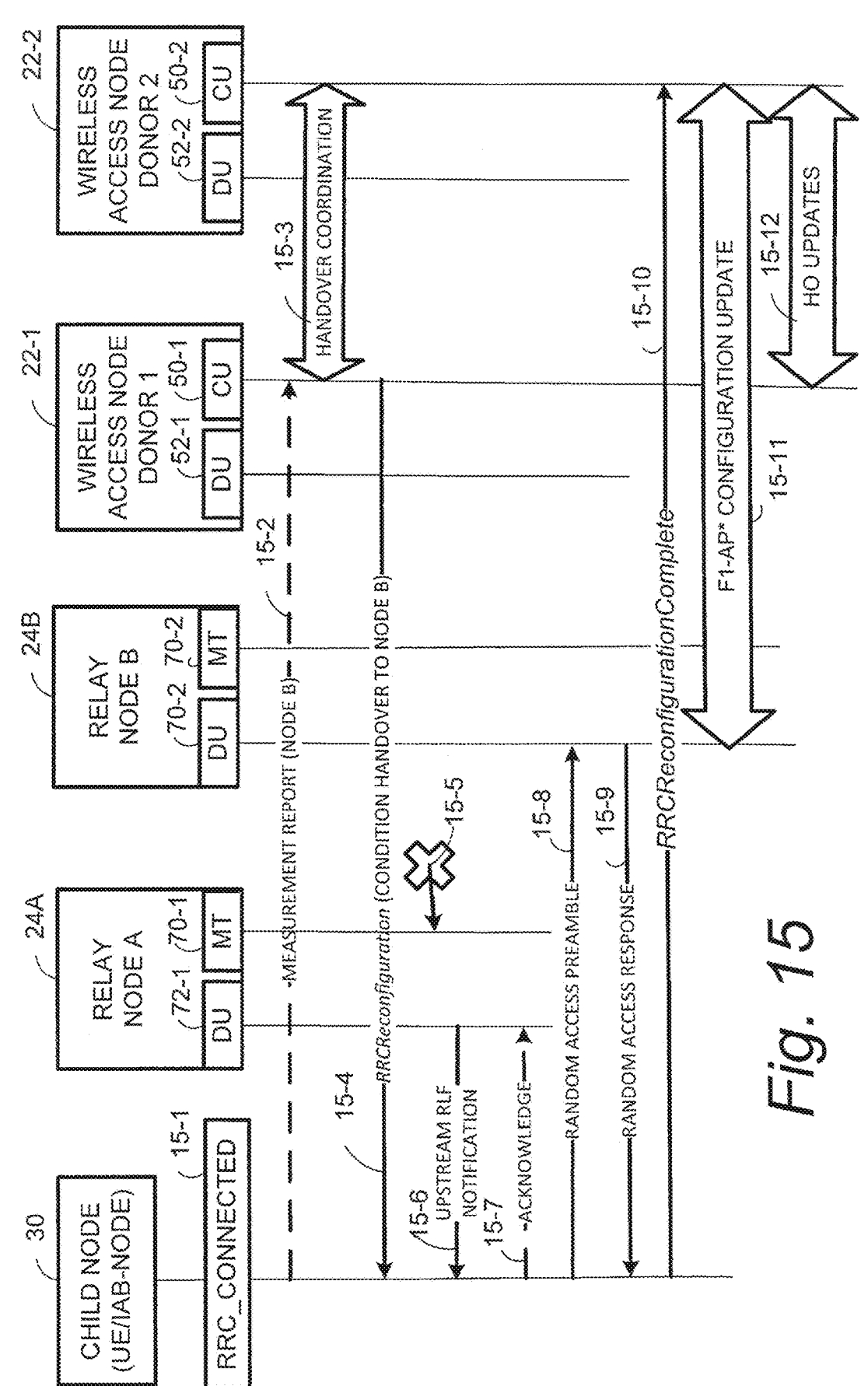
FIG. 15 depicts example, basic, representative acts or steps of a message flow for the system scenario shown in FIG. 11.

It should be understood that, although not illustrated in FIG. 12, the wireless access node 22-2 and IAB-node 24B of FIG. 11 and of FIG. 15 may have similar components and functionalities as the wireless access node 22-1 and IAB-node 24A, respectively, but with differently numbered/alphabetized suffixes denoting comparable components.

FIG. 12 shows child node 30 as comprising, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. FIG. 12 further shows child node 30, which (as indicated before) may be a user equipment or Integrated Access and Backhaul (IAB) node, as also comprising node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

In an example, non-limiting embodiment and mode shown in FIG. 12, the child node 30 may include frame/message generator/handler 94 and handover controller 96. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes, including but not limited to the conditional handover preparation message 40 and condition notification 42 described herein.

In a most basic example embodiment and mode, a wireless access node of the technology disclosed herein transmits a message which comprises information configured to facilitate a conditional handover of the wireless terminal, the information comprising at least one identity of a target cell and one or more conditions for the wireless terminal performing the conditional handover autonomously, the conditions including a reception of a notification from the wireless relay node. In a most basic example embodiment and mode of the technology disclosed herein, the wireless terminal, e.g., child node 30, receives such message.

Beyond the basic example embodiment and mode mentioned above, FIG. 13 shows further example, optional, non-limiting, basic acts or steps that may be performed by the wireless access node 22-1 of FIG. 11 and FIG. 12. Act 13-1 comprises initiating a handover coordination with another node upon occurrence of a predetermined event. In the example scenario described herein, the other node to be involved in the handover is wireless access node 22-2. The handover coordination of act 13-1 may be performed by handover coordinator 62, which works through a wired backhaul link interface to wireless access node 22-2. The predetermined event may be, for example, receipt of a measurement report from the wireless terminal, e.g., from child node 30, including a measurement regarding a signal received by the wireless terminal from another node, such as wireless access node 22-2. Act 13-2 comprises generating the conditional handover preparation message 40 to include the information facilitating the conditional handover 44. The conditional handover preparation message 40 may be generated, e.g., by message generator 60 of node processor(s) 54-1. Act 13-3 comprises sending or transmitting the conditional handover preparation message to child node 30, e.g., over the wireless backhaul links 34A and 36A and thus via IAB-node 24A.

Beyond the basic example embodiment and mode mentioned above, FIG. 14 shows further example, optional, non-limiting, basic acts or steps that may be performed by child node 30 of FIG. 11 and FIG. 12. Act 14-1 comprises receiving a message which comprises information configured to facilitate a conditional handover of the wireless terminal. Such message may be, for example, the conditional handover preparation message 40 described herein, which comprises at least one identity of a target cell and one or more conditions for the wireless terminal performing the conditional handover autonomously. Act 14-2 comprises receiving the condition notification 42 from an appropriate node, such as IAB-node 24A, which advises of the possible need of an autonomous handover. Act 14-3 comprises, upon receipt of the condition notification 42, performing an autonomous handover 44 to another node, e.g., to wireless access node 22-2 through IAB-node 24B.

In an example scenario shown in FIG. 11, IAB-node 24A, also known as Node A or wireless access node 24A, may detect a radio condition, such as a radio link failure, RLF, on the upstream link to its parent node, e.g. wireless access node 22-1 or Donor 1. In the example scenario of FIG. 11, the Child Node 30, which may be an IAB-node or an UE, was configured by the donor-node wireless access node 22-1 with a conditional handover, e.g., conditional handover preparation message 40 which may be a reconfiguration with sync, in advance, which allows the child node 30 to autonomously perform a handover to a designated cell when one or more conditions configured by the RRC of the Donor 1 are satisfied. In some configurations, the conditions may include reception of some of the aforementioned notifications from a parent node, such as Upstream RLF notification. When such conditions are met, the Child Node 1, e.g., child node 30, may start accessing the designated cell, e.g. Node B/Donor 2, also called IAB-node 24B/wireless access node 22-2, and perform a handover procedure. In one example embodiment and mode, the Donor nodes 1 and 2 may be physically collocated or even the same entity. In another example embodiment and mode, these two donor nodes, e.g., wireless access node 22-1 and wireless access node 22-2, may be separate nodes, mutually connected by a wired backhaul link, as shown in FIG. 11. It is assumed that prior to providing the configuration for the conditional handover to Child node 30, the two donor nodes wireless access node 22-1 and wireless access node 22-2 may perform negotiations/coordination with regard to the handover, e.g., act 11-3, described above.

FIG. 15 depicts an example message flow for the scenario shown in FIG. 11. In the situation of FIG. 15, the child node 30 is in connected mode as shown by act 15-1. As act 15-3 the currently serving donor node, Donor 1 or wireless access node 22-1, may start a handover coordination with a node serving a potential target cell, e.g., Donor 2 or wireless access node 22-2. The coordination of act 15-3 may comprise sharing of identifications of the Child Node 1, e.g., child node 30; security parameters; and radio link configurations. As shown in FIG. 15, the coordination of act 15-3 may be triggered by act 15-2, e.g., receipt of a measurement report(s) transmitted by the Child Node 1, wherein the child node 30 reports sufficient signal quality observed from the Node B, e.g., from IAB-node 24B.

After the coordination of act 15-3 is completed, as act 15-4 the Child Node 30 (in the RRC_CONNECTED state, as indicated by act 15-1) may receive the conditional handover preparation message 40. In an example embodiment and mode, the conditional handover preparation message 40 may be a RRCReconfiguration message comprising potential target cells, e.g. the cell served by Node B or IAB-node 24B, and one or more conditions for an autonomous handover. In the example flow of FIG. 15, the conditions may include a reception of the Upstream RLF notification. The other non-limiting examples of conditions may include or comprise signal quality thresholds for the downlink signals from the currently serving node, e.g., Node A=IAB-node 24A), as well as some of the other aforementioned notifications, such as Upstream Disconnect notification.

In the example flow shown in FIG. 15, as act 15-5 the Node A, e.g., IAB-node 24A, may detect an RLF on the upstream link, e.g., on wireless backhaul link 32. The condition on the wireless backhaul link 32 may be detected by the condition detector 80 of IAB-node 24A. The Node A may then send the Upstream RLF notification 42 to its child nodes/UEs, including the Child node 30. The condition notification 42 may be generated by notification generator 82. As optional act 15-7, Child node 30 may send back an acknowledgement. Moreover, due to the configured conditions, as act 15-8 the child node 30 may initiate a conditional handover to the configured target cell, e.g., in the example scenario, the cell served by IAB-node 24B, by performing a random access procedure. The random access procedure in which child node 30 participates comprises, as act 15-8, sending a Random Access Preamble message to IAB-node 24B and, as act 15-9, receiving a Random Access Response message from IAB-node 24B. Act 15-10 comprises the child node 30 sending a RRCReconfigurationComplete message to the donor of the target cell, e.g., Donor 2 =wireless access node 22-2 via Node B =IAB-node 24B. As act 15-11 wireless access node 22-2 may use F1-AP* to update the routing configurations at the Node B for the Child Node 1, e.g., at IAB-node 24B for child node 30, and as act 15-12 may interact with wireless access node 22-1 to report the completion of the conditional handover. The wireless access node 22-1 may then release the resources saved for child node 30.

Figure 16:
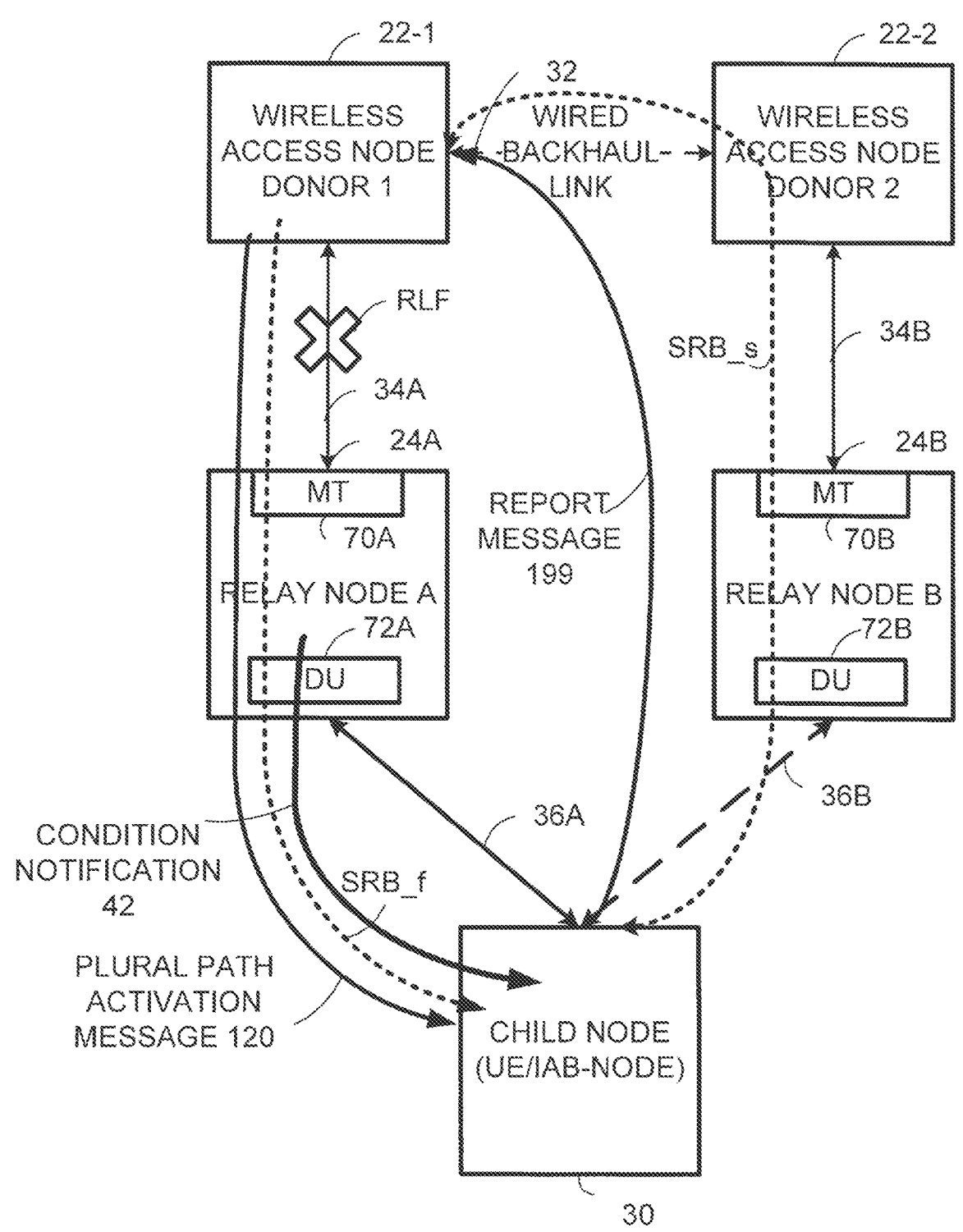
FIG. 16 is a diagrammatic view showing another example telecommunications system in wherein a wireless link backhaul condition may be resolved when redundant links are utilized.

Accordingly, in the example embodiment and mode of FIG. 11-FIG. 15, an IAB-node or a UE may be configured with a conditional handover with conditions, comprising a reception of a notification representing the radio condition of the upstream radio link of the parent node and at least one identification of a target node. Upon receiving such a notification, the IAB-node or the UE may then perform an autonomous handover to the cell served by the target node.
Addressing Backhaul Conditions Involving Redundant Connections FIG. 16 shows yet another example diagram of a telecommunications system 20 which, like the telecommunications system 20 of FIG. 15, comprises wireless access node 22-1, also known as Donor node 1; wireless access node 22-2, also known as Donor node 2; IAB-node 24A, also known as Node A or relay node A; IAB-node 24B, also known as Node B or relay node B; and child node 1, also known as child node 30. The child node 30 may be, for example, a user equipment, UE, or Integrated Access and Backhaul (IAB) node, as previously described. The wireless access node 22-1 and wireless access node 22-2 may be connected by a wired backhaul link 32. The other elements of FIG. 16 may be connected by wireless backhaul links, e.g., the wireless access node 22-1 may be connected by wireless backhaul link 34A to IAB-node 24A; the wireless access node 22-2 may be connected by wireless backhaul link 34B to IAB-node 24B; the IAB-node 24A may be connected by wireless backhaul link 36A to child node 30; and the IAB-node 24B may be connected by 36B to child node 30.

The example embodiments and modes of FIG. 16-FIG. 20A, FIG. 20B concern addressing problematic conditions on a wireless backhaul link using redundant links. In general terms, the wireless access node 22-1 generates and sends to child node 30 at message which comprises information configured to activate plural signaling data path, such as first signaling data path SRB_f and second signaling data path SRB_s shown in FIG. 16. The first signaling data path SRB_f is established between wireless access node 22-1 and the wireless terminal also known as child node 30, and has its signaling data routed via wireless access node 22-1 and IAB-node 24A. In one configuration, the second signaling data path SRB_s may be established between wireless access node 22-2 and child node 30 and has its signaling data relayed by IAB-node 24B. In another configuration (not shown in FIG. 16), the second signaling data path SRB_s may be established directly established between wireless access node 22-2 and child node 30 without being relayed by an IAB-node. It should be noted that either of the first or second signaling data path may be a master signaling radio bearer, e.g., the signaling data bearer that is established first, and the other signaling data path may be a secondary signaling radio bearer that may be added after the master signaling radio bearer is established.

Although the message(s) configured to activate the plural signaling data paths may be of any appropriate type and bear any suitable name, in an example embodiment and mode described herein the message is a reconfiguration message and, for sake of illustration, is arbitrarily and not exclusively known, and shown in FIG. 16, as the plural path activation message 140. The plural path activation message 140 is received by the child node 30, after which both the first signaling data path SRB_f and the second signaling data path SRB_s are activated. Should the child node 30 thereafter receive a notification from the IAB-node 24A, the child node 30 may generate a report message (also referred as a failure information message) and transmit the message through the second signaling path SRB_s. The report message may include information based on the notification, and the notification may be based on a radio condition detected on the first signaling data path.

Figure 17:
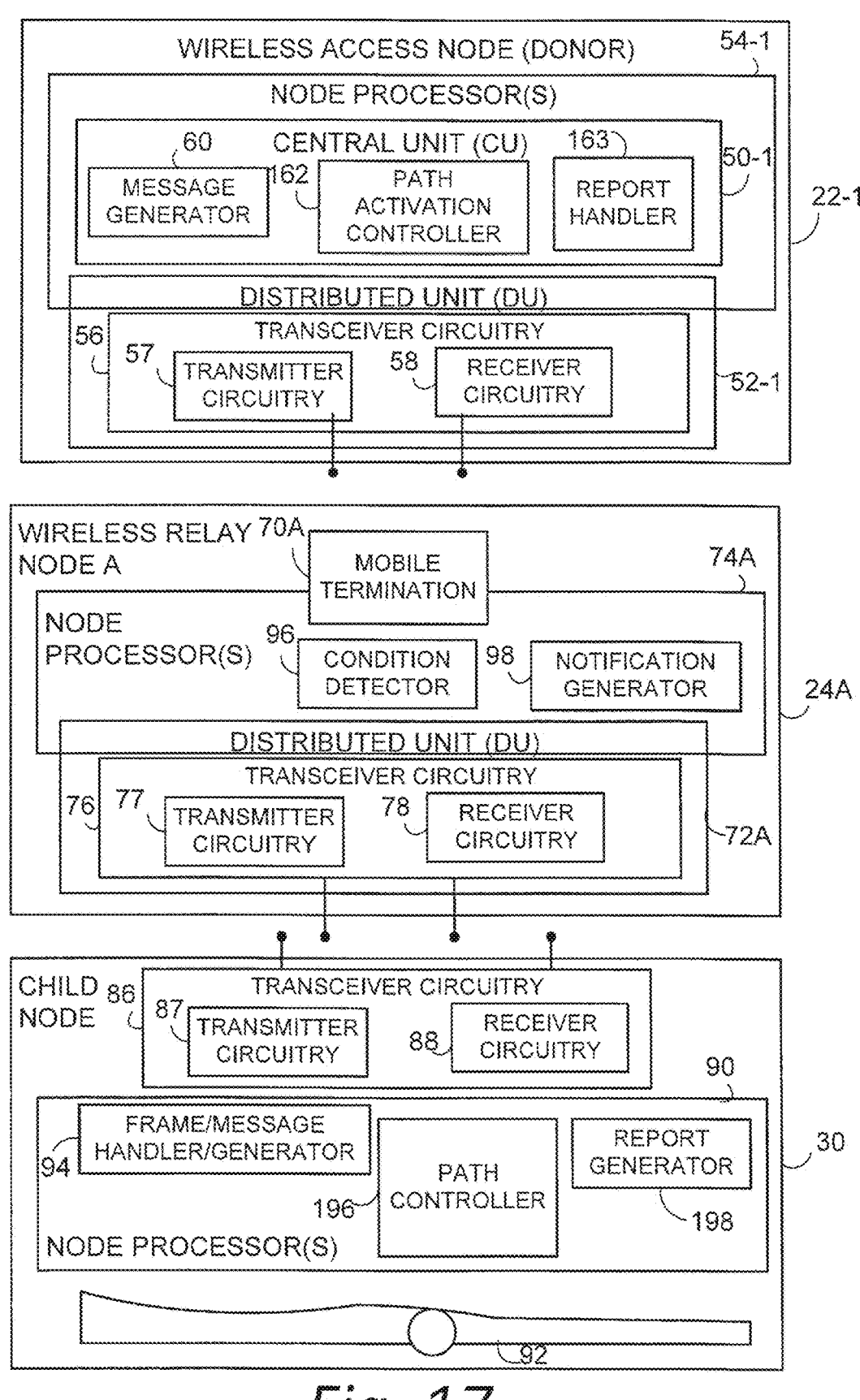
FIG. 17 is a diagrammatic view showing an example, non-limiting more detailed implementation of at least portions of the system of FIG. 16.

Various components and functionalities of the nodes shown in FIG. 16 are further shown in FIG. 17. Components of FIG. 17 which have similar names to the components of FIG. 12 also have comparable function. FIG. 17 shows wireless access node 22-1 as comprising central unit 50-1 and distributed unit 52-1. The central unit 50-1 and distributed unit 52-1 may be realized by, e.g., by comprised of or include one or more processor circuits, e.g., node processor(s) 54-1. The one or more node processor(s) 54-1 may be shared by central unit 50-1 and distributed unit 52-1 or each of central unit 50-1 and distributed unit 52-1 may comprise one or more node processor(s) 54-1. Moreover, central unit 50-1 and distributed unit 52-1 maybe co-located at a same node site, or alternatively one or more distributed units 52- 2 may be located at sites remote from central unit 50-1 and connected thereto by a packet network. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 17, node processor(s) 54-1 of wireless access node 22-1 may comprise message generator 60; plural path controller 162; and report handler 163. The message generator 60 serves to generate, e.g., plural path activation message 140 as described herein. The plural path controller 162 serves, e.g., to activate the plural paths, including first signaling data path SRB_f and second signaling data path SRB_s. The report handler 163 is configured to receive and process a report from child node 30 which is based on a notification representing a radio condition detected on one of the signaling data paths.

As shown in FIG. 17 the IAB-node 24A, also known as wireless relay node 24A, in an example embodiment and mode comprises relay mobile termination unit 70A and relay distributed unit 72A. The relay mobile termination unit 70A and relay distributed unit 72A may be realized by, e.g., by comprised of or include one or more processor circuits, e.g., relay node processor(s) 74A. The one or more relay node processor(s) 74A may be shared by relay mobile termination unit 70A and relay distributed unit 72A, or each of mobile termination unit 70A and distributed unit 72A may comprise one or more relay node processor(s) 74A. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

FIG. 17 further shows that IAB-node 24A may comprise radio condition detector 80 and notification generator 82. Both condition detector 80 and notification generator 82 may be realized or comprised by relay node processor(s) 74. The notification generator 82 serves to generate the condition notification 42, based on a condition detected by condition detector 80.

It should be understood that, although not illustrated in FIG. 17, the wireless access node 22-2 and IAB-node 24B of FIG. 16 and of FIG. 17 may have similar components and functionalities as the wireless access node 22-1 and IAB-node 24A, respectively, but with differently numbered/ alphabetized suffixes denoting comparable components.

FIG. 17 shows child node 30 as comprising, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. FIG. 17 further shows child node 30, which (as indicated before) may be a user equipment or Integrated Access and Backhaul (IAB) node, as also comprising node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

In an example, non-limiting embodiment and mode shown in FIG. 17, the child node 30 may include frame/message generator/handler 94; path controller 196; and report generator 198. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes, including but not limited to incoming messages such as the plural path activation message 140 and condition notification 42 described herein, as well as outgoing messages such as a report message 199 generated by report generator 198. The path controller 196 works in conjunction with establishing, activating, and deactivating signaling data paths in which child node 30 participates, such as first signaling data path SRB_f and second signaling data path SRB_s.

In a most basic example embodiment and mode, a wireless access node of the technology disclosed herein transmits at least one message which activates a first signaling data path and a second signaling data path. The first signaling data path, e.g., first signaling data path SRB_f, and the second signaling data path, e.g., second signaling data path SRB_s, are both established between the wireless access node, e.g., wireless access node 22-1, and the wireless terminal, e.g., child node 30. Signaling data on the first signaling data path is relayed by a wireless relay node, e.g., IAB-node 24A. In a most basic example embodiment and mode of the technology disclosed herein, the wireless terminal, e.g., child node 30, receives such message. Further, the child node 30 may, as a condition on the first signaling data path SRB_f arises, processes a notification received from the wireless relay node and, upon reception of the notification, transmit a report message to the wireless access node on the second signaling data path. The report message comprises information based on the notification, and the notification is based on a radio condition detected on the first signaling data path.

Beyond the basic example embodiment and mode mentioned above, FIG. 18 shows further example, non-limiting, basic acts or steps that may be performed by the wireless access node 22-1 of FIG. 16 and FIG. 17. Act 18-1 comprises generating the at least one message, e.g., the message(s) being configured to activate a first signaling data path and a second signaling data path. As mentioned above, the first signaling data path and the second signaling data path are established between the wireless access node and the wireless terminal, and the signaling data on the second signaling data path is relayed by a wireless relay node. The message(s) of act 18-1, which may be termed as the plural path activation message(s) 140, may be generated by message generator 60. Act 18-2 comprises transmitting the at least one message(s), e.g., the plural path activation message 140, to the child node 30. The plural path activation message 140 may be transmitted by the transmitter circuitry 57 of wireless access node 22-1.

A problematic condition may thereafter arise, and for sake of example is illustrated herein as a radio link failure occurring on first signaling data path SRB_f. Act 18-3 comprises the wireless access node 22-1 receiving a report from child node 30, and in particular receiving a report message comprising information based on a notification received by child node 30. The notification is preferably based on a radio condition detected on the first signaling data path. Such notification may be the condition notification 42 described herein. The report message, e.g., report message 199, may be received by receiver circuitry 58 and handled by report handler 163. Act 18-4 comprises determining and/or performing an action based on the report message. An example of such an action for act 18-4 may be, for example, deactivating the first signaling data path SRB_f.

Beyond the basic example embodiment and mode mentioned above, FIG. 19 shows further example, non-limiting, basic acts or steps that may be performed by child node 30 of FIG. 16 and FIG. 17. Act 19-1 comprises receiving a message which activates a first signaling data path and a second signaling data path, e.g., the first signaling data path SRB_f and the second signaling data path SRB_s. Act 19-2 comprises receiving a notification of a condition detected on the first signaling data path SRB_f. The message of act 19-1 may be the plural path activation message 140 described herein, generated by wireless access node 22-1; the message of act 19-2 may be the condition notification 42 described herein, generated by IAB-node 24A. The messages of both act 19-1 and act 19-2 may be received through receiver circuitry 88 and processed by frame/message generator/handler 94. Act 19-3 comprises, upon reception of the notification of act 19-2, transmitting a report message to the wireless access node. The report message comprises information based on the notification; the notification is based on a radio condition detected on the first signaling data path.

In an example scenario shown in FIG. 16, child node 30, e.g., Child Node 1, which may be an IAB-node or a UE, establishes redundant connections, i.e., multiple connections or simultaneous connections, such as Dual Connectivity (DC), for at least the signaling radio bearer (SRB), and possibly the data radio bearers (DRBs) as well. In the scenario of FIG. 16, the SRB may be carried by two or more separate paths: (1) signaling data path SRB_f which includes wireless access node 22-1, IAB-node 24A, and child node 30, e.g., Donor 1—Node A—Child Node 1(SRB_f) and (2) signaling data path SRB_s which involves wireless access node 22-1, wireless access node 22-2, IAB-node 24B, and 30, e.g., Donor1—Donor2—Node B—Child Node 1(SRB_s). In one configuration, the wireless access node 22-1, e.g., Donor 1, may act as a master node while wireless access node 22-2, e.g., Donor 2, may behave as a secondary or slave node. In another configuration, the wireless access node 22-1, e.g., Donor 1, may act as a secondary or slave node while wireless access node 22-2, e.g., Donor 2, may behave as a master node. In one configuration, signaling data may duplicated and transmitted on the multiple paths, e.g., on first signaling data path SRB_f and second signaling data path SRB_s. In another configuration, packets for signaling data are split into the two paths, e.g., first signaling data path SRB_f and second signaling data path SRB_s, for increased throughput.

After establishing an RRC connection to wireless access node 22-1, e.g., to Donor 1, the Child Node 30 may be provisioned with a configuration with a secondary cell served by the wireless access node 22-2 and IAB-node 24B. Following the configuration, the Child Node 30 may use the multiple paths for transmitting/receiving signaling bearer (and possibly data bearers). In the present example embodiment and mode, at least one of the parent nodes of the Child node 30 may send some of the aforementioned notifications representing the radio condition of its upstream radio link. That is, either IAB-node 24A or IAB-node 24B may send such notifications as and when the radio condition(s) occur. For example, similar to the previously disclosed embodiments, when detecting a radio link failure (RLF) on the upstream radio link of IAB-node 24A, the IAB-node 24A may send the Upstream RLF notification to its child nodes including the Child Node 30. In this case, the Child Node 30 may attempt to report this event to at least one of the serving donors using a path not affected by the RLF. In the scenario shown in the FIG. 16, the Child Node 30 may use the path SRB_s to send the report to the wireless access node 22-2 through the IAB-node 24B. In some example configurations, the report may be also conveyed to the wireless access node 22-1, e.g., to Donor 1, which may decide to reconfigure updated redundant connections to the Child Node 30.

Figure 20A:
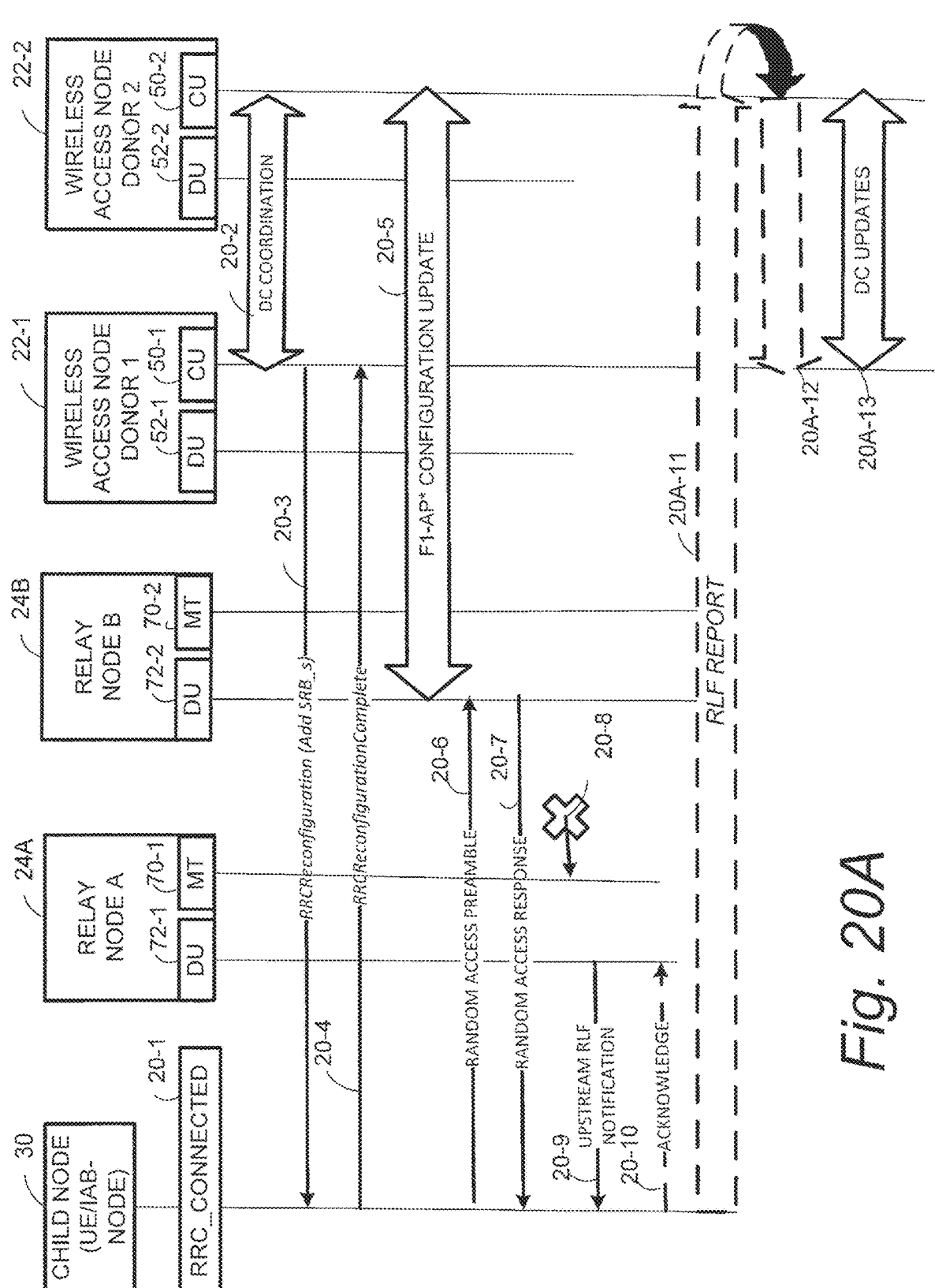
FIG. 20A depicts example, basic, representative acts or steps of a message flow for a first example system scenario shown in FIG. 16.

FIG. 20A shows an example message flow for the scenario shown in FIG. 16, where the Child Node 30 may first establish an RRC connection with the Donor 1, which results in setting up the SRB_f. While the Child node 30 is in RRC_CONNECTED (depicted as act 20-1 in FIG. 20A), the wireless access node 22-1 may decide to configure an additional connection and, as represented by act 20-2, start a coordination with wireless access node 22-2. It should be noted that, similar to the previously disclosed embodiment, the wireless access node 22-1 and the wireless access node 22-2 may be physically collocated or separated entities, or even the same entity. As act 10-3 wireless access node 22-1 may send to the Child Node 30 RRCReconfiguration comprising a configuration to add a new SRB (SRB_s) and an identity of the cell to serve SRB_s, the identity of the cell served by IAB-node 24B. As act 20-4 Child Node 30 may then acknowledge to RRCReconfiguration by sending a RRCReconfigurationComplete message. As act 20-5 wireless access node 22-2 may use F1-AP* to update the routing configurations at the Node B, e.g., at IAB-node 24B, for the Child Node 30.

As act 20-6 the child node 30 may initiate a random access procedure by sending a Random Access Preamble message, and as act 20-7 may receive a Random Access Response message. The random access procedure of act 20-6 and act 207 serves to synchronize child node 30 to the IAB-node 24B.

Eventually, as act 20-8, IAB-node 24A may detect a specified radio condition on its upstream link. In the example scenario shown in FIG. 20A, the specified upstream condition may be a radio link failure (RLF), but could be other radio link condition(s) as well. Act 20-9 comprises IAB-node 24A sending a notification, e.g., condition notification 42, to child node 30. In the example scenario shown in FIG. 20A, in which the specified upstream condition may be a radio link failure (RLF), the condition notification 42 may be an Upstream RLF notification which may be sent to child nodes/UEs of IAB-node 24A, including but not necessarily limited to Child Node 30. As act 20-10 Child Node 30 may send back an acknowledgement of the condition notification 42 to IAB-node 24A. Further, upon receipt of the notification of act 20-9, e.g., upon receipt of condition notification 42, as act 20-11 the child node 30 may generate and transmit a report message reporting the RLF occurring on the path for SRB_f. The report message 199 may be generated by report generator 198 upon receipt of the condition notification 42.

In one example embodiment and mode shown in FIG. 20A, the report message of act 20-11 is an RRC message of act 20-11 directed to the Donor 1, e.g., to wireless access node 22-1. As Act 20A-12, the Donor 2, e.g., wireless access node 22-2, may transfer the report message to the Donor 1 using an inter-node message on the wired backhaul link 32. Upon receipt of the report message, the Donor 1 may coordinate with the Donor 2 to deactivate the problematic signaling data path (e.g. the first signaling data path SRB_f), as shown in Act 20A-13. In one implementation, the wireless access node 22-1 aka Donor 1, now recognizing that SRB_f is torn down, may reconfigure the Child Node 30 with a new SRB configuration, e.g. releasing SRB_f. by sending another RRCReconfiguration. In parallel, wireless access node 22-1 may also use the F1-AP* to update the routing configuration of the Child Node 30, if the Child Node 30 is an IAB-node.

Figure 20B:
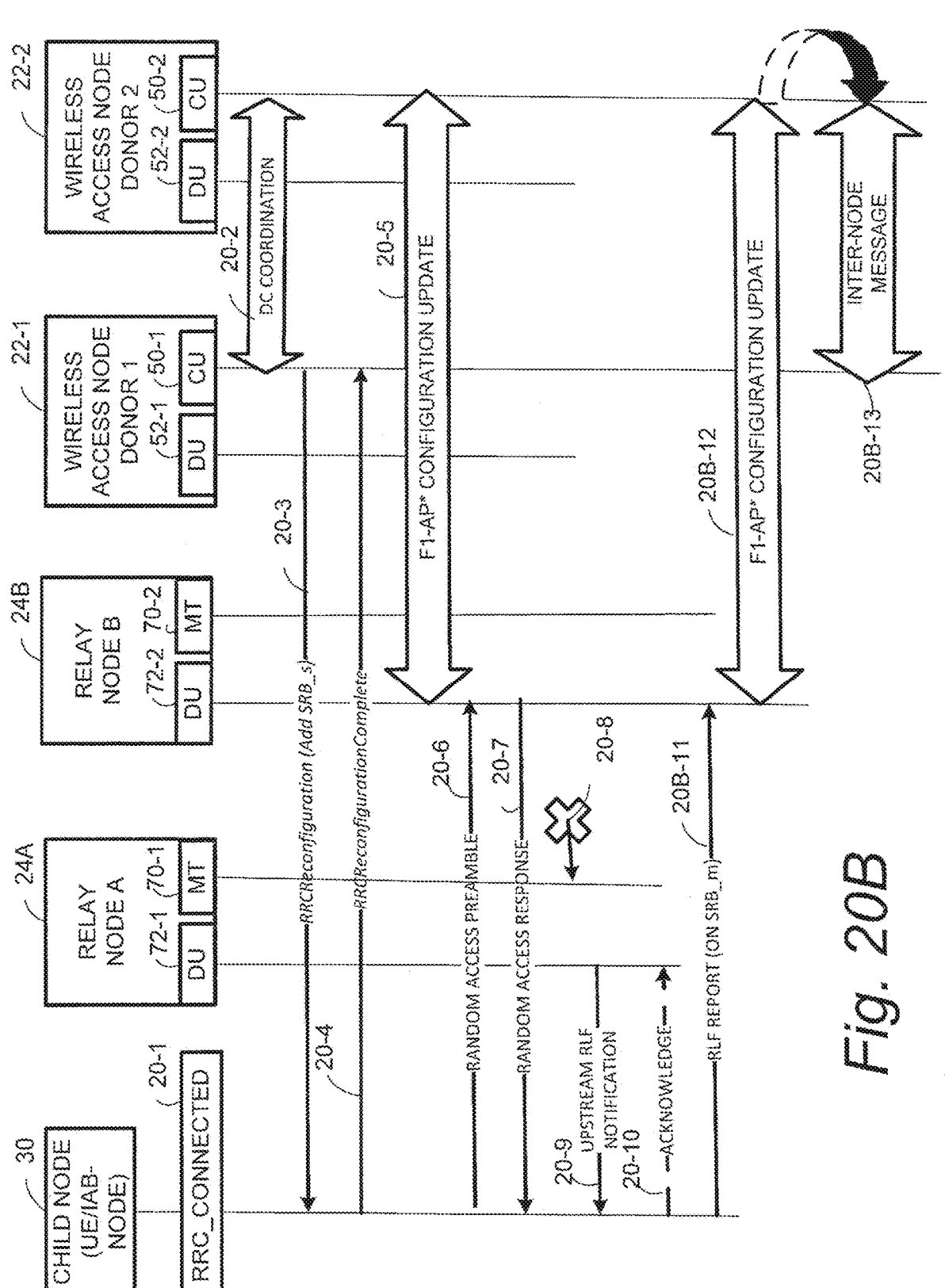
FIG. 20B depicts example, basic, representative acts or steps of a message flow for a first example system scenario shown in FIG. 16.

In another example embodiment and mode shown in FIG. 20B, the report message 42 of act 20B-11 is addressed to the parent node, e.g., IAB-node 24B using the Adaptation Layer, the RLC Layer, the MAC Layer or the physical layer signaling. Then, as act 20B-12, the parent node IAB-node 24B may convey the report message using a protocol, e.g., F1-AP*, to the Donor 2, e.g., to wireless access node 22-2. As act 20B-13 the wireless access node 22-2 may redirect the report message to the Donor 1, e.g., wireless access node 22-1, using an inter-node message on the wired backhaul link 32. Similar to the previous embodiment and mode shown in FIG. 20A, in one implementation, the wireless access node 22-1 aka Donor 1, now recognizing that SRB_f is torn down, may reconfigure the Child Node 30 with a new SRB configuration, e.g. releasing SRB_f. by sending another RRCReconfiguration. In parallel, wireless access node 22-1 may also use the F1-AP* to update the routing configuration of the Child Node 30, if the Child Node 30 is an IAB-node.

In either the example embodiment and mode of FIG. 20A or the example embodiment and mode of FIG. 20B, upon receipt of the report message 199 the wireless access node 22-1 may take appropriate action, such as for example, deactivating the first signaling data path SRB_f.

In one example embodiment and mode, the Child Node is preconfigured to send the report message upon receiving one of designated notifications from the parent node, e.g., from IAB-node 24A. In another example embodiment and mode, the Child Node is configured by an IAB-donor node to send the report message upon receiving one of designated notifications. In this latter case, RRCReconfiguration may be used to configure the designated notifications for sending report message.

Accordingly, in the example embodiment and mode of FIG. 16-FIG. 20A and FIG. 20B, an IAB-node or a UE configured with multiple radio paths for the signaling radio bearer(s) may receive from one parent node a notification representing the radio condition of the upstream radio link of one of the parent nodes. The IAB-node or the UE may use one or more other radio paths to send a report message reporting the radio condition to at least one IAB-donor node. The IAB-donor node that receives the report message may initiate reconfiguration for updated topology and/or routing of the relay network accordingly.

Preventing Routing Loops in Cell Selection

Figure 21:
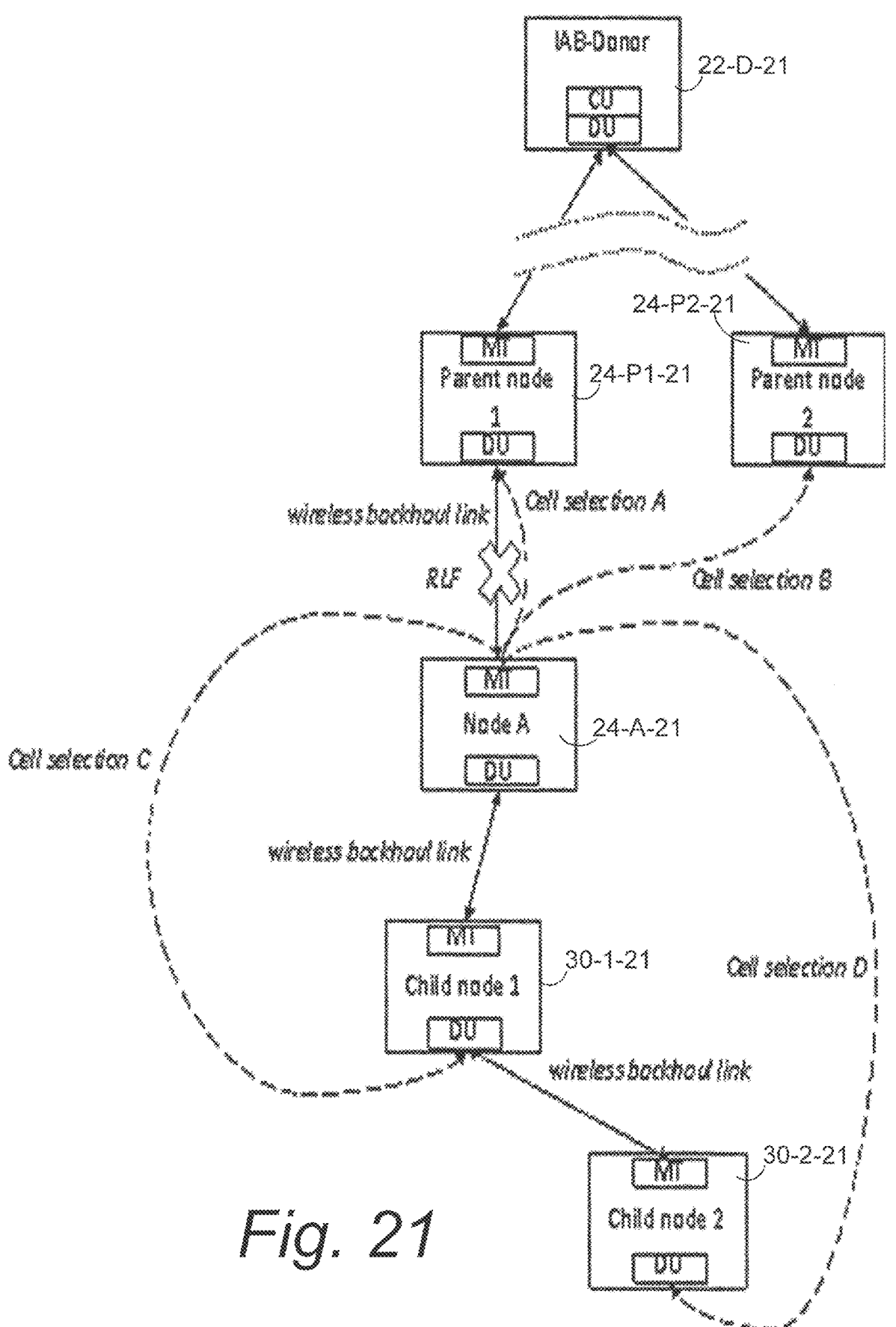
FIG. 21 is a diagrammatic view showing another example telecommunications system wherein a routing loop may occur upon cell selection.

As disclosed in the aforementioned embodiments and modes, the MT part of an IAB-node may perform a cell selection procedure upon detecting a Radio Link Failure, RLF, on its upstream radio link. FIG. 21 illustrates an example scenario, where Node 24-A-21, an IAB-node, detects an RLF on the backhaul radio link to the current parent node (Parent node 22-P1-21). Eventually Node 24-A-21 may start to perform the cell selection procedure, attempting to find a suitable cell with sufficient signal quality. As a result of the cell selection, the MT part of Node 24-A-21 may be able to find the original parent node (Parent node 24-P1-21) that served before the RLF (Cell Selection A in FIG. 21). In this case, Node 24-A-21 may initiate the RRC reestablishment procedure shown in FIG. 22A by sending RRCReestablishmentRequest to the IAB-donor 22-D-21 via Parent node 22-P1-21, in order to recover the broken upstream link. Upon receiving the RRCReestablishmentRequest, the IAB-donor 22-D-21 may retrieve the connection context (e.g. security keys, etc.) for the MT part of Node 24-A-21, and then may respond to Node 24-A-21 with RRCReestablishment, Node 24-A-21 may complete the RRC reestablishment procedure by sending RRCReestablishmentComplete.

Figure 22A:
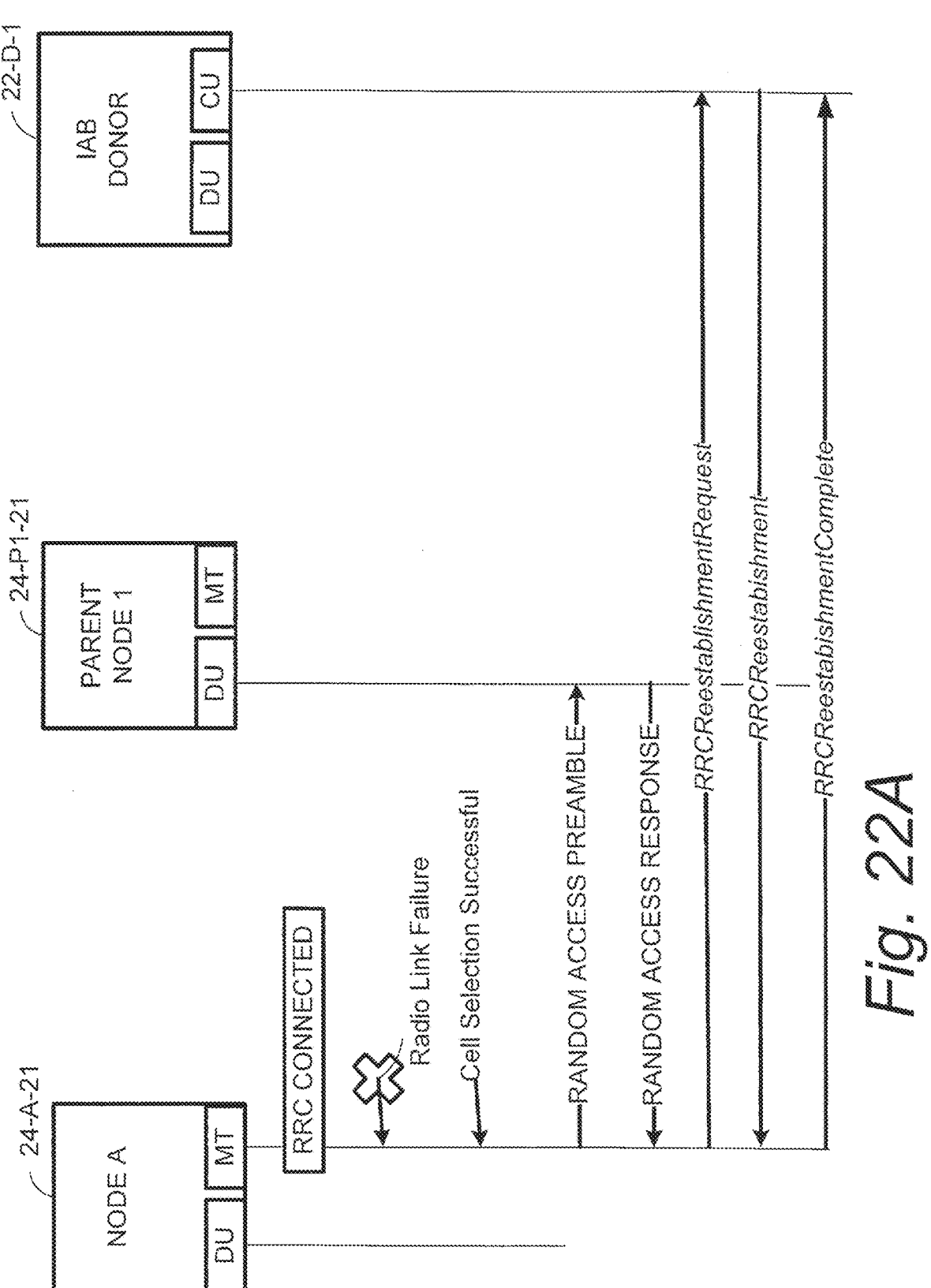
FIG. 22A depicts example, basic, representative acts or steps of a message flow in a situation in which an IAB node of FIG. 21 may recover from a broken upstream link by an RRC reestablishment procedure with a first parent IAB node.
Figure 22B:
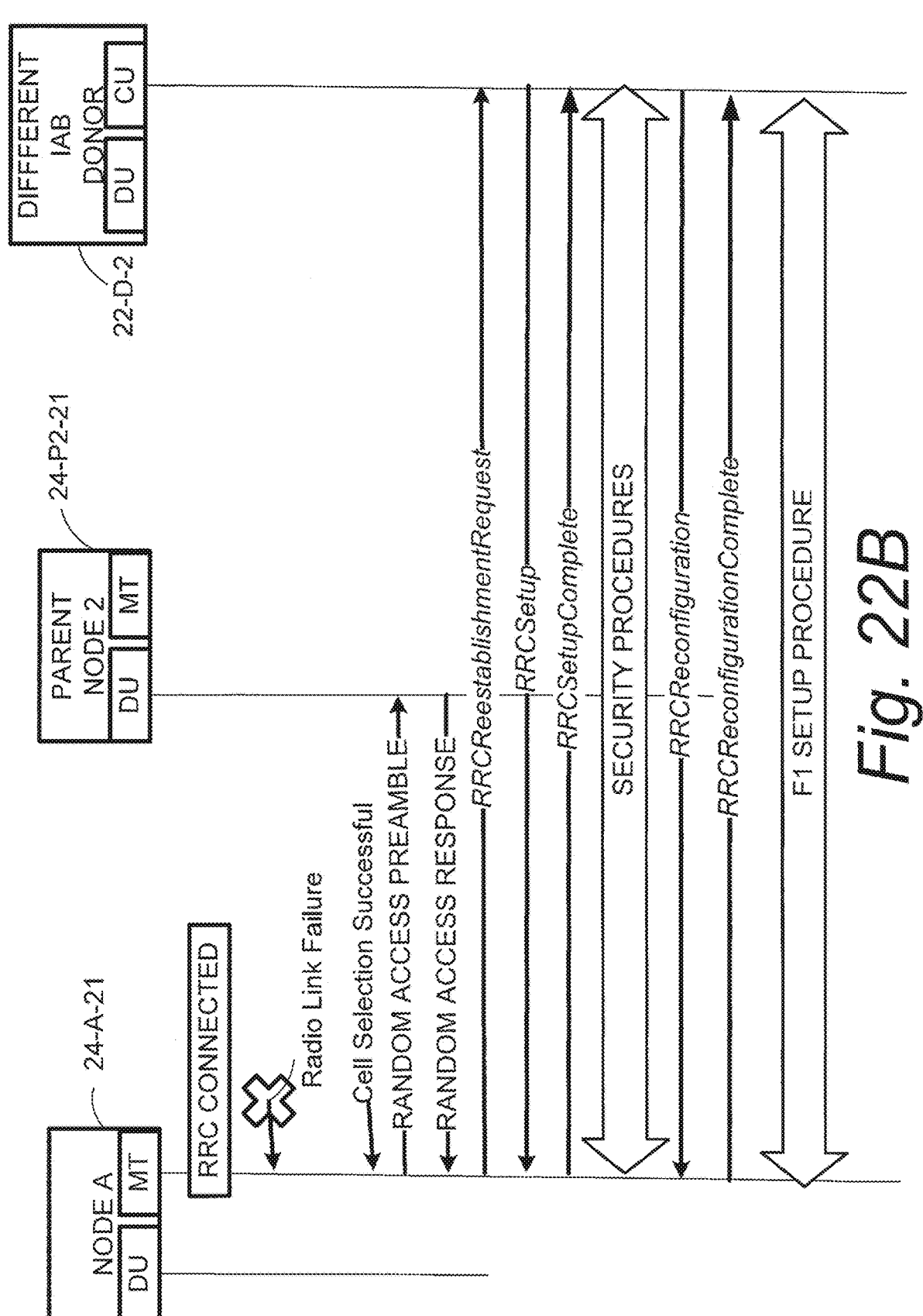
FIG. 22B depicts example, basic, representative acts or steps of a message flow in a situation in which an IAB node of FIG. 21 may recover from a broken upstream link by an RRC reestablishment procedure with a second parent IAB node.

If Node 24-A-21 fails to find the original parent and selects another parent node (e.g. Cell selection B to Parent node 24-P2-21 in FIG. 21), the MT part of Node 24-A-21 may initiate the RRC reestablishment procedure, similar to the cell selection case of FIG. 22A. In this case, if Parent node 24-P2-21 is connected to the same IAB-donor 22-D-21, or if Parent node 24-P2-21 is connected to a different IAB-donor (not illustrated) and the different IAB-donor is able to retrieve the connection context for the MT part of Node 24-A-21, the RRC establishment procedure may be successfully performed in a way similar to the flow shown in FIG. 22A. If the different IAB-donor fails to retrieve the connection context, the different IAB-donor and Node 24-A-21 may follow the message flow shown in FIG. 22B where the IAB-donor may respond back to Node 24-A-21 with RRCSetup, to setup a brand-new RRC connection, and in turn, Node 24-A-21 may send RRCSetupComplete, followed by the security procedure, similar to the flow shown in FIG. 6B.

It should be noted that, upon detecting the RLF, Node 24-A-21 may or may not immediately transmit the aforementioned upstream RLF notification to its child nodes (e.g. Child node 30-1-21 in FIG. 21). Transmission of the upstream RLF notification may be determined based on previously disclosed embodiments.

FIG. 21 also serves to illustrate a potential problematic situation wherein, during the cell selection procedure, Node 24-A-21 ends up with discovering downlink broadcast transmission (synchronization signals, system information, etc.) from the DU parts of its child nodes (e.g., Child node 30-1-21, as shown by the arrow labeled "Cell selection C") or from the DU parts of its grandchild nodes (Child node 30-2-21, as shown by the arrow labeled "Cell selection D"). In such a situation, without proper configurations, Node 24-A-21 may not be able to recognize that the downlink broadcast transmission is indeed from a (grand)child IAB-node in its own downstream path. As a result, if the signal quality is sufficient, Node 24-A-21 may choose to camp on the (grand)child node, and eventually any signaling (e.g. RRC, F1AP, etc.) addressed to the IAB-donor would be circulated in a closed loop. A closed loop in a relay network may be referred as a "routing loop", and the network topology that forms a routing loop may be referred as loop topology.

Figure 23:
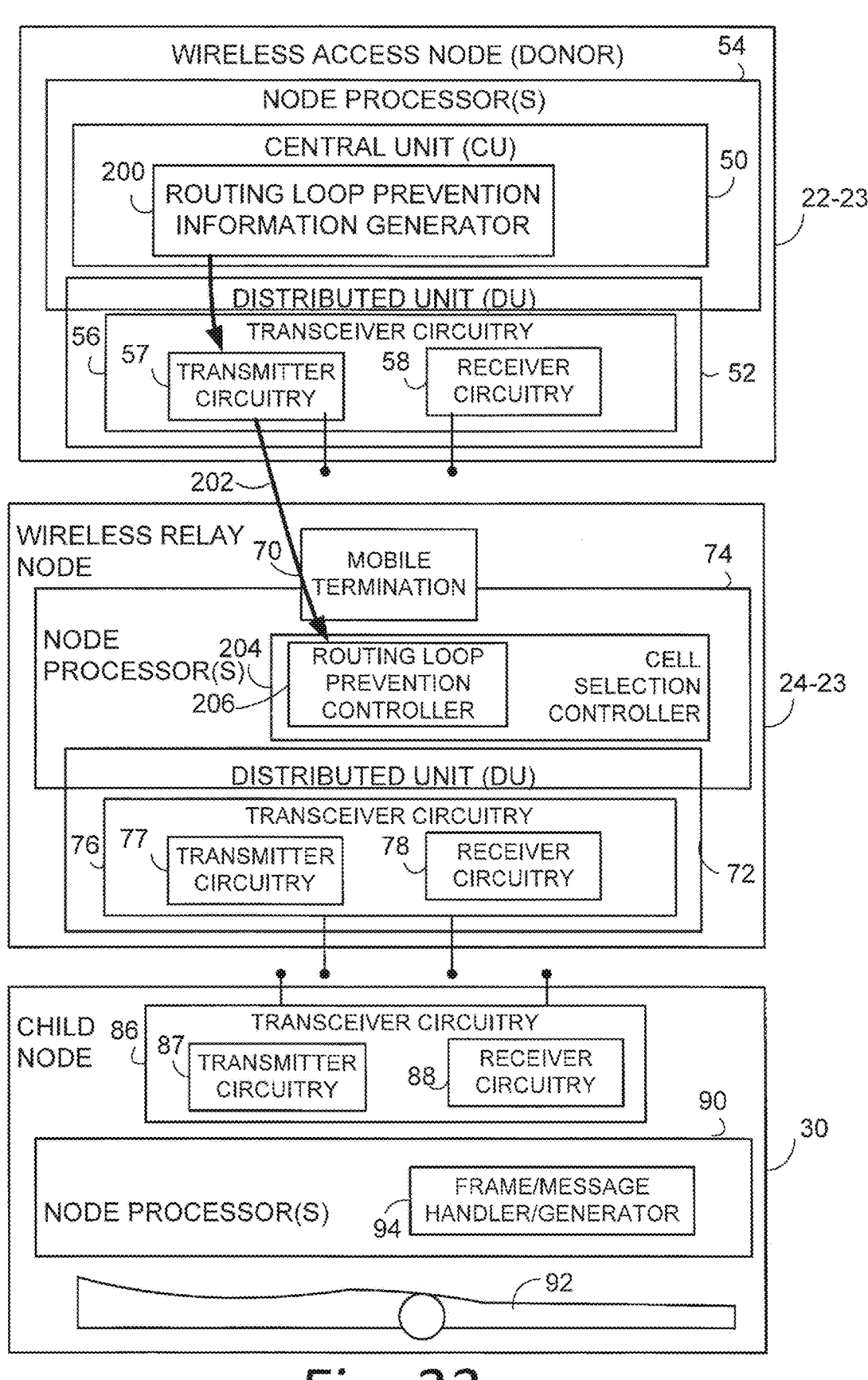
FIG. 23 is a diagrammatic view showing another example telecommunications system, and particularly an example telecommunications system wherein generic routing loop prevention information is used to address a potential routing loop problem.

Various embodiments and modes described herein are configured to address and/or combat the routing loop problem. FIG. 23 shows a telecommunication system 20-23 which generically addresses a potential routing loop situation using routing loop prevention information that may be utilized by an Integrated Access and Backhaul (IAB) node in order to prevent the node from selecting a cell of one of its children or grandchildren nodes. Components of FIG. 23 which have similar names to the components of FIG. 12 and/or FIG. 17 also have comparable function, unless otherwise noted or clear from the context.

FIG. 23 shows wireless access node 22-23, also known as IAB-donor node 22-23, as comprising central unit 50 and distributed unit 52. The central unit 50 and distributed unit 52 may be realized by, e.g., by comprised of or include one or more processor circuits, e.g., node processor(s) 54-1. The one or more node processor(s) 54-1 may be shared by central unit 50 and distributed unit 52 or each of central unit 50 and distributed unit 52 may comprise one or more node processor(s) 54. Moreover, central unit 50 and distributed unit 52 maybe co-located at a same node site, or alternatively one or more distributed units 52 may be located at sites remote from central unit 50 and connected thereto by a packet network. The distributed unit 52 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 23, node processor(s) 54 of wireless access node 22-23 may comprise routing loop prevention information generator 200. The routing loop prevention information generator 200 generates routing loop prevention information that, when received by an Integrated Access and Backhaul (IAB) node, may be used by the Integrated Access and Backhaul (IAB) node to avoid selecting any of its children or grandchildren nodes in a cell selection procedure. Differing types of routing loop prevention information are described herein in differing embodiments and modes. For example, in the example embodiment and mode of FIG. 23C the routing loop prevention information is configuration information, whereas in the example embodiment and mode of FIG. 33-FIG. 37 the routing loop prevention information is carried by system information. FIG. 23 further shows that the transmitter circuitry 57 of wireless access node 22-23 may transit a signal or message 202 comprising the routing loop prevention information, e.g., routing loop prevention information message 202, over a radio interface to other Integrated Access and Backhaul (IAB) nodes.

As shown in FIG. 23 the IAB-node 24-23, also known as wireless relay node 24-23, in an example embodiment and mode comprises relay mobile termination unit 70 and relay distributed unit 72. The relay mobile termination unit 70 and relay distributed unit 72 may be realized by, e.g., by comprised of or include one or more processor circuits, e.g., relay node processor(s) 74. The one or more relay node processor(s) 74 may be shared by relay mobile termination unit 70 and relay distributed unit 72, or each of mobile termination unit 70 and distributed unit 72 may comprise one or more relay node processor(s) 74. The relay node distributed unit 72 may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

FIG. 23 further shows that IAB-node 24-23 may comprise cell selection procedure controller 204. The cell selection procedure controller 204 serves to initiate and perform a cell selection procedure when the IAB node 24-23 has detected or experienced, e.g., a radio link failure (RLF), and therefore needs to select another cell or, if the RLF is temporary, attempt to re-select the same cell if able to do so. In addition, the IAB node 24-23 comprises cell selection routing loop prevention controller 206. The cell selection routing loop prevention controller 206 may comprise or be included in cell selection procedure controller 204, which may in turn be realized or comprised by relay node processor(s) 74.

FIG. 23 shows child node 30 as comprising, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. FIG. 23 further shows child node 30, which (as indicated before) may be a user equipment or Integrated Access and Backhaul (IAB) node, as also comprising node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

In an example, non-limiting embodiment and mode shown in FIG. 23, the child node 30 may include frame/message generator/handler 94. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes.

FIG. 24 shows example, representative acts or steps performed by the wireless access node 22-23 of FIG. 23. Act 24-1 comprises including routing loop prevention information for a cell selection procedure in a message. The routing loop prevention information may be generated, for example, by node processor(s) 54 and the routing loop prevention information generator 200 in particular. Alternatively, the routing loop prevention information may be generated by a network entity, such a network server that comprises either the radio access network or a core network. In the event that the routing loop prevention information is generated by a network server, the node processor(s) 54 may serve to include the server-generated routing loop prevention information into a routing loop prevention information message. Act 24-2 comprises transmitting the routing loop prevention information message to a wireless relay node, such as in routing loop prevention information message 202, for example.

FIG. 25 shows example, representative acts or steps performed by the IAB node 24-23 of FIG. 23. Act 25-1 comprises receiving routing loop prevention information, e.g., receiving routing loop prevention information message 202. Act 25-2 comprises using the routing loop prevention information in a cell selection procedure to select a cell as a candidate. The routing loop prevention information precludes the IAB node 24-23 from selecting a cell of one of its child or grandchild nodes.

Various example embodiments and modes generically covered by the example embodiment and mode of FIG. 23 are now further described. In the ensuing descriptions of the nodes of the telecommunications systems of the further example embodiments and modes, any suffixes affixed to node descriptors are done so for sake of simplicity of reference, it being understood that such nodes are still subsumed under the general and generic embodiment and mode and that comments directed to such suffixed node appellations are not necessarily and generally are not confined to that particular example embodiment and mode. Moreover, it should be understood that features and/or components of the various example embodiments and modes and implementations described herein may be combined with one another.

Preventing Routing Loops in Cell Selection: Using Configuration Parameter(s)

Figure 26A:
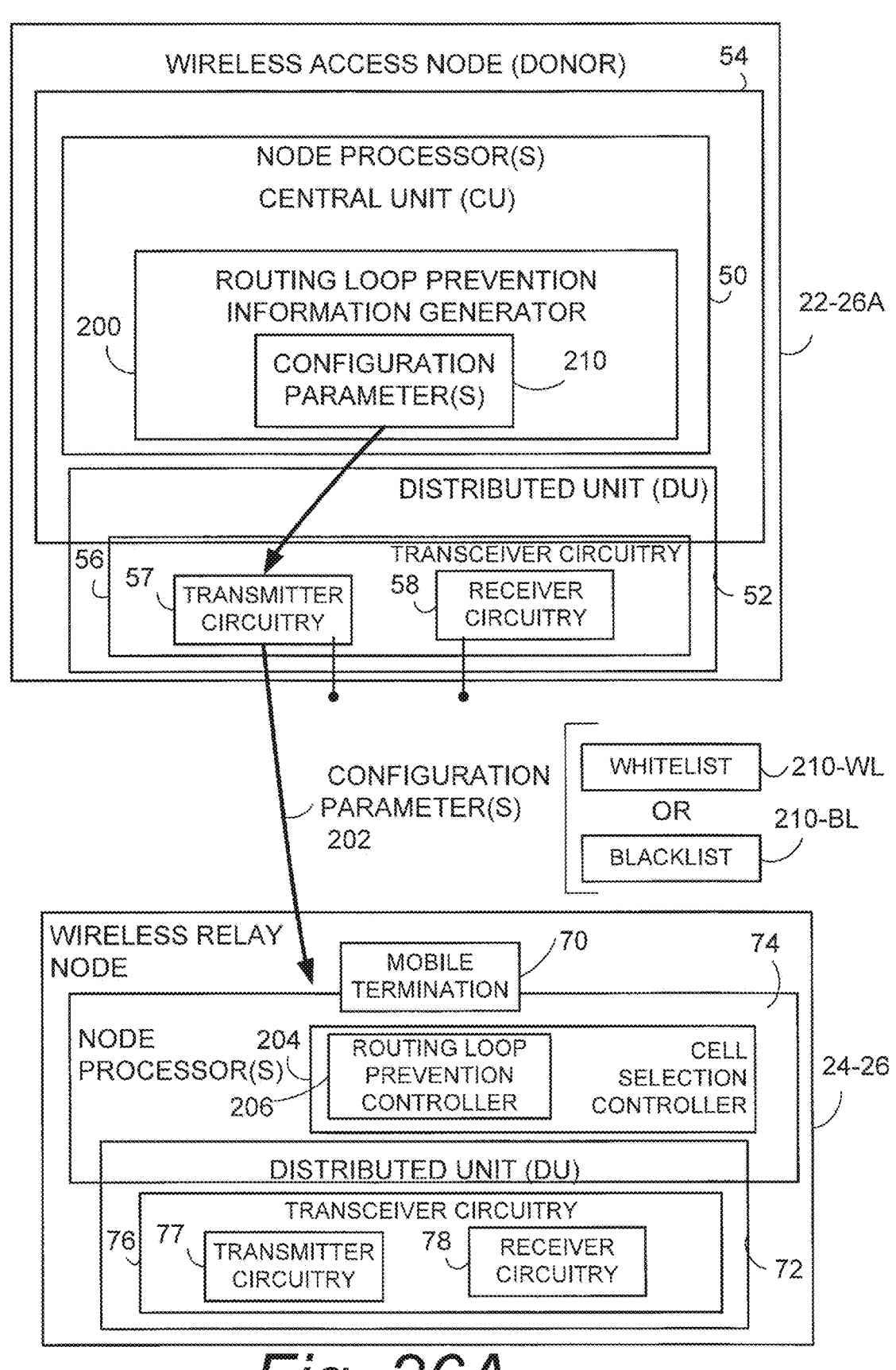
FIG. 26A is a diagrammatic view showing an example implementation of the generic telecommunications system of FIG. 23 wherein the routing loop prevention information comprises configuration information, e.g., configuration parameter(s), generated by a donor Integrated Access and Backhaul (IAB) node.
Figure 26B:
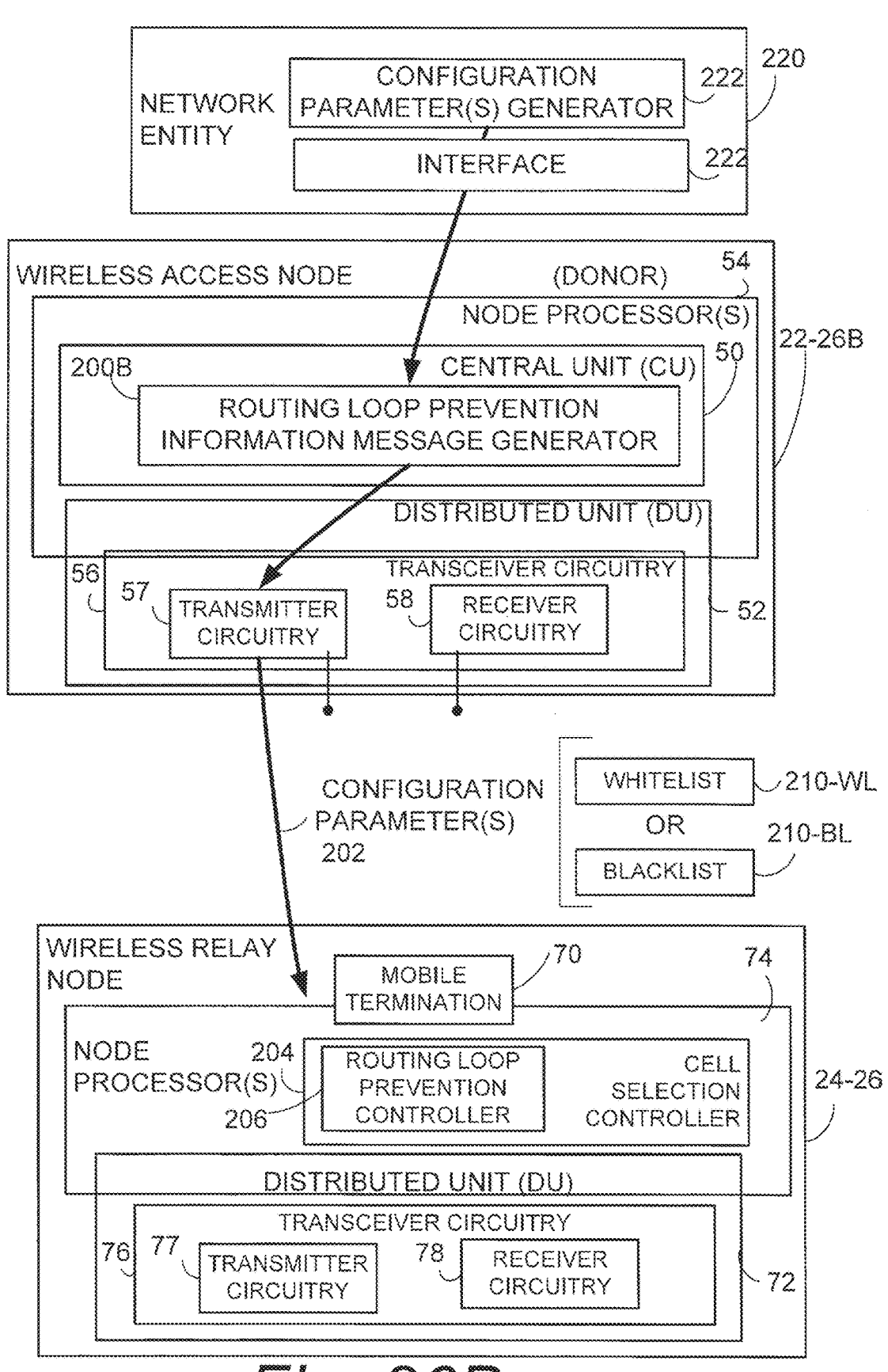
FIG. 26B is a diagrammatic view showing an example implementation of the generic telecommunications system of FIG. 23 wherein the routing loop prevention information comprises configuration information, e.g., configuration parameter(s), generated by a network server entity.

In order to prevent a routing loop from happening, in some example embodiments and modes illustrated in FIG. 26A and FIG. 26B, the routing loop prevention information may be configuration information. Accordingly, an IAB-node 24-26 (e.g., a node such as 24-A-21 of FIG. 21 or IAB node 24-23 of FIG. 23) may be configured with configuration parameters 210 to provide guidelines (or policies, rules, restrictions, etc.) to help the IAB-node 24-26 to perform cell selections after an event such as an RLF.

In the example implementation of FIG. 26A the configuration parameters may be generated by routing loop prevention information generator 200 of wireless access node 22-26A, and may be included in the routing loop prevention information message 202 provided to an IAB-node 24-26 while the IAB-node is connected with IAB-donor 22-26A (e.g., before an RLF). In one example configuration or implementation shown in FIG. 26A, the configuration parameters 210 may be generated by the CU part of the IAB-donor 22-26 and transmitted by its DU part via (broadcast or dedicated) signaling, such as RRC and F1AP.

In another example implementation shown in FIG. 26B the configuration parameters 210 may be generated and transmitted by a network entity, such as a network server 220. In an example embodiment and mode, the network entity 220 may comprise server configuration parameter(s) generator 222, which may comprise or be realized by processor circuitry, and network server interface 224. The server processor circuitry or server configuration parameter(s) generator 222 is configured to generate routing loop prevention information for a cell selection procedure in a message. The interface 224 is configured to transmit the routing loop prevention information message through a radio access network to a wireless relay node. The routing loop prevention information may be generated by a configuration parameter generator 222 of the network server 220 and transmitted to wireless access node 22-26B via IP data packets. The wireless access node 22-26B may then include the routing loop prevention information which was generated by network server 220 in the routing loop prevention information message 202. In the example embodiment and mode of FIG. 26B, the CU of wireless access node 22-26B may thus serve as a routing loop prevention information message generator 200B. The configuration parameters that were generated by the server configuration parameter(s) generator 222 of network entity 220 may thus be included in a routing loop prevention information message by message generator 200B, which may comprise the CU part of the IAB-donor 22-26B, and be transmitted by the DU part of wireless access node 22-26B via (broadcast or dedicated) signaling, such as RRC and F1AP. The IAB-node 24-26 that receives the configuration parameters may save them in its storage and may make use of them upon an event such as an RLF.

In one configuration or implementation of the example embodiments and modes such as FIG. 26A and FIG. 26B, for example, the configuration parameters may comprise a "whitelist" of cell/node identities, which white-listed cell/node identities the IAB-node 24-26 may be allowed to select during the cell selection procedure. The cell/node identities may be Physical Cell IDs (PCIs), NR Cell Identities (CellIdentities or NCIs), NR Cell Global Identifiers (NCGIs), gNB identifiers (gNB IDs), Global gNB identifiers (all specified in 3GPP TS 38.300, all existing versions thereof being incorporated herein by reference), or any other identifiers to identify cells/nodes. During RRC_CONNECTED state, the IAB-donor such as wireless access node 22-26A of FIG. 26A or a network entity such as network entity 220 of FIG. 26B may generate a whitelist 210-WL for the IAB-node, which may include identities of cells/nodes near by the IAB-node and may exclude the identities of cells served by the DU parts of the IAB-node's (grand)child nodes. The whitelist 210-WL may be updated and sent to the IAB-node as necessary. For example, when an IAB-node nearby IAB node 24-26 (the nearby Integrated Access and Backhaul (IAB) node not being illustrated) becomes a (grand)child node of IAB node 24-26, the cell/node identity of the nearby IAB-node may be removed from the whitelist (if already included) and the updated whitelist may be sent to IAB node 24-26. Likewise, when a (grand)child node of IAB node 24-26 hands over to another IAB-node and no longer is a (grand)child node of IAB node 24-26, cell/node identity for such an IAB-node may now be added to the whitelist to be sent to IAB node 24-26. In one configuration, upon an update the entire whitelist 210-WL may be delivered to IAB node 24-26. Additionally or alternatively, only updated parts of the whitelist may be delivered (such as a "to add", "to modify" or "to remove" list).

In a case that the whitelist 210-WL comprises a list of PCIs (or one or more ranges of PCIs), upon an RLF the MT part of IAB node 24-26 may initiate the cell selection procedure, where the MT part attempts to acquire synchronization signals, such as Primary Synchronization Signal (PSS) and Secondary Synchronization Signal (SSS), from neighbor cells. If the PCI decoded from the synchronization signals broadcasted by one of the neighbor cells is included in the whitelist 210-WL, the MT part may proceed to further acquiring system information blocks (such as MIB and SIB1) from the cell. Otherwise, the MT part of Node A may consider the cell as not a candidate ("not suitable" or "barred") and continue the cell selection process by searching for other cells. Meanwhile, in a case that the whitelist comprises a list of CellIdentity fields, the MT part of Node A may acquire the synchronization signals, MIB and SIB1, and if a CellIdentity(s) contained in SIB1 is included in the whitelist, the cell selection may be successfully completed. If the CellIdentity(s) is not in the whitelist, the MT part of Node A may continue the cell selection process, searching for other cells.

In an example, non-limiting implementation, the whitelist 210-WL may be a prioritized list. In such prioritized case, if IAB node 24-26 Node A finds a low-priority cell, it may continue to find higher priority cells in the whitelist 210-WL. In one configuration, cells served by IAB-nodes/IAB-donor may of higher priority than cells with no IAB capabilities.

In another configuration of the example embodiment and mode, the configuration parameters may comprise a "black-list" 200-BL of cell/node identities, which the IAB-node 24-26 should avoid during cell selections. Similar to the previous configuration, the cell identities may be Physical Cell IDs (PCIs), NR Cell Identities (CellIdentitys or NCIs), NR Cell Global Identifiers (NCGIs), gNB identifiers (gNB IDs), Global gNB identifiers, or any other identifies to identify cells/nodes. During RRC_CONNECTED state, the IAB-donor such as wireless access node 22-26A of FIG. 26A or a network entity such as network entity 220 of FIG. 26B may generate a blacklist 200-BL for the IAB-node 24-26, which may include identities of cells served by (grand)child nodes of the IAB-node of concern. The blacklist 200-BL may further comprise identities of nearby cells served by nodes with no IAB capabilities. The blacklist may be updated and sent to the IAB-node 24-26 as necessary. For example, when another IAB-node (not illustrated) which is nearby IAB node 24-26 becomes a (grand)child node of IAB node 24-26 , the cell/node identity of the nearby IAB-node may be added to the blacklist and the updated blacklist 200-BL may be sent to IAB node 24-26. Likewise, when a (grand)child node of IAB node 24-26 hands over to another IAB-node and no longer is a (grand)child node of IAB node 24-26, the cell/node identity of such an IAB-node may be removed from the blacklist and an updated blacklist may be sent to IAB node 24-26. Similar to the whitelist 200-WL, the entire blacklist 200-BL or only updated parts of the blacklist (such as a "to add", "to modify" or "to remove" list) may be delivered.

In a case that the blacklist 200-BL comprises a list of PCIs (or one or more ranges of PCIs), upon an RLF the MT part of IAB node 24-26 may initiate the cell selection procedure, where the MT part attempts to acquire synchronization signals, such as Primary Synchronization Signal (PSS) and Secondary Synchronization Signal (SSS), from neighbor cells. If the PCI decoded from the synchronization signals broadcasted by one of the neighbor cells is not included in the blacklist 200-BL, the MT part may proceed to further acquiring system information blocks (such as SIB1) from the cell. Otherwise, the MT part of IAB node 24-26 may consider the cell as not a candidate ("not suitable" or "barred") and continue the cell selection process by searching for other cells. Meanwhile, in a case that the blacklist comprises a list of CellIdentity fields, the MT part of IAB node 24-26 may acquire the synchronization signals, MIB and SIB1, and if a CellIdentity(s) contained in SIB1 is not included in the blacklist 200-BL, the cell selection may be successfully completed. If the CellIdentity(s) is in the blacklist 200-BL, the MT part of IAB node 24-26 may continue the cell selection process, searching for other cells.

In addition, the blacklist 200-BL may further include some topology information associated with cell/node identities. That is, the topology information may indicate parent-child relationship among entries of the blacklist 200-BL. For example, in the case of FIG. 21, after Child node 30-2-21 is attached to the relay network, the blacklist 200-BL may indicate Child node 30-2-21 as a direct child of Node 24-A-21 and Child node 30-2-21 as a direct child of Child node 30-1-21. A blacklist 200-BL with topology information may be referred as a routing table, or a topology table.

Figure 27:
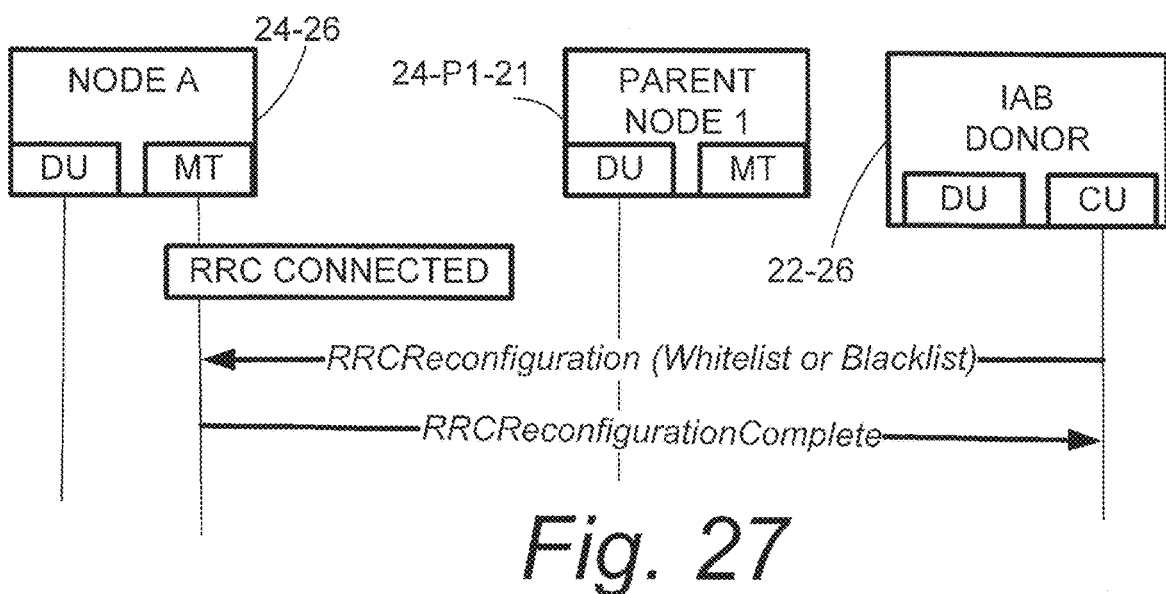
FIG. 27 is a diagrammatic view of an example message flow including a RRCReconfiguration message for sending a whitelist or blacklist of configuration parameter(s).

Either the whitelist 200-WL or the blacklist 200-BL may be carried via RRCReconfiguration message to the MT part of an IAB-node as shown in the example message flow of FIG. 27. Alternatively, either the whitelist 200L or the blacklist 200-BL may be carried via an F1-AP message to the DU part of an IAB-node, then handed to a MT part collocated in the IAB-node. The MT part of IAB node 24-26 may save the list, e.g., either whitelist 200-WL or blacklist 200-BL, and upon a radio link failure (RLF) the MT part of the IAB node 24-26 may use the latest list, either whitelist 200-WL or blacklist 200-BL, for cell selections.

Figure 28:
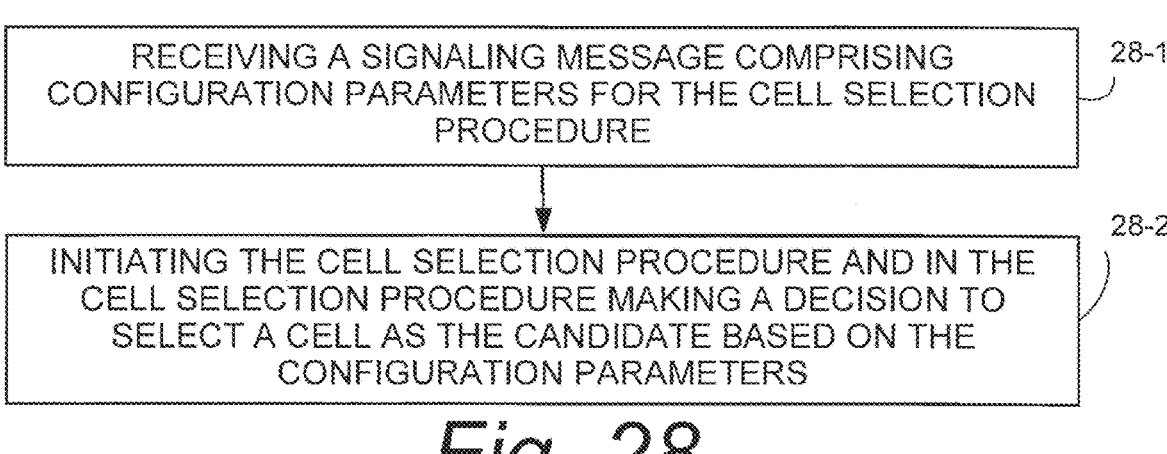
FIG. 28 is a flowchart showing example, representative acts or steps which may be performed by the IAB node of FIG. 26A.

FIG. 28 shows example, representative acts or steps which may be performed by the IAB node 24-26 of FIG. 26A and FIG. 26B. Act 28-1 comprises receiving a signaling message comprising configuration parameters for the cell selection procedure. Act 28-2 comprises initiating the cell selection procedure and in the cell selection procedure making a decision to select a cell as the candidate based on the configuration parameters.

Figure 29:
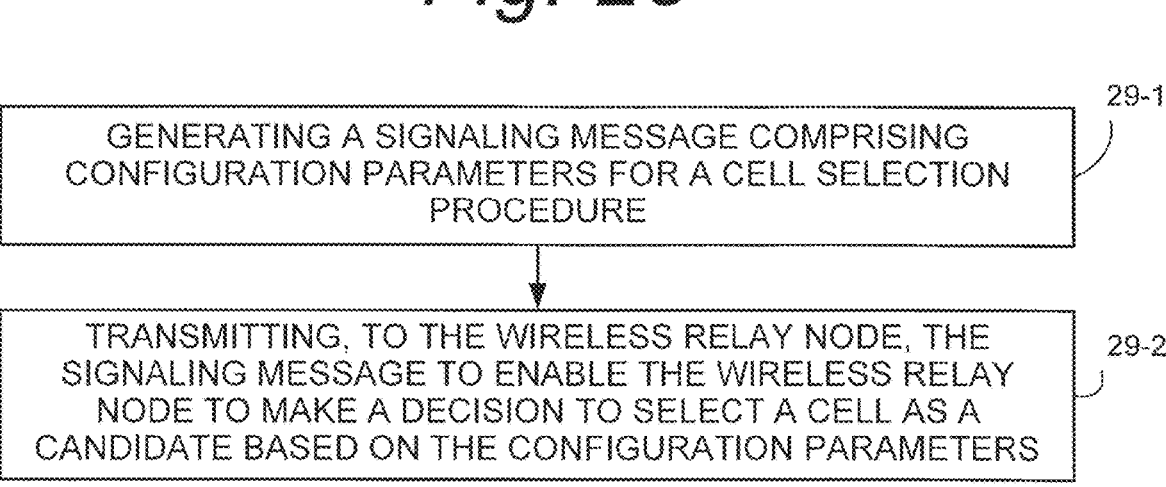
FIG. 29 is a flowchart showing example, representative acts or steps which may be performed by the wireless access donor node of FIG. 26A.

FIG. 29 shows example, representative acts or steps which may be performed by the wireless access donor node 22-26A of FIG. 26A. Act 29-1 comprises generating a signaling message comprising configuration parameters for a cell selection procedure. Act 29-2 comprises transmitting, to the wireless relay node, the signaling message to enable the wireless relay node to make a decision to select a cell as a candidate based on the configuration parameters.

FIG. 30 shows example, representative acts or steps which may be performed by the wireless access donor node 22-26B of FIG. 26B. Act 30-1 comprises including the routing loop prevention information received from network entity 220 in a signaling message comprising for a cell selection procedure. Act 30-2 comprises transmitting, to the wireless relay node, the signaling message to enable the wireless relay node to make a decision to select a cell as a candidate based on the configuration parameters.

FIG. 31 shows example, representative acts or steps which may be performed by the network entity 220 of FIG. 26B. Act 31-1 comprises generating routing loop prevention information for a cell selection procedure in a message. Act 31-2 comprises transmitting the routing loop prevention information message through a radio access network to a wireless relay node.

In the above configurations of the example embodiments and modes, such as FIG. 26A and FIG. 26B, for example, the configuration parameters 210 may further comprise one or more radio-related parameters, such as frequency band lists, which the MT part of the IAB-node 24-26 may be directed to search on or not to search on upon an RLF.

Figure 32:
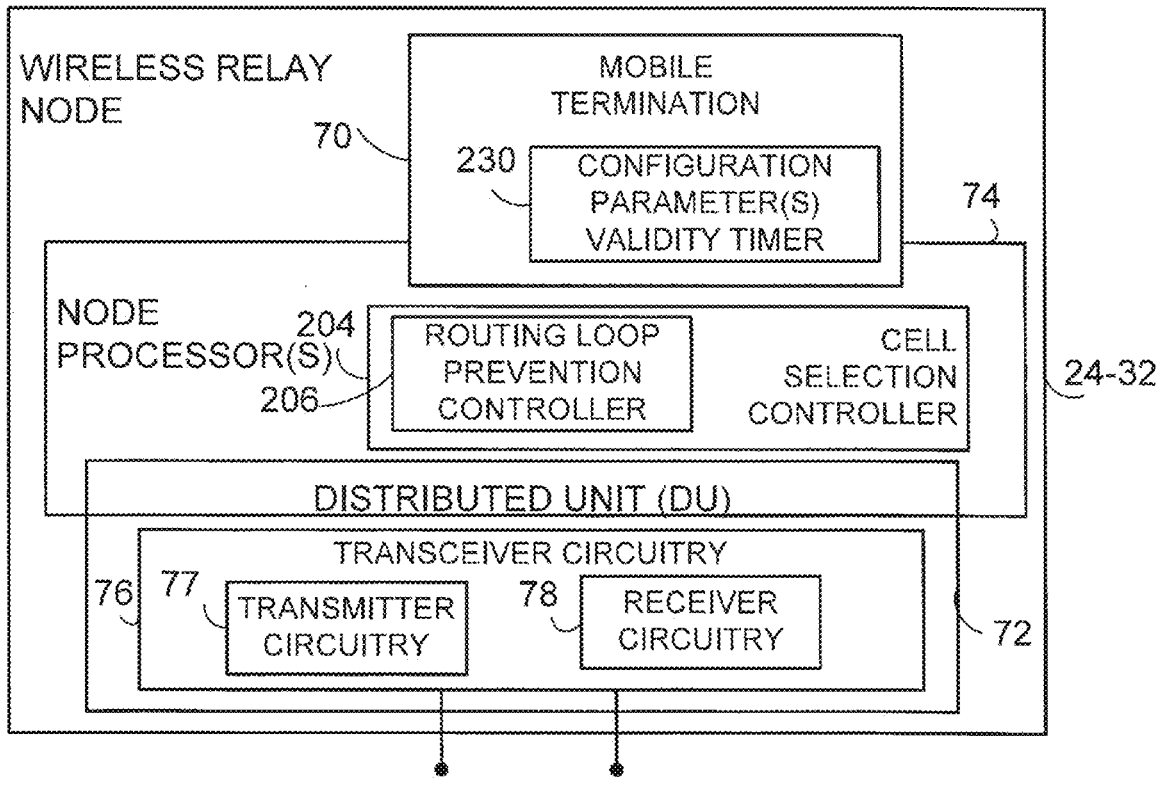
FIG. 32 is a schematic view of an IAB node which further comprises a configuration parameter(s) validity timer.

Moreover, in the foregoing example embodiments and modes such as FIG. 26A and FIG. 26B, validity of the configuration parameters 210 may be limited in time. In other words, for example, once configured, the configuration parameters 210 may be valid within a (pre)configured time period. The MT part of an IAB-node such as IAB node 24-26 may start a timer, e.g., configuration parameter(s) validity timer 230 as shown in FIG. 32, and may invalidate the configuration parameters upon the timer expiring. In one example implementation, the timer 230 is started when the configuration parameters are configured. In another example implementation, the timer 230 is started when an event (such as an RLF) triggering the cell selection procedure occurs. The value of the timer 230 may be pre-configured or configured by a network node (a parent IAB-node, an IAB-donor, or any other network entity) by dedicated signaling (e.g. RRC, F1-AP) or broadcast signaling (e.g. system information (MIB, SIB1 or other SIB(s))). In addition, a stored set of configuration parameters may become invalid when a new set of configuration parameters is received.

Preventing Routing Loops in Cell Selection: Using System Information

Figure 33:
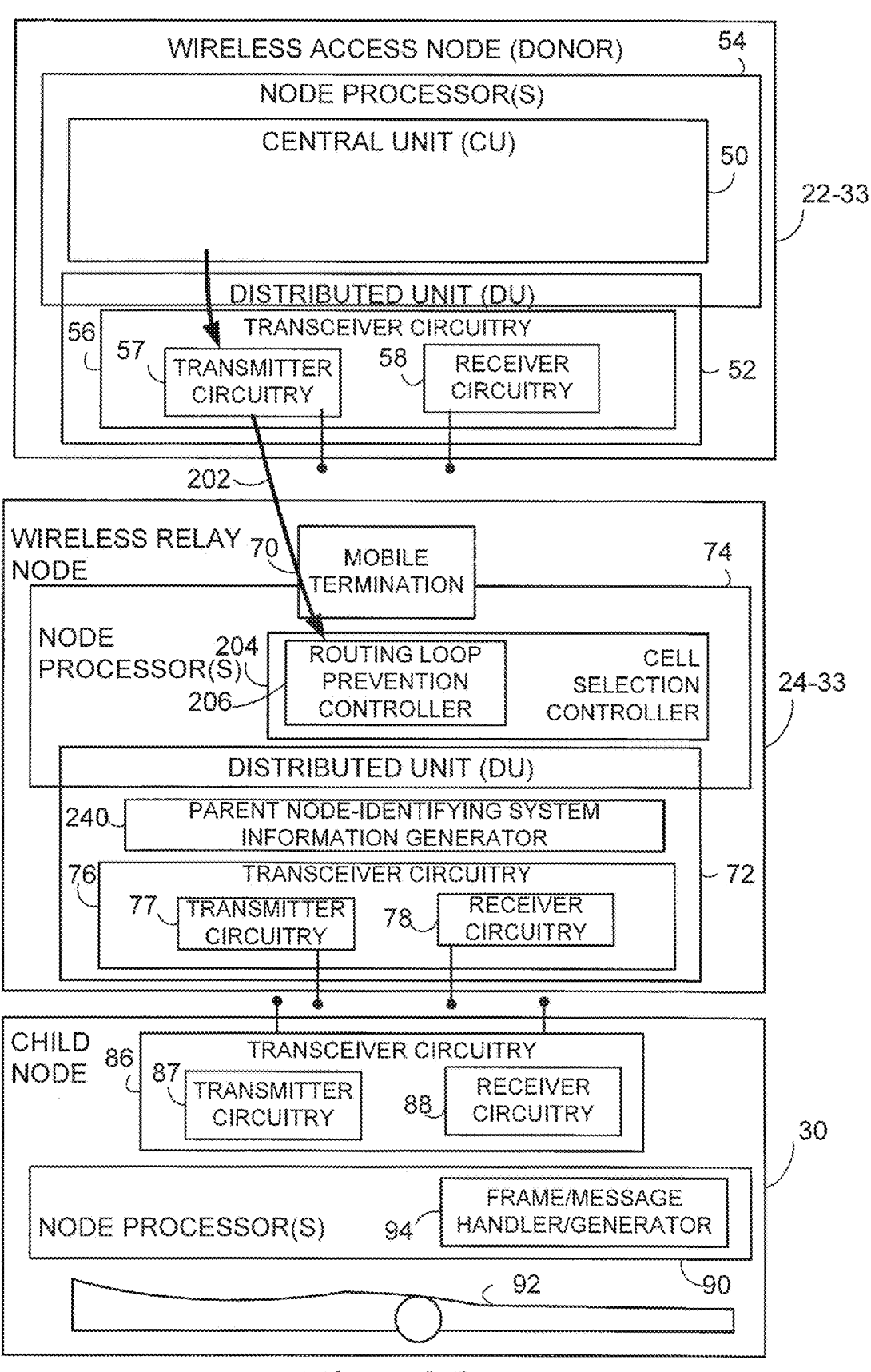
FIG. 33 is a diagrammatic view showing an example implementation of the generic telecommunications system of FIG. 23 wherein, as routing loop prevention information, an Integrated Access and Backhaul (IAB) node broadcasts system information which announces parent nodes.

FIG. 33 shows an example embodiment and mode wherein the same issue of "routing loops" is addressed by an alternative approach, e.g., using system information. In the example embodiment and mode of FIG. 33, a distributed unit 72 of each IAB-node, such as IAB node 24-33, may broadcast system information (SI) comprising a list of identifiers to identify the (grand)parent cells/nodes located on the upstream path of the SI-broadcasting IAB-node, in addition to a cell/node identification of its own. FIG. 33 particularly shows that distributed unit 72 of IAB node 24-33 includes parent node-identifying system information generator 240 which includes, in the system information broadcast by IAB node 24-33, the list of identifiers to identify the (grand)parent cells/nodes located on the upstream path. In the example embodiment of FIG. 33, system information in which the parent node list is included may comprise synchronization signals (e.g. PSS/SSS), Physical Broadcast Channel (PBCH), Physical Downlink Control Channel (PDCCH), MIB, SIB1, other SIB(s) or any combination of one or more thereof.

Figure 34:
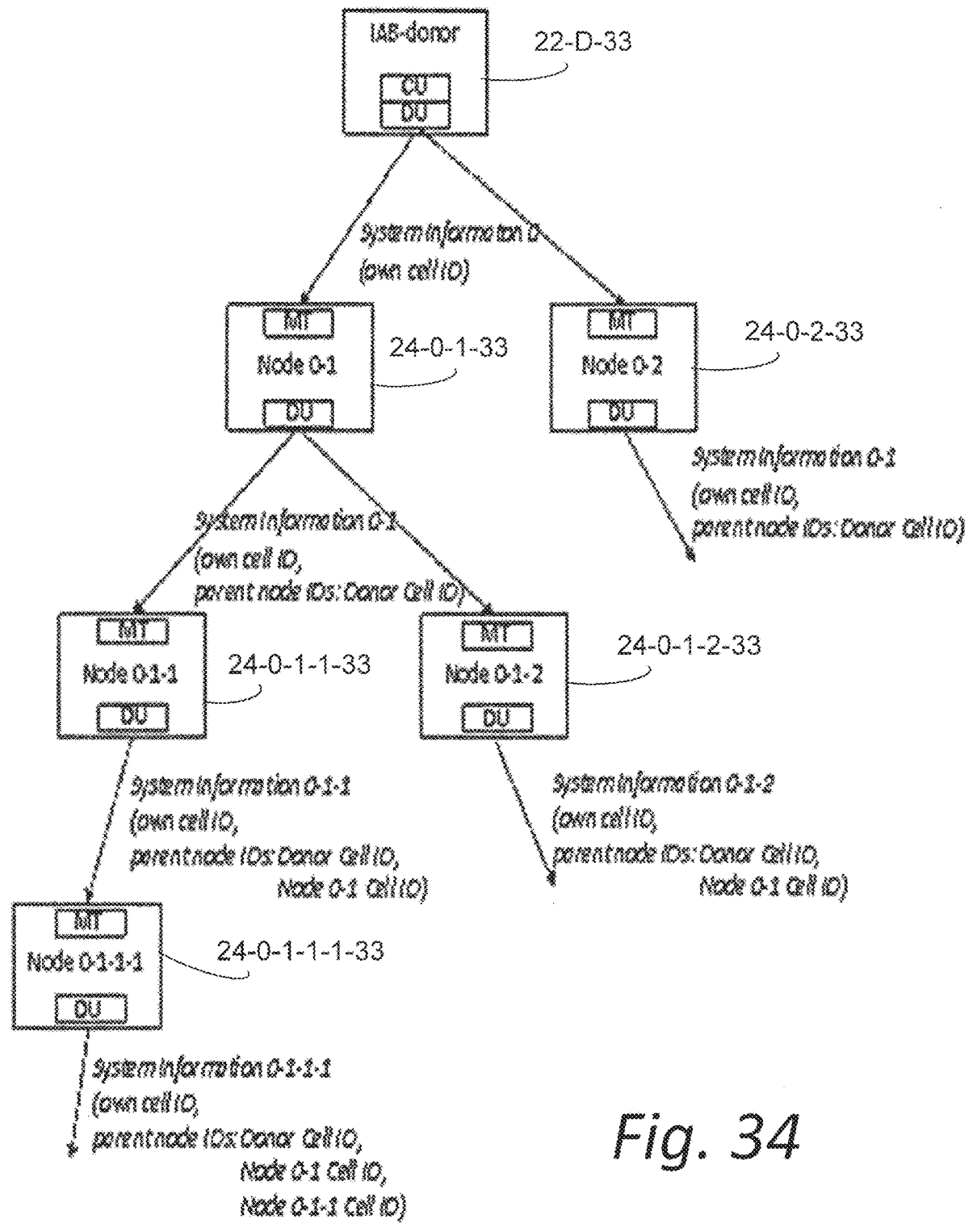
FIG. 34 is a diagrammatic view illustrating a mode of operation of a telecommunications network that includes Integrated Access and Backhaul (IAB) nodes that broadcasts system information which announces parent nodes in the manner of FIG. 33.

Operation of the example embodiment and mode of FIG. 33 is illustrated in FIG. 34. FIG. 34 shows a telecommunications system comprising wireless access donor node 22-D-33, IAB node 24-0-1-33; IAB node 24-0-2-33; IAB node 24-0-1-1-33; IAB node 24-0-1-2-33; and IAB node 24 0 1 1 1 33. Each of the IAB nodes 24-33 of FIG. 34 include a mobile termination unit 70 and a distributed unit 72, with the distributed unit 72 including the aforementioned parent node-identifying system information generator 240.

FIG. 34 illustrates an example operation and mode of the example embodiment and mode of FIG. 33. First, the DU part of an IAB-donor may broadcast its own cell/node identification (e.g. PCI, CellIdentity(s), or other identification(s)) via system information (System Information 0 in FIG. 34).

Next in FIG. 34, two child nodes, IAB node 24-0-1-33 and IAB node 24-0-2-33 of FIG. 34, attach to the relay network. The two nodes IAB node 24-0-1-33 and IAB node 24-0-2-33 are in RRC_IDLE or RRC_INACTIVE state, acquiring the system information broadcast from the IAB-donor 22-D-33, and then performing the RRC connection setup procedure (as previously disclosed). During the system information acquisition, the two nodes IAB node 24-0-1-33 and IAB node 24-0-2-33 may obtain the cell/node identification of the IAB-donor 22-D-33. In a case that some of the two child nodes have already been in RRC_CONNECTED state and handover to the IAB-donor, the system information (at least some essential parts including at least the cell identification of a target cell (i.e. the IAB-donor)) may be provided to the nodes IAB node 24-0-1-33 and IAB node 24-0-2-33 by dedicated signaling (e.g. RRCReconfiguration message) before or after the handover.

After establishing an RRC connection, followed by F1-AP setting up their respective DU parts, each of the nodes IAB node 24-0-1-33 and IAB node 24-0-2-33 may start broadcasting its own system information. In the example embodiment of FIG. 34, this system information may include its own cell/node identification and may further include a list of cell/node identifications for parent nodes. For example, the DU part of IAB node 24-33-0-1-33 may broadcast system information (System Information 0-1) comprising the cell/node identification of Node 24-0-1-33 and a list of parent cell identification including the cell/node identification for the IAB-donor 22-D-33.

Next in FIG. 34, other two nodes, Node 24-0-1-1-33 and Node 24-0-1-2-33, may attach to the relay network via Node 24-0-1-33. Each of Node 24-0-1-1-33 and Node 24-0-1-2-33 perform the same action(s) as Node 24-0-1-33 or Node 24-0-2-33. In this case the system information (System Information 0-1) additionally includes the list of cell/node identifications for the parent nodes of Node 24-0-1-33 (e.g., includes the identification of the IAB-donor 22-D-33).

When broadcasting system information (System Information 0-1-1 and System Information 0-1-2, respectively), the Node 24-0-1-1-33 and Node 24-0-1-2-33 may compose a list comprising the parent cell identifications received from Node 24-0-1-33 and the cell identification of Node 24-0-1-33. Similarly, any (grand)child node attaching to the relay network may perform the same acts.

In the operation and mode described above, it is assumed that the MT part of an IAB-node informs the collocated DU part of necessary information, e.g. parent node identifications, received in the system information.

When an IAB-node detects a radio link failure (RLF) on its upstream radio link, the MT part of the IAB-node may initiate the cell selection procedure as described in the previous embodiments, and determine suitability of any discovered cells by acquiring system information (at least synchronization signals, MIB and SIB1, possibly other SIB(s)). In the operation and mode of the example embodiment of FIG. 34, the MT part of the IAB-node may decode the system information to ensure that the selected cell is not served by a child node of its own. In order to do this, the MT part of the IAB-node may examine the list of parent node identifications included in the system information and check if its own cell/node identification is in the list. If the check is positive, the MT part of the IAB-node may determine the selected cell served by its own child node and therefore attempt to look for other cells. Otherwise, the MT part of the IAB-node may examine other parameters in the system information, such as barring status, and may further proceed to the RRC reestablishment procedure as disclosed earlier.

In another example operation and mode, a different type of identifications may be used for the list of identifiers identifying (grand)parent nodes to be included in the system information. For example, Physical Cell IDs (PCIs), NR Cell Identities (CellIdentitys or NCIs), NR Cell Global Identifiers (NCGIs), gNB identifiers (gNB IDs), Global gNB identifiers, gNB-ID (specified in 3GPP TS 38.473) or any other identifies to identify cells/nodes may be used.

At least some of the example operations and modes disclosed above in the example embodiment of FIG. 33 and FIG. 34 assume that the identifications of (grand)parent nodes on its upstream path towards an IAB-donor are retrieved from received system information by the MT part and transferred to the collocated DU part, where the identifications are further used in the system information that the collocated DU part may broadcast. For example, the cell selection routing loop prevention controller 206 of the Integrated Access and Backhaul (IAB) node may include or have access to the upstream node identifications.

Figure 35:
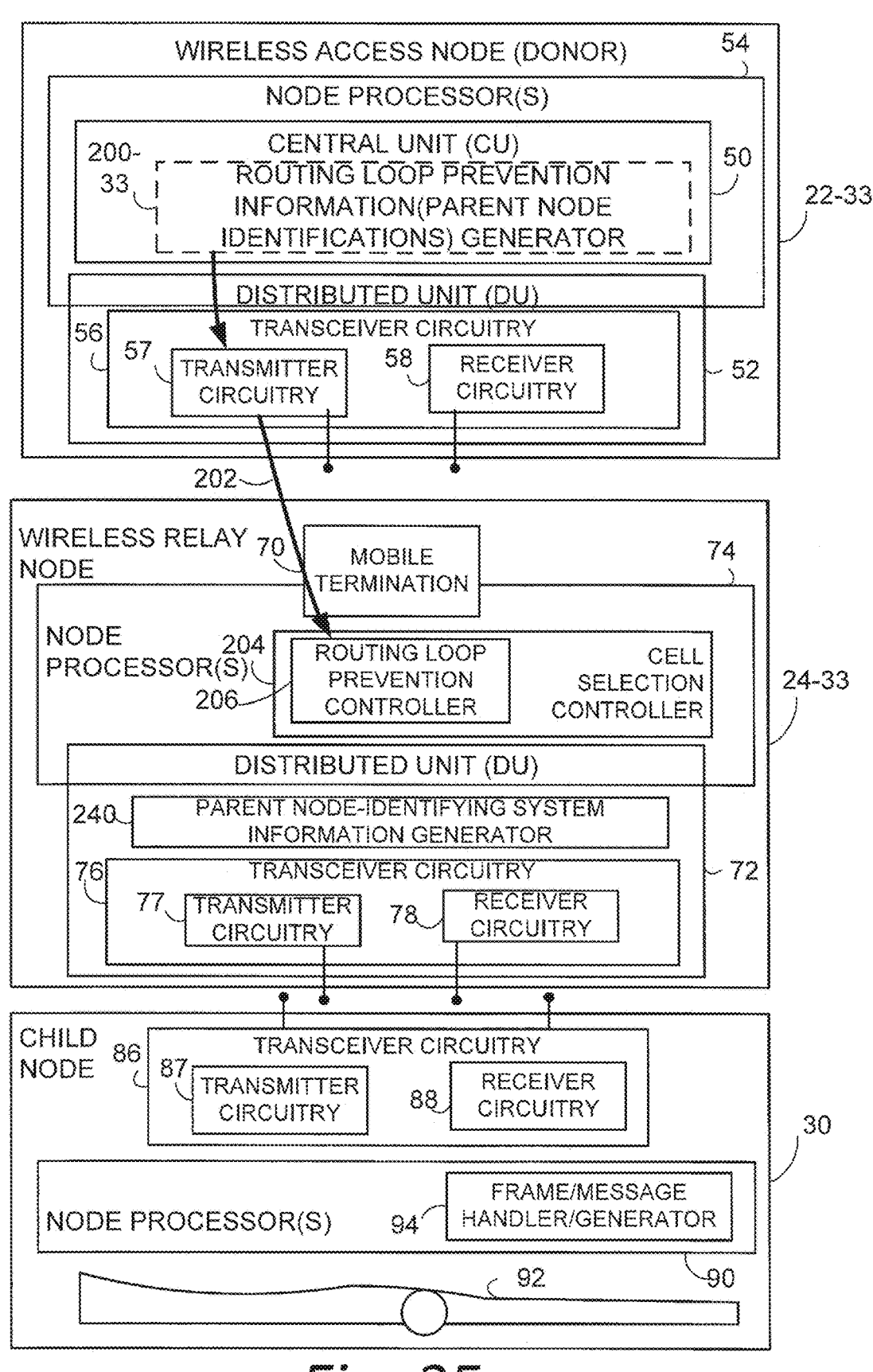
FIG. 35 is a diagrammatic view showing an example implementation of the generic telecommunications system of FIG. 23 wherein, as routing loop prevention information, an Integrated Access and Backhaul (IAB) node broadcasts system information which announces parent nodes, and wherein a routing loop prevention information generator takes the form of a parent node identifications generator.

In an alternative approach shown in FIG. 35, the IAB-donor 22-D-33 (or any other network entity) may configure each IAB-node with a set of parent node identifications to be broadcasted by the IAB-node. In this case, during IAB-node being attached to the IAB-donor, the set of parent node identifications may be configured by an RRC message (e.g. RRCReconfiguration message) or an F1-AP message. FIG. 33 shows such optional alternative by the routing loop prevention information generator takes the form of a parent node identifications generator 200-33.

FIG. 36 shows example, representative acts of steps that may be performed by an IAB node 24-33 of the example embodiment and mode of FIG. 33-FIG. 35. Act 36-1 comprises receiving or obtaining first system information including a first list comprising at least one identification of a donor node and identifications of zero or more intermediate relay nodes located between the donor node and the wireless relay node. Act 36-2 comprises transmitting second system information including a second list comprising an identification of the wireless relay node, the at least one identification of the donor node and the identifications of zero or more intermediate relay nodes. Act 36-3 comprises initiating a cell selection procedure. Act 36-4 comprises, in the cell selection procedure, further receiving, from a selected cell during the cell selection procedure, third system information including a third list comprising one or more identifications of nodes. Act 36-5 comprises, in the cell selection procedure, making a decision to select the selected cell/node as a candidate based on whether a third list includes the identification of the wireless relay node.

FIG. 37 shows example, representative acts of steps that may be performed by a wireless access donor node such as node 22-D-33 of the example embodiment and mode of FIG. 33-FIG. 35. Act 37-1 comprises generating a signaling message for a wireless relay node, the signaling message comprising a list of one or more identifications identifying the donor node and zero or more intermediate relay nodes located between the donor node and the wireless relay node. Act 37-2 comprises transmitting the signaling message to the wireless relay node. As understood from the foregoing, the list of one or more identifications is configured to enable the wireless relay node to make a decision to select a cell/node as a candidate during a cell selection procedure. Enhanced Re-Establishment The example embodiments and modes of FIG. 38-FIG. 44 address issues with regard to an IAB-node performing a re-establishment procedure, upon receiving a Backhaul RLF indication from its parent node. The Backhaul RLF notification, also referred as Upstream RLF Notification or a condition notification message 42 in the previous embodiments, may be sent when the MT part of a parent node fails to recover after a radio link failure, RLF.

Figure 38:
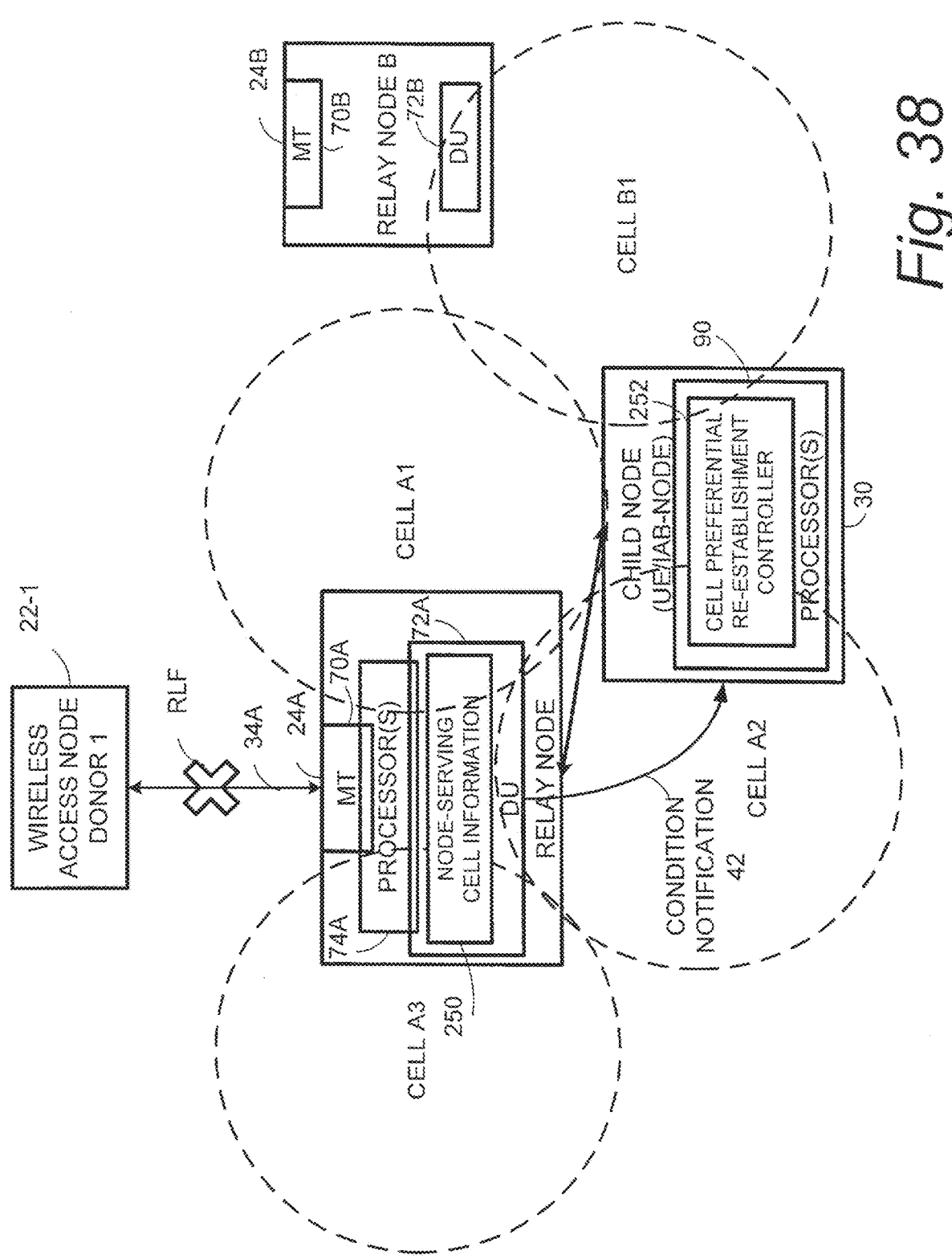
FIG. 38 is a diagrammatic view showing another example and generic telecommunications system in which an IAB node may transmit node-serving cell information to permit a child node to perform a cell preferential re-establishment procedure.

FIG. 38 shows an example scenario wherein child node 30 receives the Backhaul RLF Indication, e.g., condition notification 42, from Node 24A, the parent node of the child node 30. Similar to the preceding embodiments, child node 30 may be an IAB-node, or a UE. A child node, either in the form of an IAB-node or a UE as shown in FIG. 38, may be referred to as a "wireless terminal". In FIG. 38, it is assumed that the DU part 72A of IAB-node 24A is serving multiple cells, Cell A1, A2 and A3, and that child node 30 is camping on Cell Al at the time of receiving the Backhaul RLF Indication, e.g., condition notification 42.

Upon receiving the Backhaul RLF Indication in FIG. 38, child node 30 may store the identification of the cell that transmits the Backhaul RLF Indication. The identification of the cell may be a Physical Cell ID encoded in Physical Broadcast Channel (PBCH). Additionally or alternatively, other types of identification, such as previously disclosed NR Cell Identity (NCI) included in SIB1, may be used. The child node 30 may proceed to the cell selection procedure as disclosed in the previous embodiments. During the cell selection procedure, if child node 30 eventually finds a broadcast signal, e.g. Synchronization Signal Block (SSB), MIB and/or SIB1, from Cell A1, child node 30 may de-prioritize selecting Cell A1 (or not consider Cell A1 as a candidate) and look for other cells, since child node 30 may recognize, using the stored identification, that Cell A1 was, and possibly is still, experiencing the RLF upstream.

In further performing the cell selection procedure, child node 30 may eventually find Cell A2, another cell served by Node A, e.g., IAB-node 24A. In this case, child node 30 may not know that Cell A2 is served by the same parent node which is experiencing the RLF. The child node 30 finding Cell A2 may lead to child node 30 selecting Cell A2, receiving MIB and SIB1, i.e. minimum system information, and the child node 30 initiating the re-establishment procedure with respect to Cell A2 in order to recover the RRC connection to the donor node. However, re-establishment to Cell A2, which is also served by IAB-node 24A, will result in a failure since the radio link failure (RLF) occurred upstream from IAB-node 24A. Consequently, the child node 30 may waste time in recovering the connection by selecting cells to be avoided, e.g. cells which are barred, not to be considered as candidates, not-suitable or reserved, or de-prioritized, e.g. low-ranked.

To avoid such waste of time and to enhance the cell selection procedure and the re-establishment procedure, the example embodiment and mode of FIG. 38 shows that IAB-node 24A transmits node-serving cell information (NSCI) 250, which enables the child node 30 to more efficiently and effectively perform a re-establishment procedure. Moreover, the child node 30 comprises cell preferential re-establishment controller 252, which utilizes the node-serving cell information to perform a re-establishment procedure which more intelligently and preferentially selects a cell for re-establishment, thereby avoiding the waste of time and/or inefficiency described above. Thus, FIG. 38 shows another example and generic telecommunications system in which an IAB node may transmit node-serving cell information to permit a child node to perform a cell preferential re-establishment procedure.

FIG. 38 thus shows that the IAB-node 24A communicates over at least two radio interfaces, including a first interface and a second interface. The first interface is configured to establish a radio resource control (RRC) connection with a donor node, e.g., donor or parent IAB node 22-1. The second interface is configured to serve one or more cells to communicate with one or more wireless terminals, such as child node 30. The IAB node comprises parent node processor circuitry 74 which, as understood with reference to the foregoing example embodiments and modes, for example, is configured to detect a radio link failure (RLF) on the first interface. The IAB-node 24A further comprises transmitter circuitry, e.g., IAB node distributed unit (DU) 72A, which is configured to transmit, using the second interface, to the one or more wireless terminals. The IAB node distributed unit (DU) 72A is configured to transmit the afore-mentioned backhaul RLF indication upon a failure of recovery from the RLF, e.g., condition notification 42. In addition, in the FIG. 38 example embodiment and mode, the IAB node distributed unit (DU) 72A is configured to transmit the node-serving cell information 250 to identify the one or more cells served by the IAB-node 24A.

FIG. 38 also shows that a wireless terminal such as the child node 30 communicates with an integrated access and backhaul (IAB) node, e.g., IAB-node 24A. The wireless terminal comprises receiver circuitry configured to receive, from the IAB node, both the node serving cell information and the backhaul radio link failure (RLF) indication. The node-serving cell information 250 is configured to identify one or more cells served by the IAB node 24A. The backhaul radio link failure (RLF) indication indicates that the IAB node fails to recover from an RLF, when such RLF does occur. FIG. 38 further shows that the child node 30 further comprises cell preferential re-establishment controller 252, which may be realized or comprise terminal processor(s) 90. The cell preferential re-establishment controller 252 is configured to perform, upon receiving the backhaul RLF indication, a re-establishment procedure based on the node serving cell information 252.

FIG. 39 shows example, representative, basic acts or steps performed by the IAB-node 24A of FIG. 38. Act 39-1 comprises detecting a radio link failure (RLF) on the first interface. Act 39-2 comprises transmitting, using the second interface, to the one or more wireless terminals the node serving cell information configured to identify the one or more cells and a backhaul RLF indication upon a failure of recovery from the RLF. As understood, e.g., with reference to ensuing implementations, the node-serving cell information and the backhaul RLF indication, e.g., condition notification 42, may be transmitted together or separately, and the transmission of the node-serving cell information may precede transmission of the backhaul RLF indication.

FIG. 40 shows example, representative, basic acts or steps performed by the child node 30 in an example mode of FIG. 38. Act 40-1 comprises the child node 30 receiving from the IAB-node 24A the node serving cell information which is configured to identify one or more cells served by the IAB node, and the backhaul radio link failure (RLF) indication indicating that the IAB node fails to recover from an RLF. The reception of the node serving cell information may either precede or accompany reception of the backhaul RLF indication. Act 40-2 comprises the child node 30, and the cell preferential re-establishment controller 252 in particular, upon receiving the backhaul RLF indication, performing a re-establishment procedure which, importantly, is based on the node serving cell information.

FIG. 38 thus shows a generic telecommunications system in which an IAB node may transmit node-serving cell information to permit a child node to perform a cell preferential re-establishment procedure, with FIG. 39 and FIG. 40 showing various example generic acts or steps which may be performed by the IAB-node 24A and child node 30, respectively. The generic system of FIG. 39 may have differing implementations, as shown below with respect to FIG. 41A-FIG. 41C. Unless otherwise noted, descriptions above regarding the generic system and mode of FIG. 39, FIG. 39, and FIG. 40 are applicable to each of the differing implementations. First is described, with respect to FIG. 41A, FIG. 43A, and FIG. 44A, an example implementation in which the node-serving cell information 250 comprises a list of cells served by the IAB-node 24A, and which list is transmitted to child node 30 in advance of determination and notification of a radio link failure (RLF). Then is described, with respect to FIG. 41B, FIG. 43B, and FIG. 44B, an example implementation in which a list of cells served by the IAB-node 24A is transmitted to child node 30 with the notification of a radio link failure (RLF). Then is described, with respect to FIG. 41C, FIG. 43C, and FIG. 44C, an example implementation in which the node-serving cell information comprises an identification of IAB-node 24A, which is transmitted to the child node 30 in advance of determination and notification of a radio link failure (RLF).

Figure 41A:
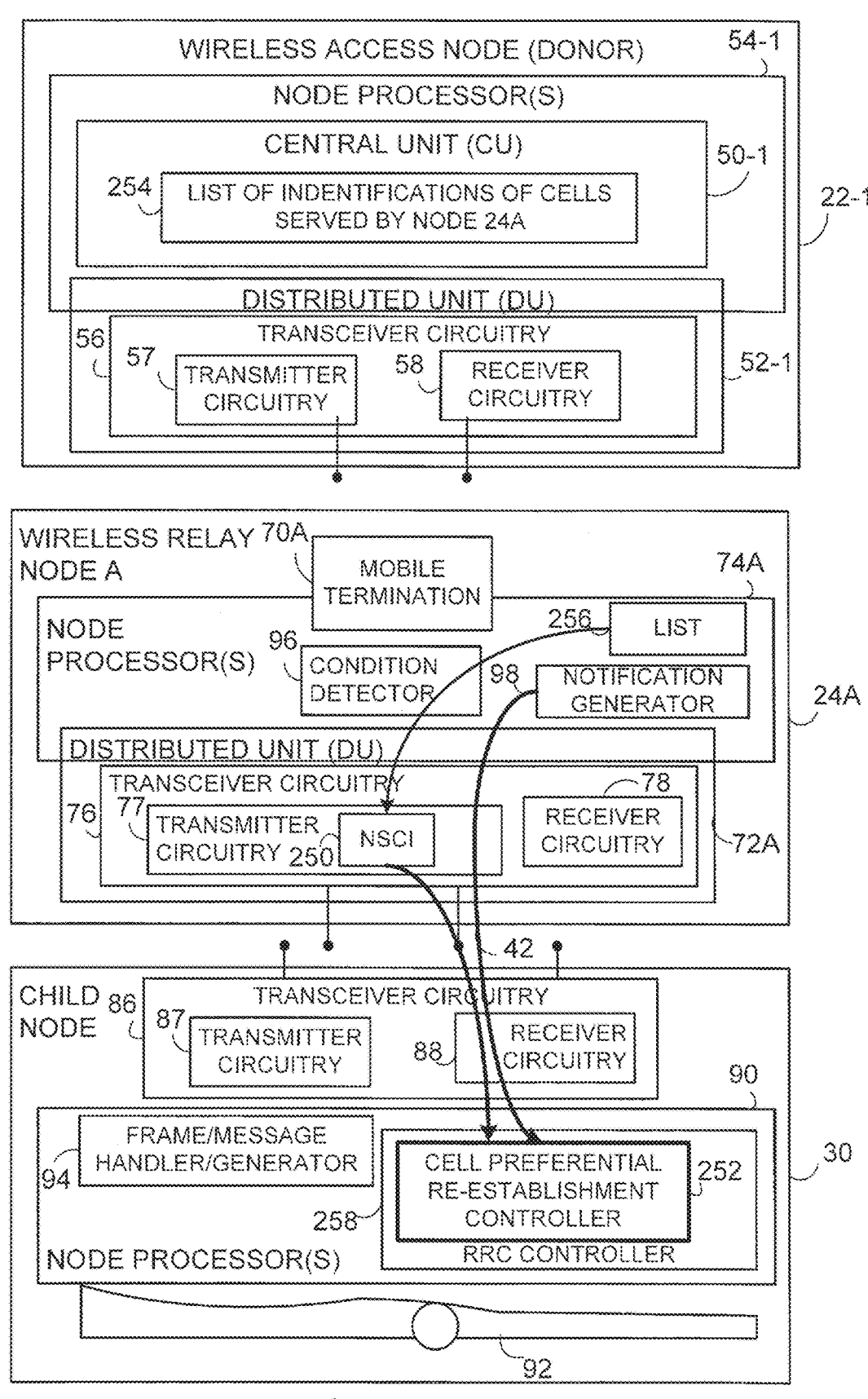
FIG. 41A is a schematic view showing details of respective example implementations telecommunications system of the generic system of FIG. 38 in which an IAB node may transmit node-serving cell information to permit a child node to perform a cell preferential re-establishment procedure.
Figure 41B:
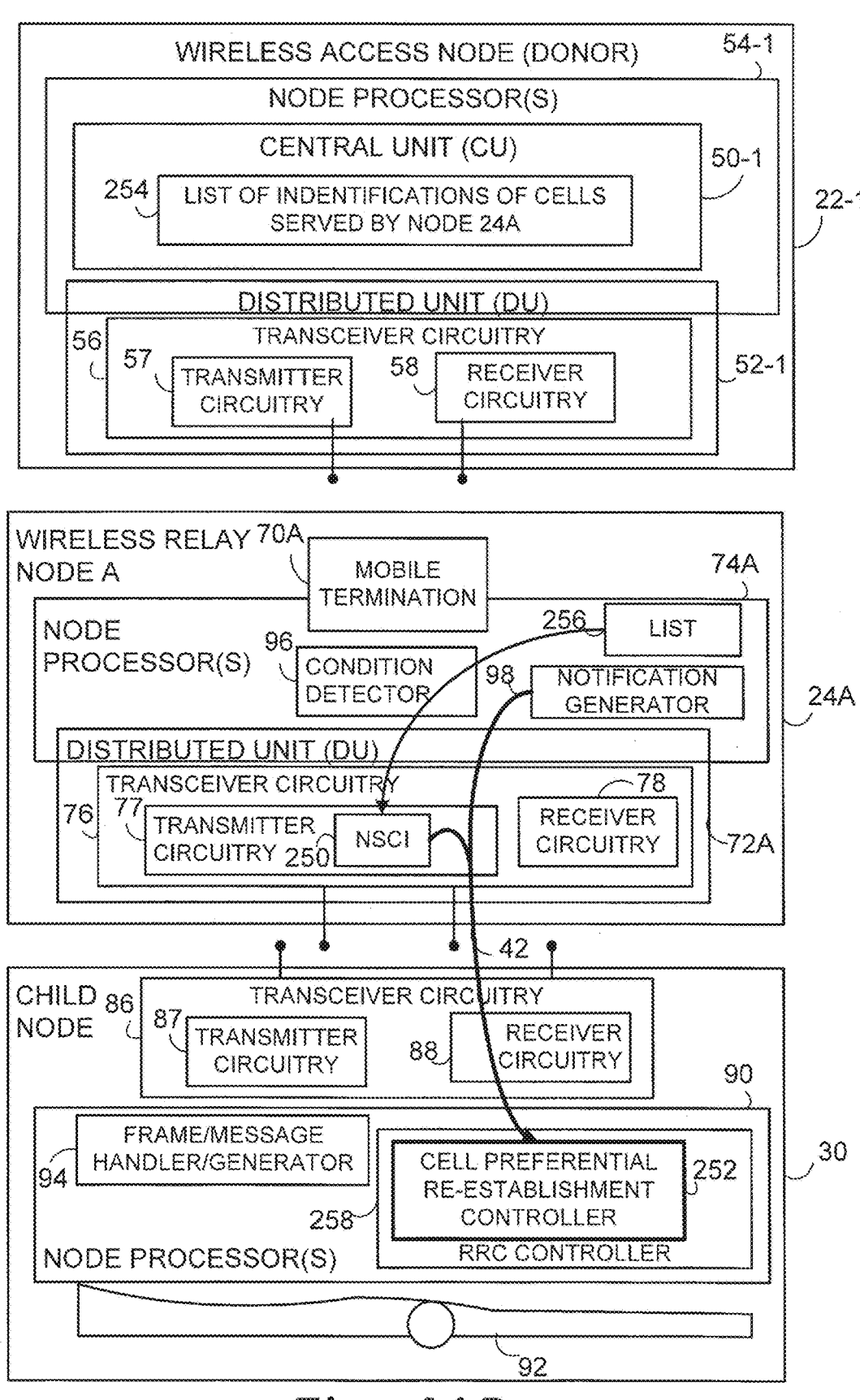
FIG. 41B is a schematic view showing details of respective example implementations telecommunications system of the generic system of FIG. 38 in which an IAB node may transmit node-serving cell information to permit a child node to perform a cell preferential re-establishment procedure.
Figure 41C:
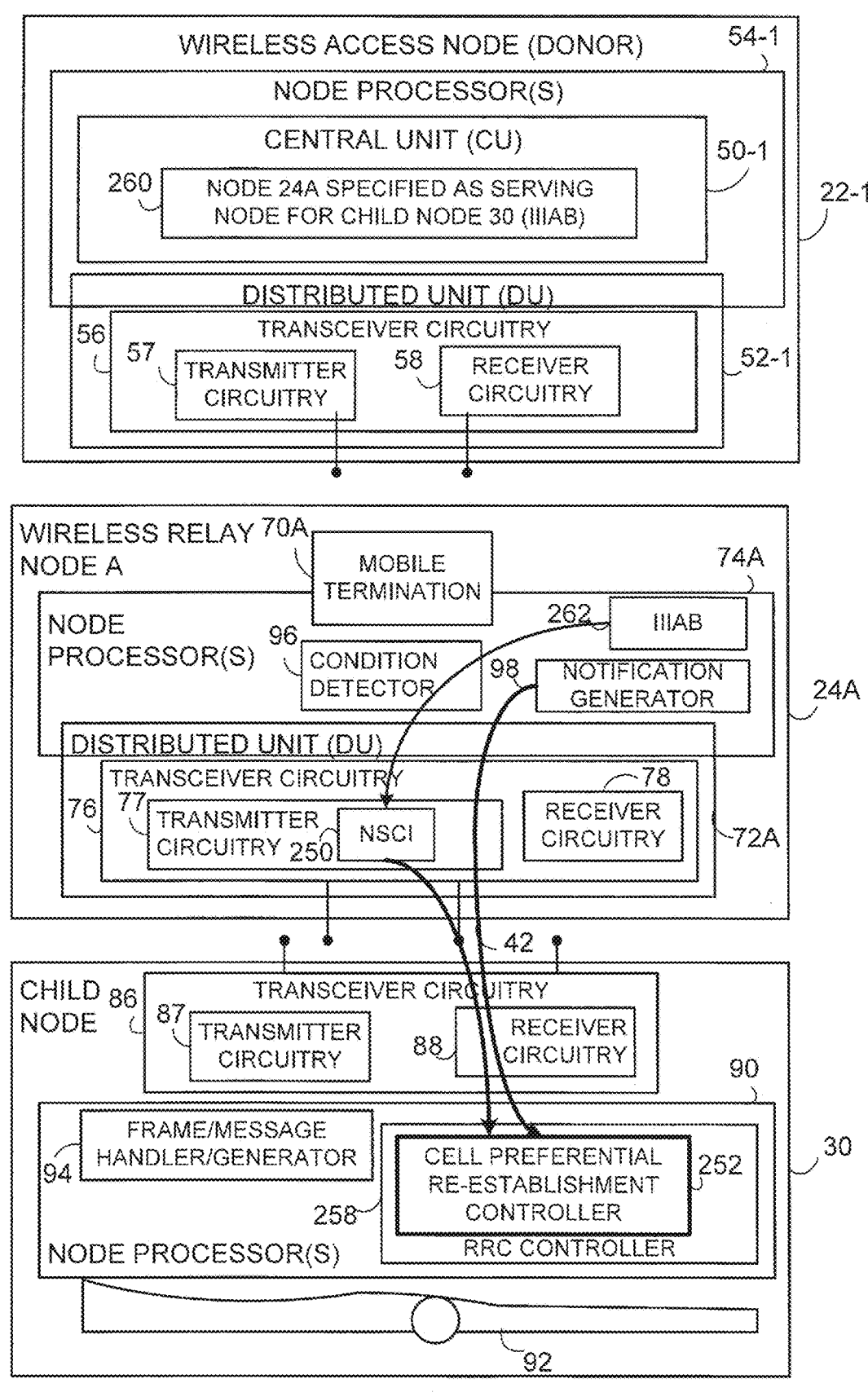
FIG. 41C is a schematic view showing details of respective example implementations telecommunications system of the generic system of FIG. 38 in which an IAB node may transmit node-serving cell information to permit a child node to perform a cell preferential re-establishment procedure.

FIG. 41A, FIG. 41B, and FIG. 41C show in more detail the respective example implementations telecommunications system in which an IAB node may transmit node-serving cell information to permit a child node to perform a cell preferential re-establishment procedure. Components of FIG. 41A, FIG. 41B, and FIG. 41C have similar names and/or reference numbers as components of preceding embodiments and modes have comparable structure and function as in the preceding embodiments and modes, unless otherwise noted or clear from the context. For example, the donor or parent IAB node 22-1 comprises central unit 50-1 and distributed unit 52-1, which may be realized by, e.g., by comprised of or include one or more processor circuits, e.g., node processor(s) 54-1. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 41A, FIG. 41B, and FIG. 41C, the IAB-node 24-1, also known as wireless relay node 24-1, in an example embodiment and mode comprises relay mobile termination (MT) unit 70A and relay distributed unit (DU) 72A. The relay mobile termination unit 70-1 and relay distributed unit 72-1 may be realized by, e.g., by comprised of or include one or more processor circuits, e.g., relay node processor(s) 74A. The relay node processor(s) 74A comprise the condition detector 96, as described in previous embodiments and modes, which may detect a radio link failure (RLF), and notification generator 98, which may generate the condition notification 42 upon detection of the radio link failure (RLF). The one or more relay node processor(s) 74 may be shared by relay mobile termination unit 70 and relay distributed unit 72A, or each of mobile termination unit 70A and distributed unit 72A may comprise one or more relay node processor(s) 74. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

As further shown in FIG. 41A, FIG. 41B, and FIG. 41C, child node 30 comprises, in an example, non-limiting embodiment and mode, transceiver circuitry 86. The transceiver circuitry 86 in turn may comprise transmitter circuitry 87 and receiver circuitry 88. The transceiver circuitry 86 includes antenna(e) for the wireless transmission. Transmitter circuitry 87 may include, e.g., amplifier(s), modulation circuitry and other conventional transmission equipment. Receiver circuitry 88 may comprise, e.g., amplifiers, demodulation circuitry, and other conventional receiver equipment. The child node 30, which (as indicated before) may be a user equipment or Integrated Access and Backhaul (IAB) node, also comprises node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example. In an example, non-limiting embodiment and mode shown in FIG. 23, the child node 30 may include frame/message generator/handler 94. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes.

Figures 43A, 43B:
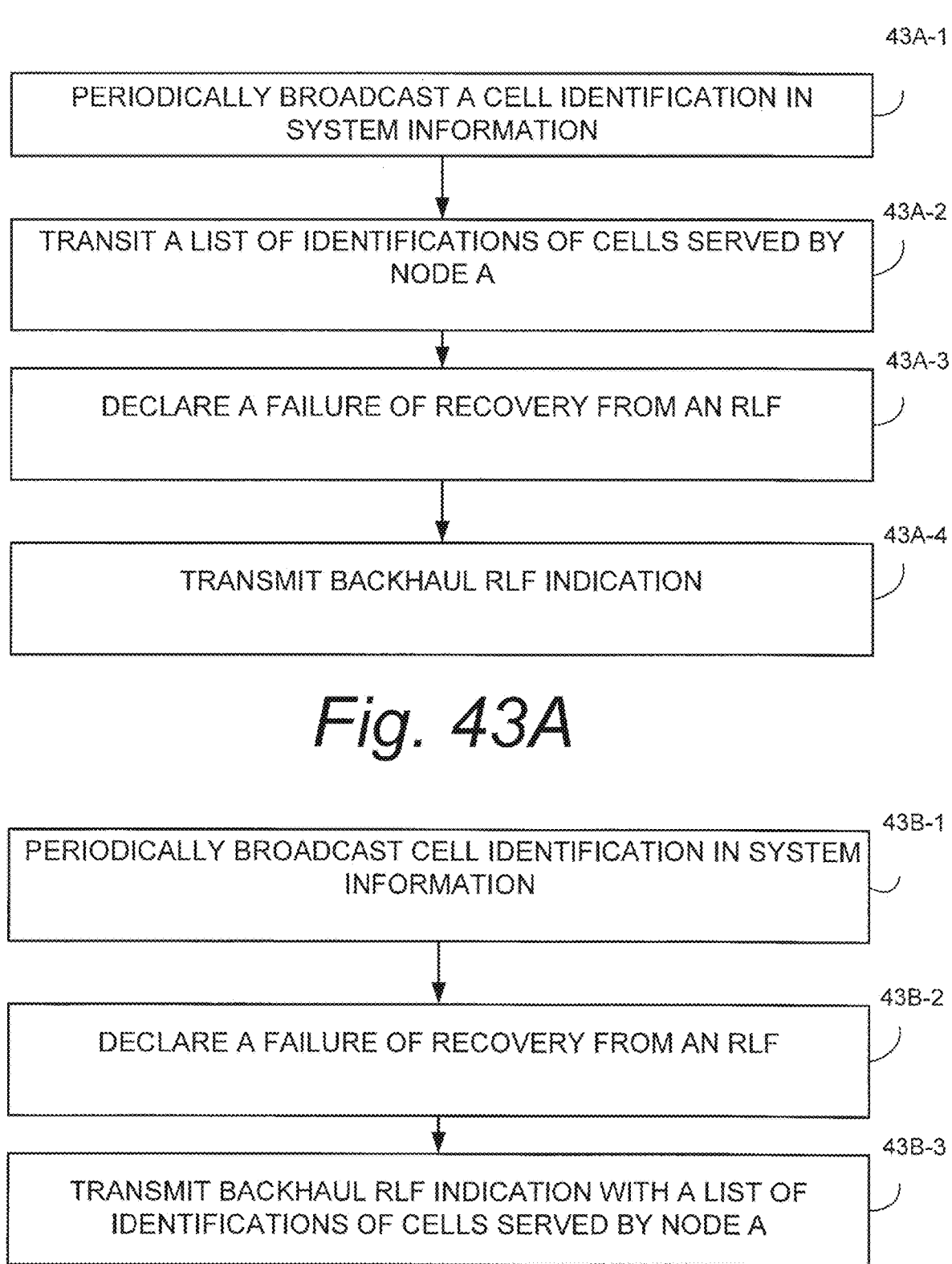
FIG. 43A is a flowchart showing example, representative acts or steps performed by an IAB node of the implementations of FIG. 41A, 41B, and 41C, respectively.
FIG. 43B is a flowchart showing example, representative acts or steps performed by an IAB node of the implementations of FIG. 41A, 41B, and 41C, respectively.

In the example implementation shown in FIG. 41A, FIG. 43A, and FIG. 44A, an IAB-node or a UE such as child node

30 may be informed of identifications of cells served by the current parent node. For example, the child node 30 may receive a list of identifications of cells, i.e., Cell A1, A2 and A3, served by IAB-node 24A. When receiving the Backhaul RLF Indication, the cell preferential re-establishment controller 252 of child node 30 may de-prioritize, e.g., avoid, selecting a cell whose identification is included in the list.

The child node 30 may camp on Cell B1, served by Node B, e.g., IAB-node 24B, since the identity of Cell B1 is not included in the list. In one configuration, the list of identifications of cells comprise Physical Cell IDs (PCIs). In this case, during the cell selection procedure Child Node may decode PBCH transmitted from a discovered cell and determine whether or not to select the cell, based on the list of identifications of cells. In another configuration, the list of identification of cells may comprise NR Cell Identities, where Child Node may have to receive a SIB(s), such as SIB1, (after receiving MIB) to determine whether or not to select the cell.

In the example implementation of FIG. 41A, a list of identifications of cells served by IAB-node 24A and the condition notification 42, which advises of the detected radio link failure (RLF), are separately transmitted by IAB-node 24A to child node 30. The transmission of the list of identifications of cells precedes the transmission of the condition notification 42. FIG. 41A shows that the donor or parent IAB node 22 may comprise a memory or server(s) 254 that maintains a list of identifications of cells served by IAB-node 24A. The list maintained by memory/server 254 is communicated over a first interface to IAB-node 24A, whereat it may be stored in memory/server 256 of IAB-node 24A, e.g., by processor(s) 74A. The IAB node distributed unit (DU) 72A of IAB-node 24A transmits the list of identifications of cells, obtained from memory/server 256, as the node-serving cell information 250, to child node 30, and does so in advance of detection and notification of any radio link failure (RLF). The child node 30 comprises an RRC controller 258, which in turn realizes or comprises the cell preferential re-establishment controller 252.

In the example implementation of FIG. 41B, the list of identifications of cells served by IAB-node 24A is included in the condition notification 42, e.g., is included in the backhaul RF indication. That is, the backhaul RF indication includes the list of identifications of cells served by IAB-node 24A, so that the list of identifications of cells and condition notification 42 are transmitted together, e.g., simultaneously.

In the example implementation of FIG. 41A, the list of identification of cells, in one configuration, may be included in system information, such as MIB, SIB1, or any other SIB(s). In this configuration, an IAB node or a UE, e.g. Child Node in FIG. 38 and FIG. 41A, may obtain the list whenever it acquires the system information. In another configuration of the implementation of FIG. 41A, the IAB node or the UE may obtain the list from the donor node via RRC signaling and/or F1AP signaling during RRC_CONNECTED. In the example implementation of FIG. 41B, the list of identification of cells may be included in a payload, a message body or a protocol data unit (PDU) of the Backhaul RLF indication.

In the example implementation of FIG. 41C, each cell may broadcast a node identification, such as gNB-DU ID per 3GPP TS 38.473 that identifies the node that serves the cell via system information. For example, in FIG. 18 and FIG. 41C, the system information, e.g., MIB, SIB1, and/or other SIB(s), broadcasted by each of the cells (A1, A2 and A3) may include a node identification of Node A as the node-serving cell information. When receiving the Backhaul RLF Indication, an IAB node or UE may save the node identification obtained from the cell that transmitted the Backhaul RLF Indication, then during the cell selection procedure Child Node may de-prioritize, or avoid, cells that broadcast the saved node identification. In the FIG. 41C implementation of the scenario shown in FIG. 38, child node 30 may obtain the node identification of Node A, e.g., IAB-node 24A, from Cell Al when camping, then after receiving the Backhaul RLF Indication from Cell A1, child node 30 may avoid camping on A2 or A3 since these cells also broadcast the node identification of Node A. Meanwhile, child node 30 may camp on Cell Bl, served by IAB-node 24B, as Cell B1 may broadcast the node identification of IAB-node 24B, different from the node identification of IAB-node 24A.

Thus, FIG. 40C shows that information which specifies the IAB node which serves a child node is transmitted to the child node 30. This information which specifies the IAB node which serves a child node may also be shown in FIG. 40C as IIIAB. The information which specifies the IAB node which serves a child node (IIIAB) may be maintained in memory/server 260 of donor or parent IAB node 22-1, and also in memory/server(s) 262 of IAB-node 24A. Similar to the situation of the implementation of FIG. 41A, the transmission to child node 30 of the information which specifies the IAB node which serves a child node (IIIAB) is separate from and precedes the transmission of the condition notification 42, of the backhaul RLF indication.

Figure 42:
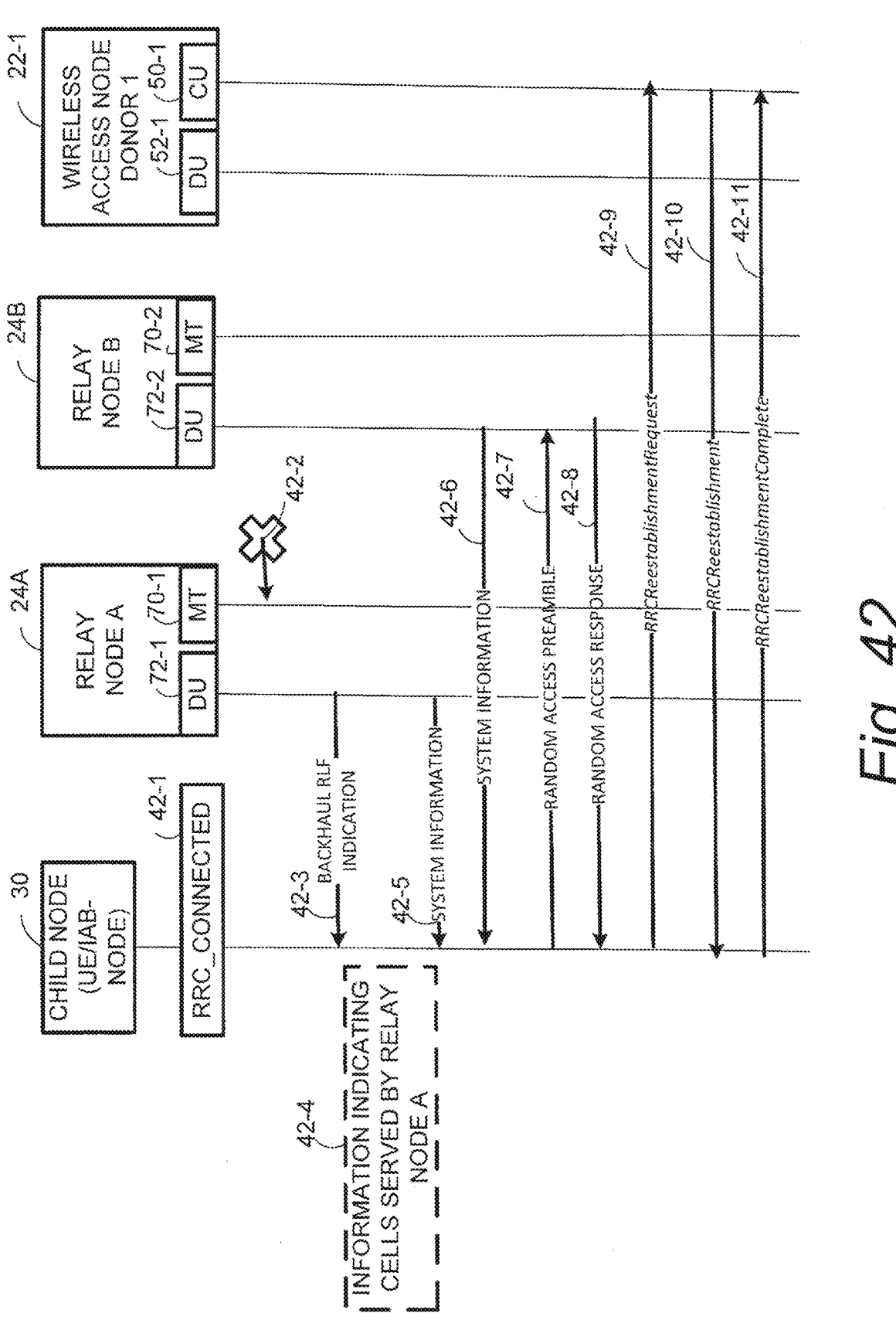
FIG. 42 is an example message flow of the generic scenario shown in FIG. 38.

FIG. 42 is an example message flow of the generic scenario shown in FIG. 38. As depicted by act 42-1, child node 30 is in Cell A1, RRC-CONNECTED with Donor 1, e.g., donor or parent IAB node 22-1, through IAB-node 24A. As shown by act 42-2, the MT part 70-1 of IAB-node 24A detects a radio link failure (RLF) on the upstream radio link and declares a failure of recovery from the RLF. As act 42-3 the DU part 72-1 of IAB-node 24A transmits the Backhaul RLF Indication to its downstream nodes/UEs, which is received by child node 30. As shown by symbol 42-4, at this moment child node 30 has information indicating cells served by Node A (also referred as "node serving cell information" or "NSCI"), where the information indicating cells served by Node A may refer to a list of identities of cells served by Node A, as in the cases of the implementation of FIG. 41A and the implementation of FIG. 41B, and/or a node identification of Node A as in the case of FIG. 41C. The child node 30 may have been obtained the information indicating cells served by Node A via system information, a dedicated signaling, or the Backhaul RLF Indication. The child node 30 then initiates a cell selection procedure, and eventually finds a cell, Cell Ax, served by Node A, where Ax may be A1, A2 or A3. As reflected by act 42-5, child node 30 then acquires system information (MIB, SIB1 and/or other SIB(s)) from Cell Ax, where the system information may comprise an identification of Cell Ax, and or the node identification of Node A, e.g., IAB-node 24A. From the information indicating cells served by Node A, e.g., from the node-serving cell information, the child node 30 may learn that Cell Ax should be avoided and/or de-prioritized. The child node 30 may then look for other cells and eventually find Cell B1. For example, as reflected by act 42-6, the child node 30 may, from system information broadcasted by Cell B1, may recognize Cell B1 as a suitable cell. Upon determining that Cell B1 may be a suitable cell, child node 30 proceed to initiating a Random Access procedure. The Random Access procedure is reflected by a message which transmits a Random Access Preamble as shown by act 42-7, and a Random Access Response, message reflected by act

42-8. Upon completion of the Random Access procedure, as act 42-9 the child node 30 transmits a RRCReestablishmentRequest message to donor or parent IAB node 22-1. As act 42-10 the donor or parent IAB node 22 may respond to child node 30 by sending a RRCReestablishment message. As act 42-11 the child node 30 may complete this re-establishment procedure by sending a RRCReestablishmentComplete message.

FIG. 43A, FIG. 43B, and FIG. 43C are flowcharts showing example, representative acts or steps performed by an IAB node of the implementations of FIG. 41A, 41B, and 41C, respectively.

FIG. 43A is a flow chart showing example representative steps or acts performed by IAB-node 24 of FIG. 18 and FIG. 41A, where the information indicating cells served by IAB-node 24A is a list of identifications of cells served by IAB-node 24A and is transmitted prior to sending the Backhaul RLF Indication. Act 43A-1 comprises each of the cells served by IAB-node 24A, i.e. Cell A1, A2 and A3, periodically broadcasting its cell identification in the system information, e.g., MIB, SIB1 and/or other SIB(s). Act 43A-2 comprises the IAB-node 24A transmitting the list of identifications of cells served by IAB-node 24A, via a dedicated signaling or by broadcast. Act 43A-3 comprises IAB-node 24A declaring a failure of recovery from an RLF. Act 43A-4 comprises the IAB-node 24A transmitting the Backhaul RLF Indication to nodes/UEs downstream, including child node 30 of FIG. 18 and FIG. 41A.

FIG. 43B is a flow chart showing example representative steps or acts performed by the IAB-node 24A of FIG. 18 and FIG. 41B, where the information indicating cells served by the IAB-node 24A is a list of identifications of cells served by IAB-node 24A and is transmitted in conjunction with the Backhaul RLF Indication. Act 43B-1 and Act 43B-2 are the same as Act 43A-1 and Act 43A-3, respectively. Act 43B-3 comprises transmitting the Backhaul RLF Indication to nodes/UEs downstream, including child node 30 of FIG. 18 and FIG. 41B, where the Backhaul RLF Indication includes the list of identifications of cells served by IAB-node 24A.

FIG. 43C is a flow chart showing example representative steps or acts performed by the IAB-node 24A of FIG. 18 and FIG. 41C, where the information indicating cells served by IAB-node 24A is a node identification of IAB-node 24A. Act 43C-1 comprises each of the cells served by IAB-node 24A, i.e. Cell A1, A2 and A3, periodically broadcasting the node identification of IAB-node 24A in the system information, e.g., in MIB, SIB1 and/or other SIB(s). Act 43C-2 and Act 43C-3 are the same as Act 43A-3 and Act 43A-4, respectively.

FIG. 44A, FIG. 44B, and FIG. 44C are flowcharts showing example, representative acts or steps performed by a child node of the implementations of FIG. 41A, 41B, and 41C, respectively.

FIG. 44A is a flow chart showing example representative steps or acts performed by child node 30 of FIG. 18 and FIG. 41A and corresponding to the acts performed by IAB-node 24A in FIG. 43A, where the information indicating cells served by IAB-node 24A, e.g., the node-serving cell information, is a list of identifications of cells served by IAB-node 24A and is transmitted prior to sending the Backhaul RLF Indication. Act 44A-1 comprises receiving a cell indication included in the system information periodically broadcasted by Cell Al. Act 44A-2 comprises receiving a list of identifications of cells served by IAB-node 24A, via a dedicated signaling or by broadcast. Act 44A-3 comprises receiving the Backhaul RLF Indication. Act 44A-4 comprising performing a cell selection/re-establishment procedure, avoiding (or de-prioritizing) a cell that broadcasts one of the cell identifications in the list.

FIG. 44B is a flow chart showing example representative steps or acts performed by IAB-node 24A of FIG. 18 and FIG. 41B, and corresponding to acts performed by the IAB-node 24A as shown in FIG. 43B, where the information indicating cells served by IAB-node 24A, e.g., the node-serving cell information, is a list of identifications of cells served by IAB-node 24A and is transmitted in conjunction with the Backhaul RLF Indication. Act 44B-1 is the same as Act 44A-1. Act 44B-2 comprises receiving the Backhaul RLF Indication including a list of identifications of cells served by Node A. Act 44B-3 is the same as Act 44A-4.

FIG. 44C is a flow chart showing example representative steps or acts performed by child node 30 of FIG. 18 and FIG. 41C and corresponding to the acts performed by IAB-node 24A as shown in FIG. 43C, where the information indicating cells served by IAB-node 24A, e.g., the node-serving cell information, is a node identification of IAB-node 24A. Act 44C-1 comprises receiving a node identification of IAB-node 24A included in the system information periodically broadcasted by Cell Al. Act 44C-2 is the same as Act 44A-3. Act 44C-4 comprises performing a cell selection/re-establishment procedure, avoiding or de-prioritizing cells that broadcast the node identification of IAB-node 24A.

The example embodiment and mode herein described thus handles cases where an IAB node performs an RRC re-establishment procedure. Specifically:

The IAB node transmits to its child nodes/UEs node serving cell information that is used to identify cells served by the IAB node.

The IAB node transmits a backhaul radio link failure (RLF) indication to the child nodes/UEs when it fails to recover an RLF detected on the upstream radio link.

Upon receiving the backhaul RLF indication, the child nodes/UEs performs an RRC re-establishment procedure, wherein a cell identified by the node serving cell information is considered to be barred or treated as a low rank cell.

The node serving cell information may comprise a list of identifications of cells that are served by the IAB node, or may comprise a node identification of the IAB node.

Each of the cells served by the IAB node may broadcast the node identification in system information.

In a case that the IAB node performs an inter-CU (inter-donor) RRC re-establishment procedure to a target donor (CU), the IAB node transmit, to the child nodes/UEs, a re-establishment indication.

Upon receiving the re-establishment indication, each of the child nodes/UEs performs an RRC re-establishment procedure with the target donor (CU).

Inter-Donor Node RRC Update Procedure

Figure 45:
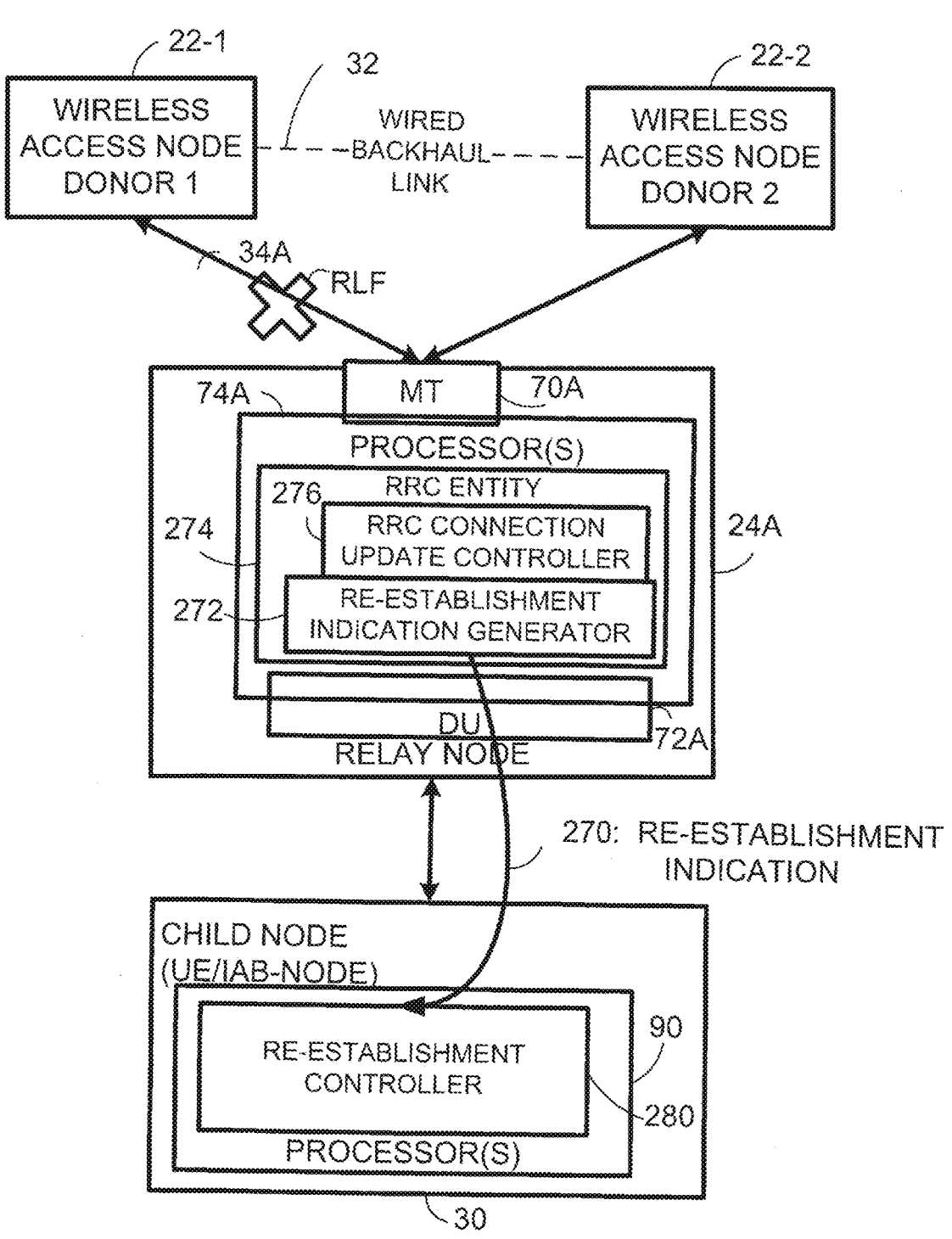
FIG. 45 is a diagrammatic view showing another example and generic telecommunications system in which an IAB node may update an RRC connection and thereby require a child node to perform a re-establishment procedure with respect to a new donor IAB node

As disclosed in the preceding embodiments, an IAB node may initiate an RRC re-establishment procedure in a case that it detects an RLF upstream, or in a case that it receives the Backhaul RLF Indication. FIG. 45 illustrates a scenario where an IAB node, such as IAB-node 24A, communicates with a donor node/CU, e.g., donor or parent IAB node 22-1, then detects a radio link failure (RLF), and then performs the RRC re-establishment procedure to a different donor node/CU, e.g., donor or parent IAB node 22-2. In the FIG. 45 example embodiment and mode the two donor nodes (CUs) are inter-connected by inter-node protocols, such as Xn Application Protocol (XnAP) per 3GPP TS 38.423, over a wired backhaul connection 32.

Figure 46A:
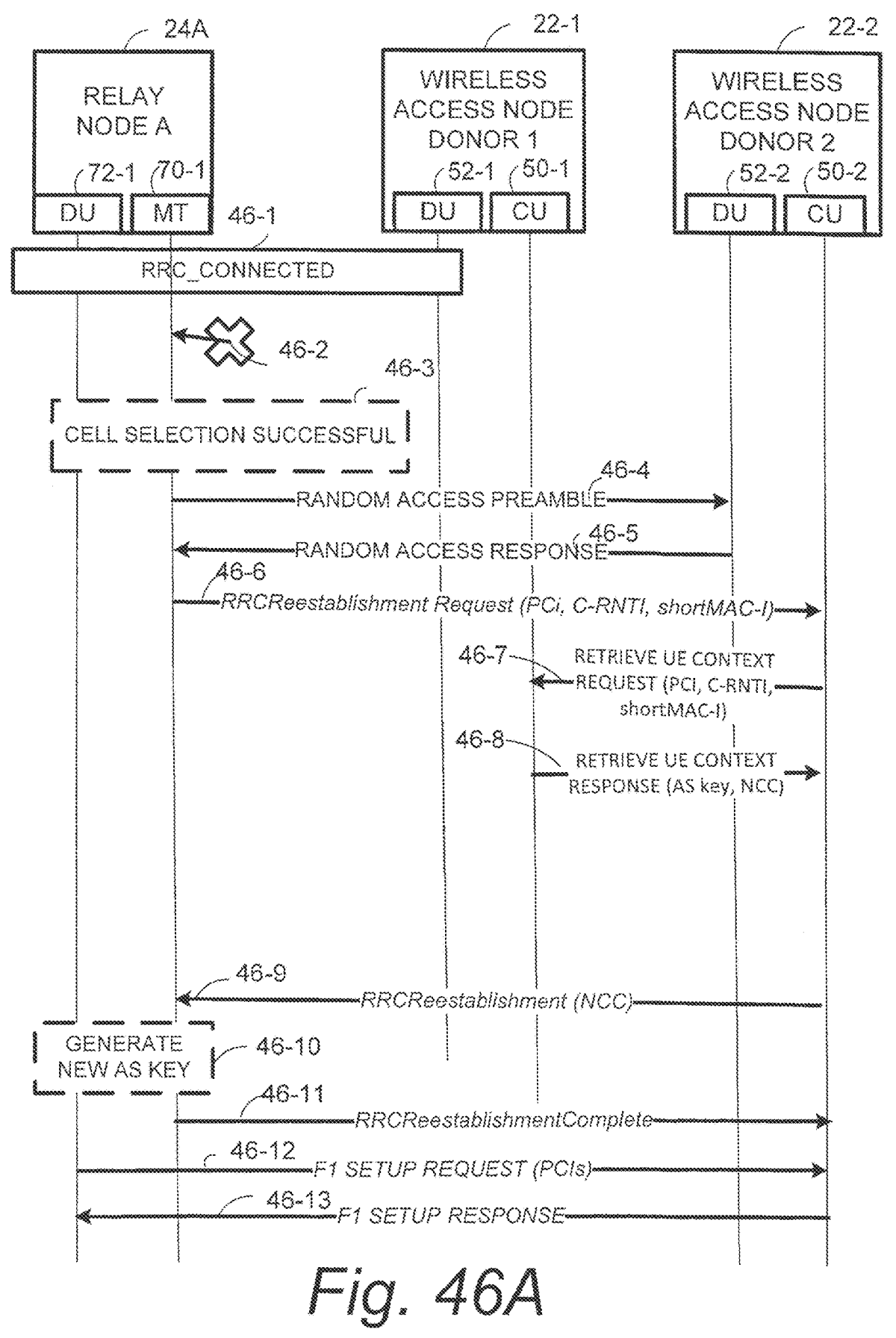

FIG. 46A shows one example message flow of IAB-node 24A performing an inter-CU (inter-donor) re-establishment procedure in the scenario shown in FIG. 45. As shown by act 46-1, IAB-node 24A is in RRC_CONNECTED with donor IAB node 22-1. Act 46-3 shows IAB-node 24A detecting a radio link failure (RLF) on its upstream. Following the detection of the RLF, as act 46-3 IAB-node 24A may initiate the cell selection procedure to find a suitable cell, which leads to finding a cell served by a DU part 52-2 of donor IAB node 22-2. IAB-node 24A may then perform the Random Access procedure, which includes as act 46-4 sending a random access preamble to donor IAB node 22-2 and, as act 46-5, receiving a random access response message from donor IAB node 22-2. Then, as act 46-6, IAB-node 24A may send a RRCReestablishmentRequest to donor IAB node 22-2. The RRCReestablishmentRequest of act 46-6 may comprise an identity of the mobile termination 70-1 of IAB-node 24A and a security token field. The identity of the mobile termination 70-1 of IAB-node 24A may comprise the Physical Cell ID (PCI) of the old serving cell (the cell served by donor IAB node 22-1 that IAB-node 24A camped before the RLF), and the C-RNTI (Cell-Radio Network Temporary Identifier) assigned by the old serving cell. The security token field, e.g. shortMAC-I per 3GPP TS 38.331, computed based on security keys configured by donor IAB node 22-1, may be used by donor IAB node 22-2 to authenticate IAB-node 24A. Upon receiving the RRCReestablishmentRequest of act 46-6, the donor IAB node 22-2 may identify, from the identity of the mobile termination 70-1 of IAB-node 24A, the old serving node, e.g., donor IAB node 22-1, and as act 46-7 send to donor IAB node 22-1 a RETRIEVE UE CONTEXT REQUEST, which includes the identity of the mobile termination 70-1 of IAB-node 24Aand the security token field. The donor IAB node 22-1 may then check, based on saved context of IAB-node 24A, if the security token field is correct, and if the check is positive, donor IAB node 22-1 may proceed to derive a fresh Access Stratum (AS) security key(s) using a Next Hop Chaining Count, NCC, and as act 46-8 send back to donor IAB node 22-2a RETRIEVE UE CONTEXT RESPONSE which includes the fresh security key(s) as well as Next Hop Chaining Count (NCC). As act 46-9 the donor IAB node 22-2 may transmit a RRCReestablishment message to IAB-node 24A, which RRCReestablishment message may include the NCC and may be integrity-protected by the fresh security key(s). Upon receiving the RRCReestablishment, as act 46-10 IAB-node 24A may generate a AS security key(s) using the NCC and check if the integrity protection of the RRCReestablishment is valid. If this check is positive, then the generated AS security key(s) may replace the AS security key(s) and may be used for encryption and integrity protection of messages between IAB-node 24A and donor IAB node 22-2, including the RRCReestablishmentComplete shown as act 46-11 in FIG. 46A.

After completing the RRC re-establishment procedure, as act 46-12 the DU part 722-1 of IAB-node 24A may initiate an Fl Setup procedure by sending a F1 SETUP REQUEST to donor IAB node 22-2. The F1 SETUP REQUEST may comprise identifications of cells, such as CGIs and/or PCIs, that IAB-node 24A is able to serve. Hereafter, the cells are recognized as being bound to donor IAB node 22-2. The donor IAB node 22-2 may then as act 46-13 send back F1 SETUP RESPONSE to activate some or all of the cells.

In the FIG. 46A operation as described above, at the moment that IAB-node 24A successfully finishes the re-establishment procedure, any nodes/UEs that connect to IAB-node 24A, such as child node 30 in FIG. 45, may not be aware that the parent node, IAB-node 24A, has changed its donor node, e.g., changed from donor IAB node 22-1 to donor IAB node 22-2. In addition, the child node 30 has not established a security context with the new donor IAB node 22-2. Moreover, the radio bearers, data radio bearers (DRBs) and signaling radio bearers (SRBs) for the child node 30, which were established with donor IAB node 22-1, are now all lost after the re-establishment performed by IAB-node 24A. Therefore, there is a need for a child node such as child node 30 to re-establish the radio bearers with a new security context for donor IAB node 22-2

The IAB-node 24A and child node 30 of FIG. 45 are configured to address issues that may arise when an RRC connection involving a child node needs to be updated. One example situation in which the RRC connection involving child node 30 needs to be updated is the situation described above in which an IAB-node 24 has changed its donor IAB node, such as IAB-node 24A changing from donor IAB node 22-1 to donor IAB node 22-2 as described above. Another situation in which the RRC connection involving child node 30 needs to be updated is described further below, when the RRC connection is handed over from one donor IAB node to another donor IAB node, e.g., when the update of the RRC connection includes an RRC reconfiguration with sync procedure to the second donor node. FIG. 45 generically shows that, for addressing such an RRC connection involving child node 30 needs to be updated, the IAB-node 24A generates and transmits to child node 30 a re-establishment indication 270.

The IAB-node 24A of FIG. 45 communicates over at least two radio interfaces including a first interface and a second interface. The first interface is configured to establish a radio resource control (RRC) connection with at least one donor node; the second interface is configured to serve one or more cells to communicate with one or more wireless terminals, such as child node 30. The IAB-node 24A of FIG. 45 comprises processor circuitry and transmitter circuitry. The processor circuitry, illustrated by parent node processor circuitry 74A, is configured to establish an RRC connection with a first donor node and to perform an update of the RRC connection to be used for a second donor node. The transmitter circuitry may be realized by or comprise IAB node distributed unit (DU) 72A, and is configured to transmit, using the second interface, the re-establishment indication 270, upon performing the update of the RRC connection. The re-establishment indication is used to request that each of the one or more wireless terminals initiate an RRC re-establishment procedure.

The re-establishment indication 270 may be generated by re-establishment indication generator 272. The re-establishment indication generator 272 may be hosted or comprise an RRC entity 274. The RRC entity 274 may also comprise or include an RRC connection update controller 276, which performs the RRC connection update procedure, whether a procedure involving change of donor IAB node for the IAB-node 24 or a handover. The RRC entity 274 may be realized or be comprised by parent node processor circuitry, e.g., IAB node processor(s) 74A.

The child node 30 comprises receiver circuitry and processor circuitry, such as processor circuitry 90. The receiver circuitry is configured to receive the re-establishment indication 270 from the IAB node. The processor circuitry is configured to initiate an RRC re-establishment procedure, based on the re-establishment indication. During the re-establishment procedure, one or more cells that served by the IAB node are considered as candidate cells. Thus, upon receipt of the re-establishment indication 270, child node 30 a re-establishment controller 280 performs a cell preferential re-establishment procedure. The re-the establishment controller 280 may be realized or comprised by processor circuitry 90 of child node 30.

FIG. 47 is a flowchart showing example, representative, acts or steps performed by a generic IAB node of the system of FIG. 45. Act 47-1 comprises establishing an RRC connection with a first donor node. Act 47-2 comprises performing an update of the RRC connection to be used for a second donor node. Act 47-3 comprises transmitting, using the second interface, a re-establishment indication, upon performing the update of the RRC connection. The re-establishment indication 270 is configured to require each of the one or more wireless terminals initiate an RRC re-establishment procedure. In an example embodiment and mode during the RRC re-establishment procedure, the one or more cells are considered as candidate cells.

FIG. 48 is a flowchart showing example, representative, acts or steps performed by a generic child node of the system of FIG. 45. Act 48-1 comprises receiving, from the IAB node, a re-establishment indication. Act 48-2 comprises initiating an RRC re-establishment procedure, based on the re-establishment indication. In an example embodiment and mode, during the RRC re-establishment procedure one or more cells that served by the IAB node are considered as candidate cells.

Figure 49:
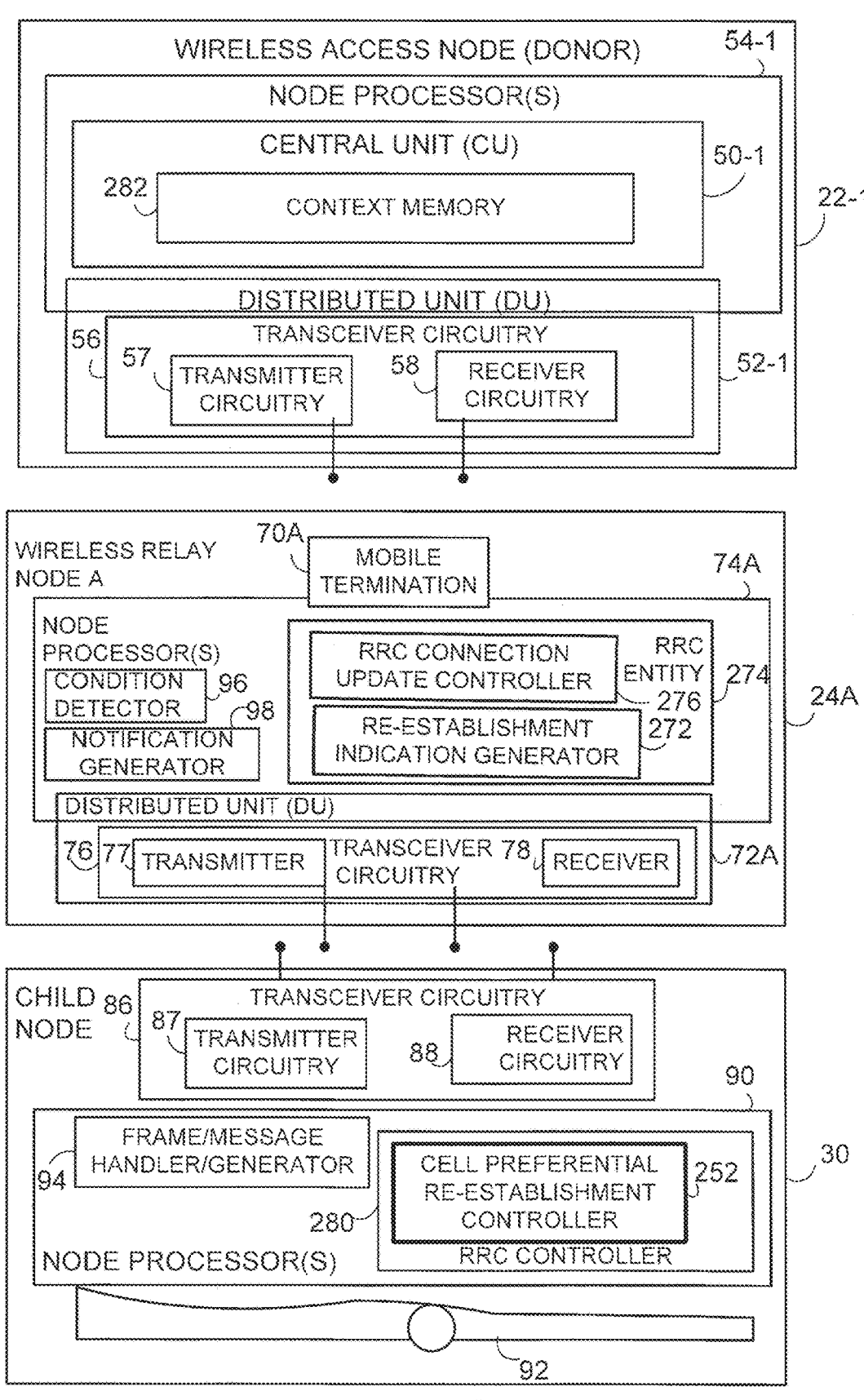
FIG. 49 is a schematic views showing details of an example implementation telecommunications system of the generic system of FIG. 45 wherein an IAB node performs a RRC Connection Re-establishment.

FIG. 49 shows in more detail an example implementation of the generic telecommunications system of FIG. 45. Components of the system of FIG. 49 which have similar names and/or reference numbers as components of preceding embodiments and modes have comparable structure and function as in the preceding embodiments and modes, unless otherwise noted or clear from the context. For sake of simplicity, FIG. 49 shows only one of the donor or parent IAB nodes illustrated in FIG. 45, e.g., donor IAB node 22-1 which is illustrated as comprising central unit 50-1 and distributed unit 52-1, which may be realized by, e.g., by comprised of or include one or more processor circuits, e.g., node processor(s) 54-1. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 49, also known as wireless relay node 24-1, in an example embodiment and mode comprises relay mobile termination (MT) unit 70A and relay distributed unit (DU) 72A. The relay mobile termination unit 70A and relay distributed unit 72A may be realized by, e.g., by comprised of or include one or more processor circuits, e.g., relay node processor(s) 74A. The relay node processor(s) 74A comprise the condition detector 96, as described in previous embodiments and modes, which may detect a radio link failure (RLF), and notification generator 98, which may generate the condition notification 42 upon detection of the radio link failure (RLF). In addition, as shown in FIG. 45, the IAB node processor circuitry 74A may comprise RRC entity 274, which in turn may comprise re-establishment indication generator 272 and RRC connection update controller 276. The one or more relay node processor(s) 74A may be shared by relay mobile termination unit 70A and relay distributed unit 72A, or each of mobile termination unit 70A and distributed unit 72A may comprise one or more relay node processor(s) 74A. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

As further shown in FIG. 49, child node 30 comprises, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. The child node 30, which (as indicated before) may be a user equipment or Integrated Access and Backhaul (IAB) node, also comprises node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example. In an example, non-limiting embodiment and mode shown in FIG. 23, the child node 30 may include frame/message generator/handler 94. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes. As shown also in FIG. 45, the child done processor(s) 90 may comprise re-establishment controller 280.

Figure 46B:
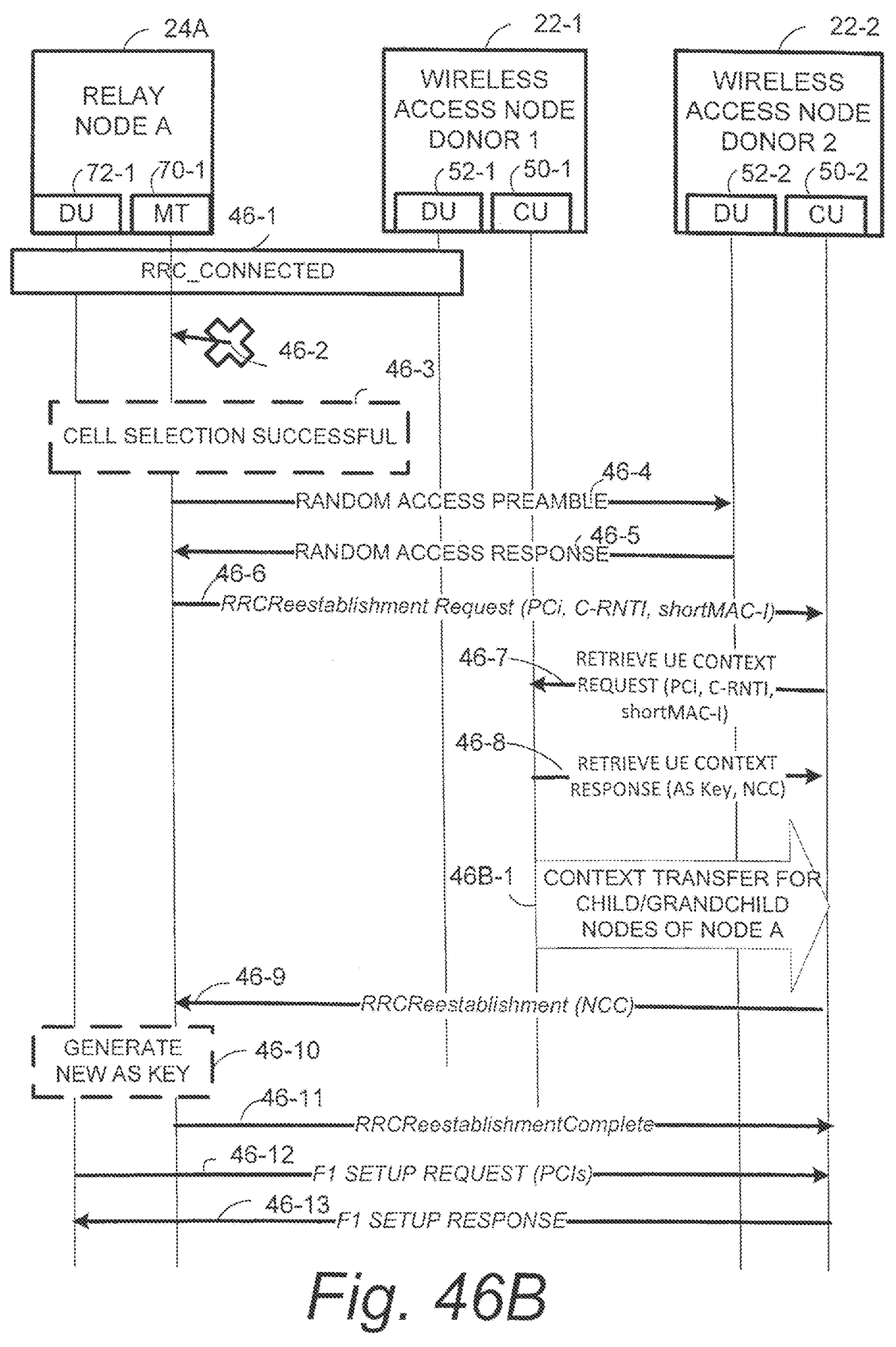

As one aspect of addressing some of the issues that may arise when an RRC connection involving a child node needs to be updated, an example embodiment and mode of the system of FIG. 45 and FIG. 49 may transfer UE contexts of child/grandchild nodes, IAB-nodes/UEs, that are currently connected to a source donor node via a parent IAB node to a target donor node, upon the parent IAB-node's inter-CU re-establishment. FIG. 46B shows one example message flow of such an example embodiment and mode, where, in addition to the message flow shown in FIG. 46A, donor IAB node 22-1, also referred to as the source or source donor node, may transfer the contexts to donor IAB node 22-2, which may also be referred to as the target or target donor node. The transfer may involve or comprise UE contexts of some or all of the child/grandchild nodes of the affected IAB-node 24, such as child node 30 in FIG. 45, for example. Since, in a typical implementation, a donor node, and preferably a CU part of the donor node, manages routings and topologies of the relay network belonging to the donor node, the source donor node, e.g., donor IAB node 22-1, may have knowledge of which contexts need to be transferred to the target donor node when it becomes aware of a re-establishment procedure performed by an IAB-node. A context of an IAB-node or a UE may include, but not limited to, an AS security key, a Next Hop Chaining Count, NCC and a security token (e.g. shortMAC-I) to be used in the target donor node. Accordingly, each donor IAB node 22 may comprise context memory 282, which may store context information for the IAB-nodes and grand-children nodes. FIG. 49 shows such context memory 282 for donor IAB node 22-1, but it should also be understood that donor IAB node 22-2 may also have context memory 282 which stores contexts for its child and grandchild nodes, as well as contexts which are transferred thereto from donor IAB node 22-1. The context memory 282 is preferably hosted by a processor and/or memory structure of the CU part 50, and IAB node processor(s) 54, of the respective donor IAB node 22.

Thus, as understood from the foregoing, the flow of FIG. 46B primarily differs from that of FIG. 46A by further including act 46B-1. As shown in FIG. 46B, the context transfer for the child/grandchild nodes which is represented by act 46B-1 may be initiated immediately after the RETRIEVE UE CONTEXT RESPONSE, e.g., context retrieval for IAB-node 24A, which occurs as act 46-8.

Figure 50:
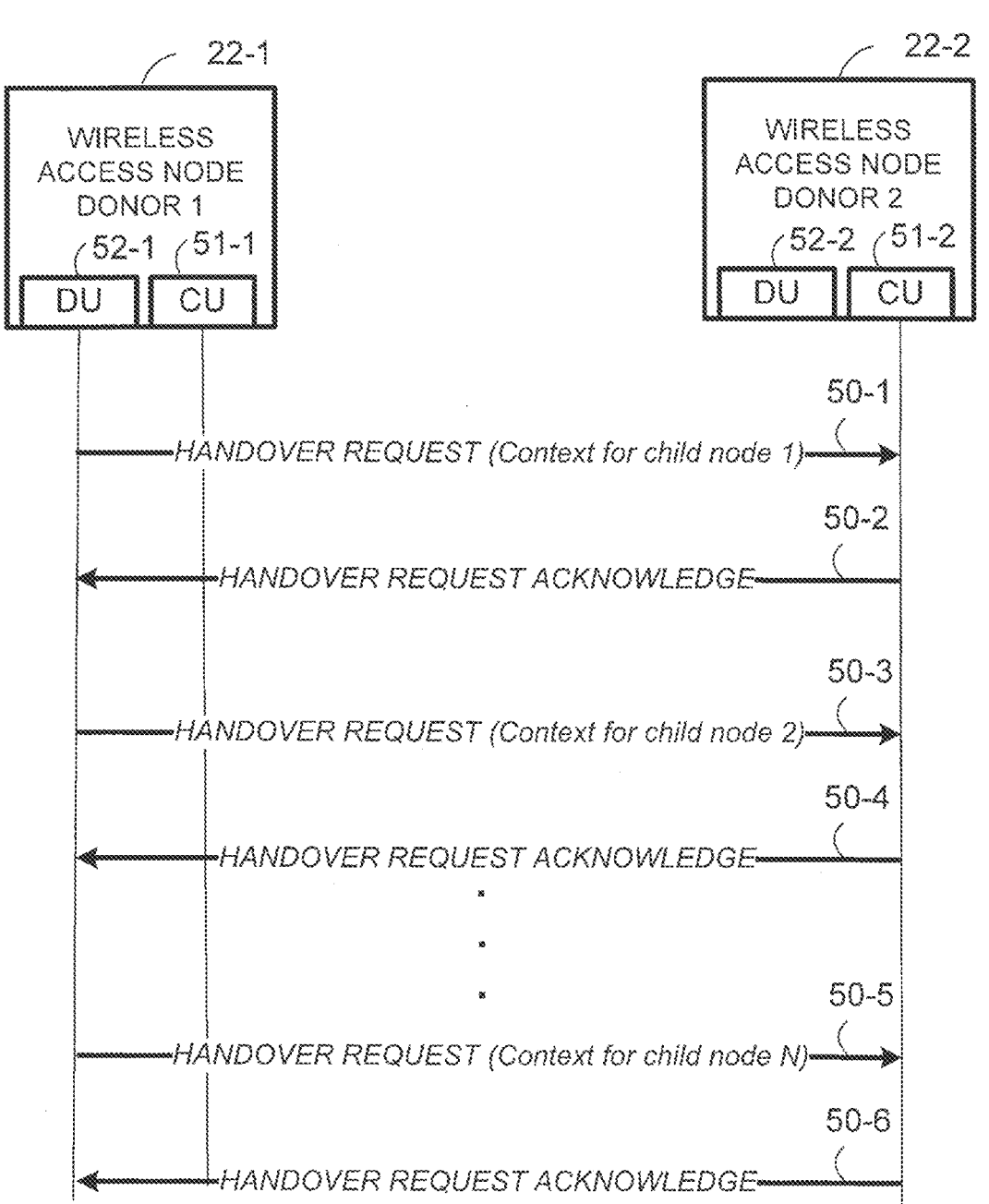
FIG. 50 is a diagrammatic view of message flow showing another implementation of how the system of FIG. 45 and FIG. 49 may perform context transfer.

FIG. 50 shows another implementation of the system of FIG. 45 and FIG. 49 in which the context transfer may be performed by a different technique: the context transfer may be performed per each child/grandchild node basis, where XnAP HANDOVER REQUEST messages, such as messages 50-1, 50-3, and 50-5 may be used to transfer each child/grandchild's context. FIG. 50 also shows respective HANDOVER REQUEST ACKNOWLEDGEMENT messages 50-2, 50-4, and 50-6.

Figure 51A:
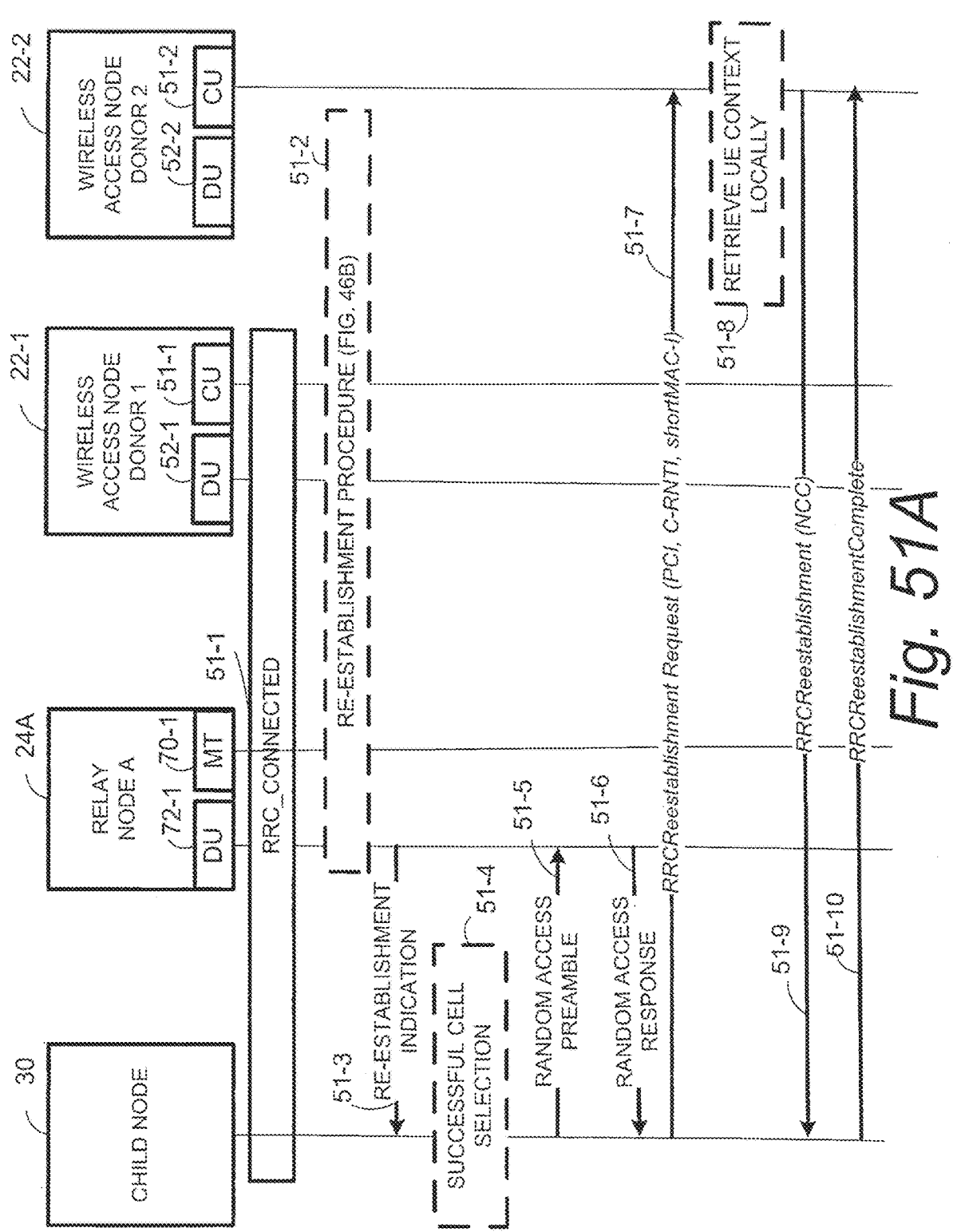
FIG. 51A is a diagrammatic view depicting message flow of example RRC re-establishment procedure for a child node and an example inter-CU handover, respectively.

FIG. 51A shows an example message flow of another RRC re-establishment procedure for child node 30. In the scenario shown in FIG. 51A, the donor IAB node 22-1, the IAB-node 24A, and the child node 30 are all in RRC_Connected state, as shown by act 51-1. Moreover, the re-establishment procedure of FIG. 46B is performed as act 51-2. In the scenario of FIG. 51A, the parent node, e.g. IAB-node 24A, may inform its child nodes of the completion of the RRC re-establishment procedure, which is shown by act 51-3 as "re-establishment indication" in FIG. 51A. The re-establishment indication of act 51-3 is also shown as the re-establishment indication 270 in FIG. 45. Upon receiving the re-establishment indication, each of the child nodes, e.g. child node 30, may perform the RRC re-establishment procedure for its own, as reflected by act 51-4 which is labeled "successful cell selection". After the cell selection, the child node 30 may then perform the Random Access procedure, which includes as act 51-5 sending a random access preamble to IAB-node 24A and, as act 51-6, receiving a random access response message from IAB-node 24A. Then, as act 51-7, child node 30 may send a RRCReestablishmentRequest to donor IAB node 22-2. The RRCReestablishmentRequest of act 46-6 may comprise an identity of the child node 30 and a security token field. The identity of the child node 30 may comprise the Physical Cell ID (PCI) of the old serving cell, e.g., the cell served by IAB-node 24A that the child node 30 camped before receiving the re-establishment indication, and the C-RNTI (Cell-Radio Network Temporary Identifier) assigned by the old serving cell. As mentioned before, the security token field, e.g. short-MAC-I per 3GPP TS 38.331, computed based on security keys configured by donor IAB node 22-1, may be used by donor IAB node 22-2 to authenticate the child node 30. Upon receiving the RRCReestablishmentRequest of act 51-7, the donor IAB node 22-2 may identify, from the identity of the child node 30, the child node 30, and as act 51-8, retrieve the UE context for child node 30 locally. After locally obtaining the UE context, as act 51-9 the donor IAB node 22-2 may transmit a RRCReestablishment message to IAB-node 24A, which RRCReestablishment message may include the Next Hop Chaining Count, NCC, and may be integrity-protected by the fresh security key(s). Upon receiving the RRCReestablishment, as act 51-10, the child node 30 may send a RRCReestablishmentComplete message to donor or parent IAB node 22-2.

FIG. 51A shows a case where the cell selection of act 51-4 results in child node 30 selecting a cell served by IAB-node 24A. If child node 30 ends up with selecting a cell not served by IAB-node 24A, child node 30 may perform the re-establishment procedure in the similar manner as IAB-node 24A performs as illustrated in FIG. 46A, except for the F1 SETUP REQUEST/RESPONSE.

The re-establishment indication, e.g., re-establishment indication 270, may be transmitted from IAB-node 24A in a dedicated signaling or by broadcast. The re-establishment indication 270 may be carried by physical layer signaling, e.g., such as PDCCH, MAC layer, e.g., such as by a MAC Control Element, BAP layer signaling, broadcast in system information, or by any other protocol layer. The re-establishment indication 270 may be transmitted multiple times on the downlink of IAB-node 24A downstream.

In some example embodiments and modes the re-establishment indication 270 may have to be distinguishable from the aforementioned Backhaul RLF Indication, e.g., condition notification 42, that indicates a failure of an RLF recovery. In a case of the failure of the RLF recovery, child node 30 may have to avoid or de-prioritize the cell(s) served by IAB-node 24A, as disclosed in the previous embodiment. Whereas in a case in which IAB-node 24A successfully performs an inter-CU re-establishment, child node 30 can consider the cell(s) served by IAB-node 24A as candidate cell(s), i.e. child node 30 does not need to avoid or de-prioritize the cell(s). For this reason, the re-establishment indication 270 may be a separate message in one example implementation. In another example implementation, the re-establishment indication 270 may be included as an additional information element of another message, such as the aforementioned Backhaul RLF Indication, e.g., condition notification 42.

It should be understood that when child node 30 transmits the RRCReestablishmentRequest message such as shown in FIG. 51A, the PCI included in the message was the one of the old serving cell that child node 30 camped on before initiating the RRC re-establishment procedure. In the scenario depicted in FIG. 45, the old serving cell is one of the cells served by IAB-node 24A, which is currently recognized as bounded to donor IAB node 22-2 as a result of the F1 setup procedure shown in FIG. 46B. Thus, when receiving the RRCReestablishmentRequest from child node 30, based on the received PCI, donor IAB node 22-2 may look for the UE context of child node 30 in a local storage as shown in by act 51-8 in FIG. 51A. The context transfer for child/grandchild nodes of IAB-node 24A shown in FIG. 46B is a necessary step for the UE contexts to be present in the target donor node.

Figure 52:
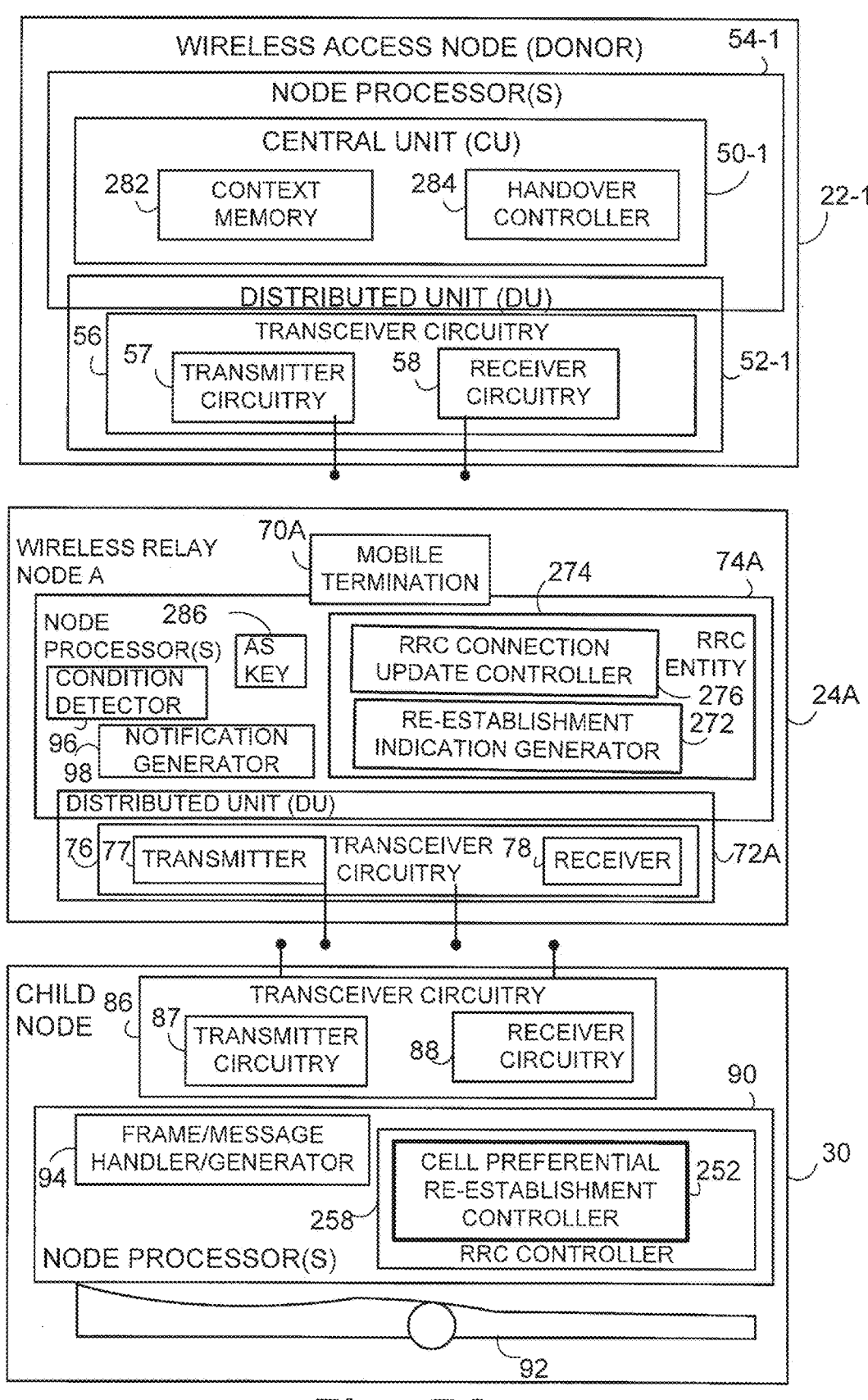
FIG. 52 is a schematic views showing details of an example implementation telecommunications system of the generic system of FIG. 45 wherein an IAB-node 24A performs an inter-CU, e.g., an inter-donor, handover.

As mentioned above, the operation and mode disclosed above in the present embodiment, e.g., in the generic system and scenario of FIG. 45, may be also applicable to a case where IAB-node 24A performs an inter-CU, e.g., inter-donor, handover, e.g. RRC reconfiguration with sync procedure. FIG. 52 shows in more detail an example donor IAB node 22, IAB-node 24A, and child node 30 in which IAB-node 24A performs such an inter-CU, e.g., inter-donor, handover. Unless otherwise noted, the structure and operation of the system of FIG. 52 is similar to that of FIG. 49, and components and units in FIG. 52 which have like reference numbers as the components and units of FIG. 49 have same or similar structure or operation as in FIG. 49.

FIG. 52 additionally shows that donor IAB node 22-1 comprises handover controller 284, which may be realized by or comprise the central unit (CU) 50-1 of donor IAB node 22-2, and thus the donor node processor(s) 54-1. Further, the IAB-node 24A includes AS key generator 286, which may be realized or comprise IAB node processor(s) 74A.

Figure 46C:
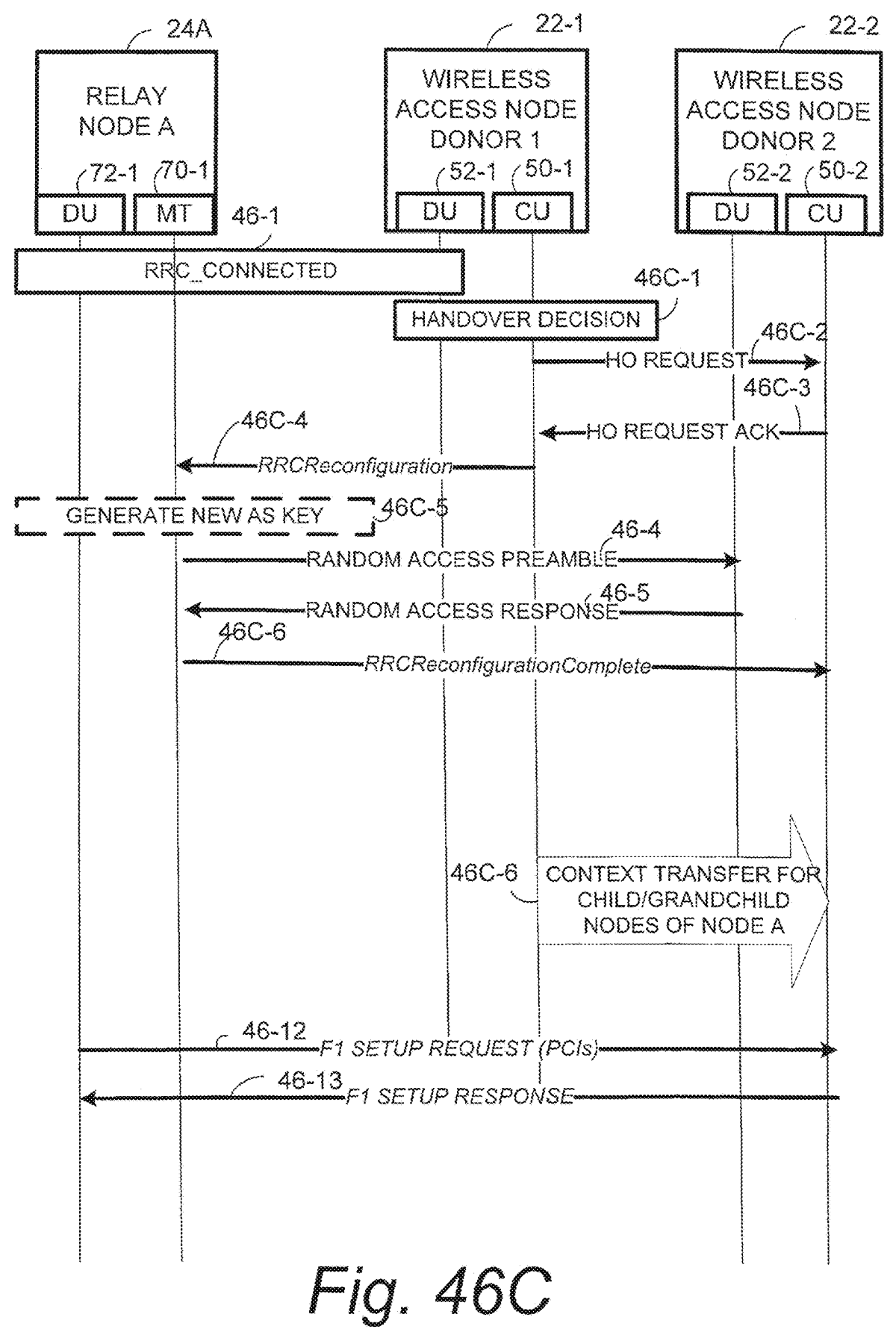

FIG. 46C is an example message flow of the inter-CU handover that IAB-node 24A of the system of FIG. 52 performs as directed by donor IAB node 22-1. Acts of FIG. 46C which are similar to those of FIG. 46A have the same act numbers, but differing acts have the act prefix 46C. For example, as reflected by act 46-1, before the handover both IAB-node 24A and donor IAB node 22-1 are in RRC Connected state for the connection involving child node 30. As act 46C-1, donor IAB node 22-1 may make a decision to handover IAB-node 24A to a cell served by donor IAB node 22-2. As act 46C-2, donor IAB node 22-1 may then send a HANDOVER REQUEST message to donor IAB node 22-2 using XnAP, where the HANDOVER REQUEST may comprise the context of IAB-node 24A. As act 46-3 the donor IAB node 22-2 acknowledges the handover request. Following reception of HANDOVER REQUEST ACKNOWLEDGE of act 46C-2, as act 46C-4 donor IAB node 22-1 may send an RRCReconfiguration message to IAB-node 24A, which may comprise NCC for generating a new AS security key(s) to be used with donor IAB node 22-2. As act 46C-5, the AS key generator 286 of IAB-node 24A generates the AS security key(s) for use with donor IAB node 22-2. As act 46-4 and act 46-5, IAB-node 24A may proceed to performing the Random Access procedure, followed by sending RRCReconfigurationComplete, e.g., as act 46C-5. Similar to FIG. 46B, as act 46C-6 donor IAB node 22-1 may transfer to donor IAB node 22-2 UE contexts of some or all of the child/grandchild nodes of IAB-node 24A. Likewise, IAB-node 24A may initiate the F1 setup procedure with donor IAB node 22-2, as reflected by act 46-12 and 46-13.

Figure 51B:
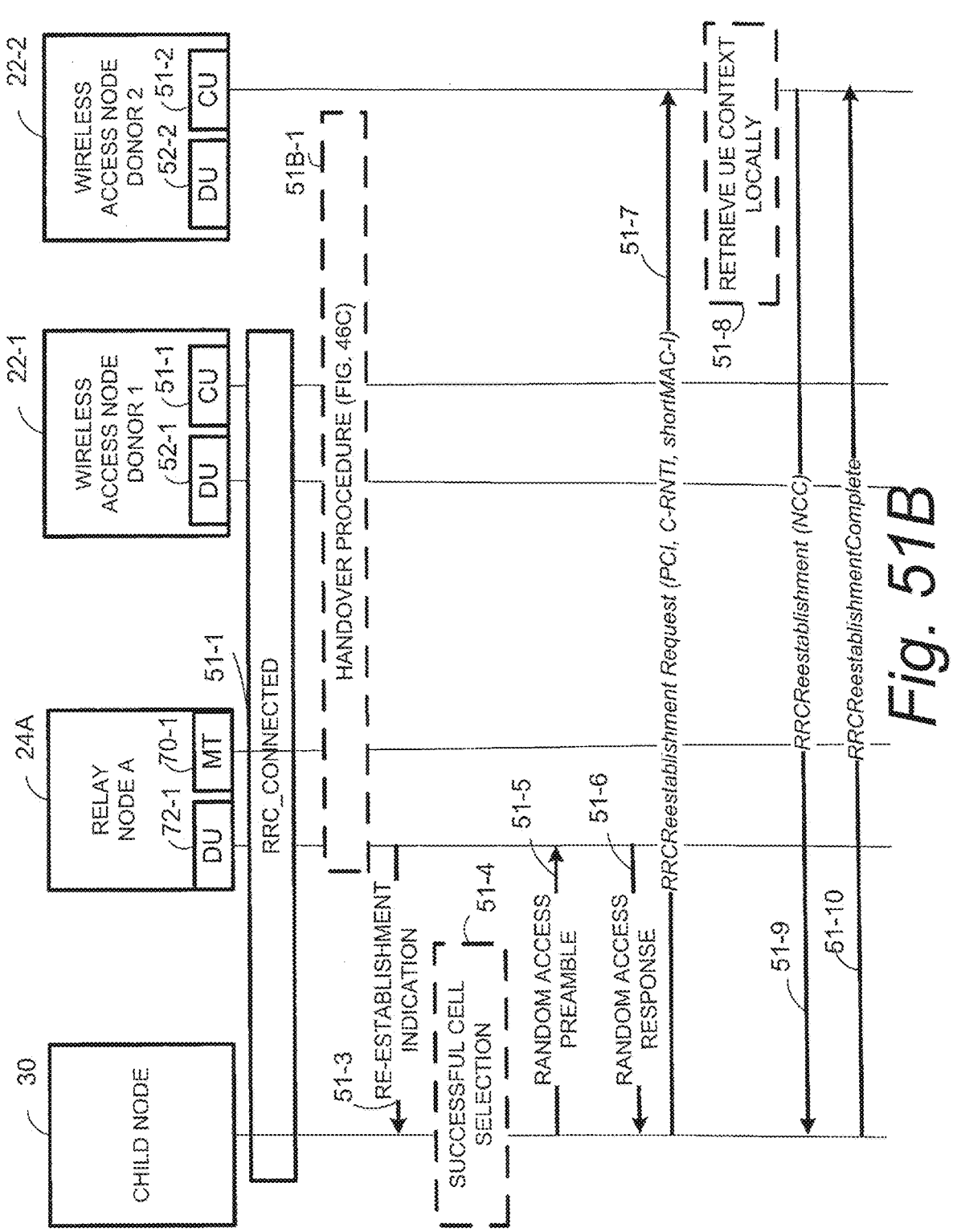
FIG. 51B is a diagrammatic view depicting message flow of example RRC re-establishment procedure for a child node and an example inter-CU handover, respectively.

FIG. 51B shows an example message flow of yet another RRC re-establishment procedure for child node 30, which covers a case of the system of FIG. 51 in which IAB-node 24A performs an inter-CU handover as shown in FIG. 46C. The inter-CU handover is depicted as act 51-2 in FIG. 51B. As understood from FIG. 51B, the procedure after IAB-node 24A perform the inter-CU handover is identical to the one shown in FIG. 51A. That is, the re-establishment indication 270, shown as act 51-3, can be also used for the case where IAB-node 24A performs an inter-CU handover.

Figure 53:
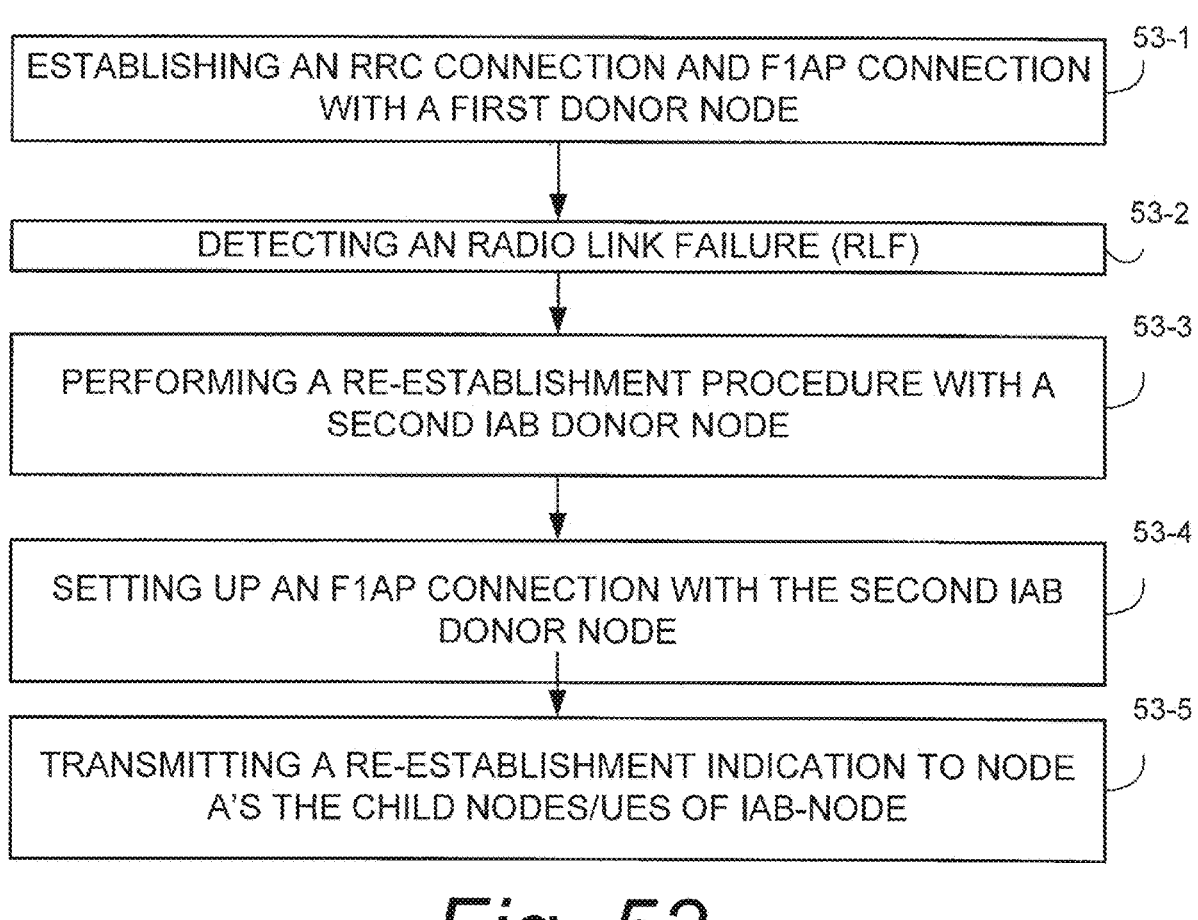
FIG. 53 is a flowchart showing example, representative, acts or steps performed by an IAB node of the system of FIG. 52.

FIG. 53 shows example, representative, acts or steps performed by an IAB node of the system of FIG. 52. Act 53-1 comprises establishing RRC and F1AP connection with a first donor IAB node, e.g., with donor IAB node 22-1. Act 53-2 comprises detecting an radio link failure (RLF) upstream, which may be detected at the direct upstream radio path of IAB-node 24A, or informed by the parent IAB-node (if any) of IAB-node 24A using a Backhaul RLF Indication. Act 53-3 comprises performing a re-establishment procedure with a second IAB donor node, e.g., donor IAB node 22-2, as shown in FIG. 46B. Act 53-4 comprising setting up an F1AP connection with the second IAB donor node, e.g., donor IAB node 22-2, also as shown in FIG. 46B. Act 53-5 comprises transmitting a re-establishment indication to the child nodes/UEs of IAB-node 24A.

Figure 54:
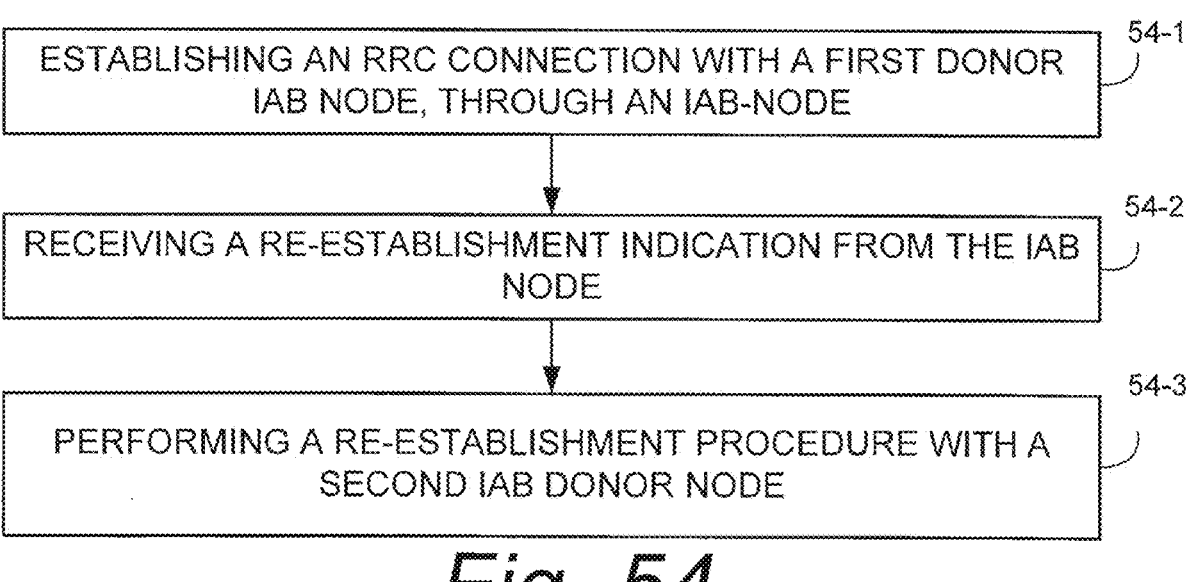
FIG. 54 is a flowchart showing example, representative, acts or steps performed by a child node of the system of FIG. 52.
Figure 57:
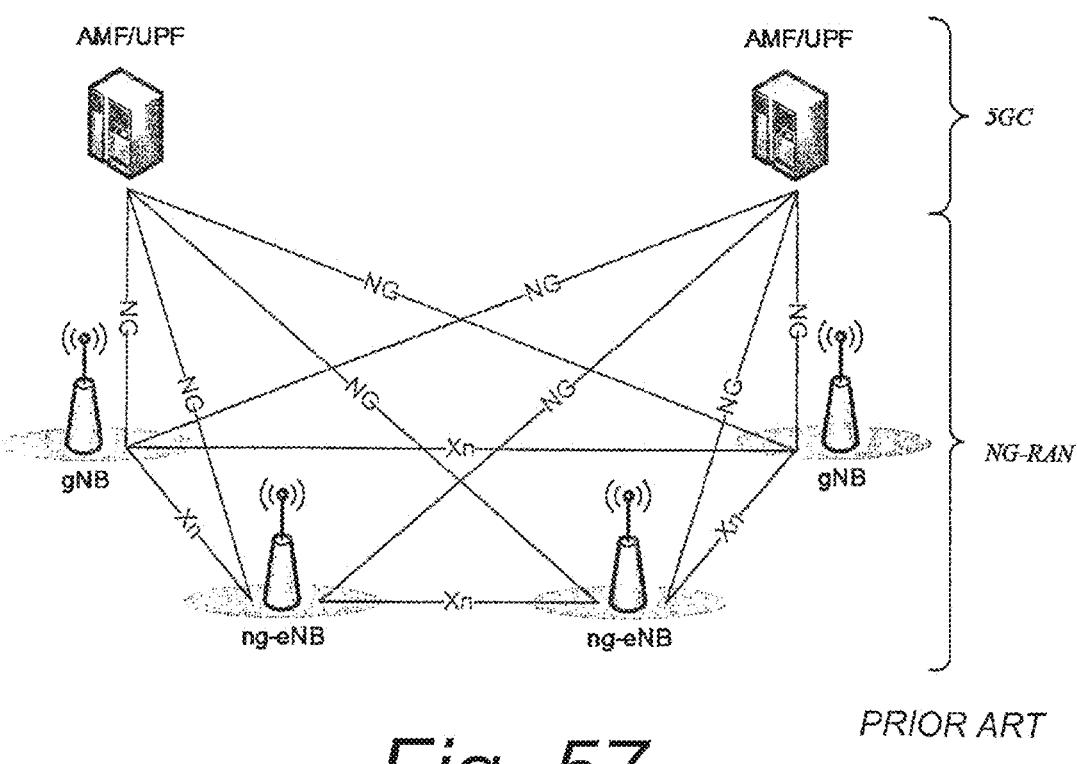
FIG. 57 is a diagrammatic view of overall architecture for a 5G New Radio system.

FIG. 54 shows example, representative, acts or steps performed by a child node of the system of FIG. 52. Act 54-1 comprises establishing an RRC connection with a first donor IAB node, e.g., donor IAB node 22-1, through IAB-node 24A. Act 54-2 comprises receiving a re-establishment indication 270 from the IAB node, e.g., IAB-node 24A. Act 54-3 comprises performing a re-establishment procedure with a second IAB donor node, e.g., donor IAB node 22-2, whereby child node 30, may select a cell served by the IAB node, e.g., IAB-node 24A.

FIG. 55 shows example, representative, acts or steps performed by a donor IAB node 22 of the systems of FIG. 49 and FIG. 52. The donor IAB node such as donor IAB node 22-1 communicates over at least one radio interface to serve an IAB node and at least one inter-node interface to communicate with another access node, such as donor IAB node 22-2. Act 55-1 comprises performing a first context transfer to send an RRC context of the IAB node; e.g., to donor IAB node 22-2. Act 55-2 comprises initiating, based on the first context transfer, a second context transfer to send RRC contexts of wireless terminals that the IAB donor is serving through the IAB node. Act 55-3 comprises transmitting, to the access node, e.g., to donor IAB node 22-2, the RRC context of the IAB node and the RRC contexts of wireless terminals.

It should be understood that the various foregoing example embodiments and modes may be utilized in conjunction with one or more example embodiments and modes described herein.

Certain units and functionalities of the systems 20 may be implemented by electronic machinery. For example, electronic machinery may refer to the processor circuitry described herein, such as IAB donor node processor(s) 54, relay node processor(s) 74, and node processor(s) 90. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 56 shows an example of electronic machinery, e.g., processor circuitry, as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, node processor(s) 54, relay node processor(s) 74, and node processor(s) 90.

An memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and Integrated Access and Backhaul (IAB) nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a micro-processor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a radio access network, e.g., methods and procedures to deal with problematic conditions on a backhaul link, such as radio link failure (RLF), for example, and avoiding routing loop problems when performing a cell selection procedure, e.g., after a radio link failure (RLF).

The technology disclosed herein encompasses one or more of the following non-limiting, non-exclusive example embodiments and modes:

Example Embodiment 1: Example Embodiment 1: An integrated access and backhaul (IAB) node which communicates over at least two radio interfaces including a first interface and a second interface, the first interface being configured to establish a radio resource control (RRC) connection with a donor node, the second interface being configured to serve one or more cells to communicate with one or more child nodes, the IAB node comprising: processor circuitry configured to detect a radio link failure (RLF) on the first interface; transmitter circuitry configured to transmit, using the second interface, to the one or more child nodes: node serving cell information configured to identify the one or more cells, and; a backhaul RLF indication upon a failure of recovery from the RLF.

Example Embodiment 2: The IAB node of Example Embodiment 1, wherein the node serving cell information comprises identifications of the one or more cells.

Example Embodiment 3: The IAB node of Example Embodiment 2, wherein each of the identifications of the one or more cells is a physical cell ID.

Example Embodiment 4: The IAB node of Example Embodiment 2, wherein each of the identifications of the one or more cells is a new radio cell identity (NCI).

Example Embodiment 5: The IAB node of Example Embodiment 2, wherein the identifications of the one or more cells are included in the backhaul RLF indication.

Example Embodiment 6: The IAB node of Example Embodiment 1, wherein the node serving cell information comprises an identification of the IAB node.

Example Embodiment 7: The IAB node of Example Embodiment 6, wherein the identification of the IAB node is broadcasted by each of the one or more cells.

Example Embodiment 8: The IAB node of Example Embodiment 1, wherein the node serving cell information is transmitted by a physical layer signaling.

Example Embodiment 9: The IAB node of Example Embodiment 1, wherein the node serving cell information is transmitted by a Medium Access Control (MAC) signaling.

Example Embodiment 10: The IAB node of Example Embodiment 1, wherein the node serving cell information is transmitted by a Backhaul Adaptation Protocol (BAP) signaling.

Example Embodiment 11: The IAB node of Example Embodiment 1, wherein the node serving cell information is broadcasted in system information.

Example Embodiment 12: A child node that communicates with an integrated access and backhaul (IAB) node, the child node comprising: receiver circuitry configured to receive from the IAB node: node serving cell information configured to identify one or more cells served by the IAB node, and; a backhaul radio link failure (RLF) indication indicating that the IAB node fails to recover from an RLF; processor circuitry configured to perform, upon receiving the backhaul RLF indication, a re-establishment procedure based on the node serving cell information.

Example Embodiment 13: The child node of Example Embodiment 12, wherein a cell identified by the node serving cell information is not considered as a candidate cell during the re-establishment procedure.

Example Embodiment 14: The child node of Example Embodiment 12, wherein a cell identified by the node serving cell information is considered to be low ranked during the re-establishment procedure.

Example Embodiment 15: The child node of Example Embodiment 12, wherein the node serving cell information comprises identifications of the one or more cells.

Example Embodiment 16: The child node of Example Embodiment 15, wherein each of the identifications of the one or more cells is a physical cell ID.

Example Embodiment 17: The child node of Example Embodiment 15, wherein each of the identifications of the one or more cells is a new radio cell identity (NCI).

Example Embodiment 18: The child node of Example Embodiment 15, wherein the identifications of the one or more cells are included in the backhaul RLF indication.

Example Embodiment 19: The child node of Example Embodiment 12, wherein the node serving cell information comprises an identification of the IAB node.

Example Embodiment 20: The child node of Example Embodiment 19, wherein the identification of the IAB node is broadcasted by each of the one or more cells.

Example Embodiment 21: The child node of Example Embodiment 12, wherein the node serving cell information is transmitted by a physical layer signaling.

Example Embodiment 22: The child node of Example Embodiment 12, wherein the node serving cell information is transmitted by a Medium Access Control (MAC) signaling.

Example Embodiment 23: The child node of Example Embodiment 12, wherein the node serving cell information is transmitted by a Backhaul Adaptation Protocol (BAP) signaling.

Example Embodiment 24: The child node of Example Embodiment 12, wherein the node serving cell information is broadcasted in system information.

Example Embodiment 25: A method for an integrated access and backhaul (IAB) node which communicates over at least two radio interfaces including a first interface and a second interface, the first interface being configured to establish a radio resource control (RRC) connection with a donor node, the second interface being configured to serve one or more cells to communicate with one or more child nodes, the method comprising: detecting a radio link failure (RLF) on the first interface; transmitting, using the second interface, to the one or more child nodes: node serving cell information configured to identify the one or more cells, and; a backhaul RLF indication upon a failure of recovery from the RLF.

Example Embodiment 26: The method of Example Embodiment 25, wherein the node serving cell information comprises identifications of the one or more cells.

Example Embodiment 27: The method of Example Embodiment 26, wherein each of the identifications of the one or more cells is a physical cell ID.

Example Embodiment 28: The method of Example Embodiment 26, wherein each of the identifications of the one or more cells is a new radio cell identity (NCI).

Example Embodiment 29: The method of Example Embodiment 26, wherein the identifications of the one or more cells are included in the backhaul RLF indication.

Example Embodiment 30: The method of Example Embodiment 25, wherein the node serving cell information comprises an identification of the IAB node.

Example Embodiment 31: The method of Example Embodiment 30, wherein the identification of the IAB node is broadcasted by each of the one or more cells.

Example Embodiment 32: The method of Example Embodiment 25, wherein the node serving cell information is transmitted by a physical layer signaling.

Example Embodiment 33: The method of Example Embodiment 25, wherein the node serving cell information is transmitted by a Medium Access Control (MAC) signaling.

Example Embodiment 34: The method of Example Embodiment 25, wherein the node serving cell information is transmitted by a Backhaul Adaptation Protocol (BAP) signaling.

Example Embodiment 35: The method of Example Embodiment 25, wherein the node serving cell information is broadcasted in system information.

Example Embodiment 36: A method for a child node that communicates with an integrated access and backhaul (IAB) node, the method comprising: receiving from the IAB node: node serving cell information configured to identify one or more cells served by the IAB node, and; an backhaul radio link failure (RLF) indication indicating that the IAB node fails to recover from an RLF; upon receiving the backhaul RLF indication, performing a re-establishment procedure based on the node serving cell information.

Example Embodiment 37: The method of Example Embodiment 36, wherein a cell identified by the node serving cell information is not considered as a candidate cell in the re-establishment procedure.

Example Embodiment 38: The method of Example Embodiment 36, wherein a cell identified by the node serving cell information is considered to be low ranked during the re-establishment procedure.

Example Embodiment 39: The method of Example Embodiment 36, wherein the node serving cell information comprises identifications of the one or more cells.

Example Embodiment 40: The method of Example Embodiment 39, wherein each of the identifications of the one or more cells is a physical cell ID.

Example Embodiment 41: The method of Example Embodiment 39, wherein each of the identifications of the one or more cells is a new radio cell identity (NCI).

Example Embodiment 42: The method of Example Embodiment 39, wherein the identifications of the one or more cells are included in the backhaul RLF indication.

Example Embodiment 43: The method of Example Embodiment 36, wherein the node serving cell information comprises an identification of the IAB node.

Example Embodiment 44: The method of Example Embodiment 43, wherein the identification of the IAB node is broadcasted by each of the one or more cells.

Example Embodiment 45: The method of Example Embodiment 39, wherein the node serving cell information is transmitted by a physical layer signaling.

Example Embodiment 46: The method of Example Embodiment 39, wherein the node serving cell information is transmitted by a Medium Access Control (MAC) signaling.

Example Embodiment 47: The method of Example Embodiment 39, wherein the node serving cell information is transmitted by a Backhaul Adaptation Protocol (BAP) signaling.

Example Embodiment 48: The method of Example Embodiment 39, wherein the node serving cell information is broadcasted in system information.

Example Embodiment 49: An integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more child nodes, the IAB node comprising: processor circuitry configured to: establish an RRC connection with a first donor node, and; perform an update of the RRC connection to be used for a second donor node; transmitter circuitry configured to transmit, using the second interface, a re-establishment indication, upon performing the update of the RRC connection, wherein: the re-establishment indication is used to request that each of the one or more child nodes initiate an RRC re-establishment procedure, and; during the RRC re-establishment procedure, the one or more cells are considered as candidate cells.

Example Embodiment 50: The IAB node of Example Embodiment 49, wherein the update of the RRC connection includes an RRC re-establishment procedure to the second donor node.

Example Embodiment 51: The IAB node of Example Embodiment 49, wherein the update of the RRC connection includes an RRC reconfiguration with sync procedure to the second donor node.

Example Embodiment 52: The IAB node of Example Embodiment 49, wherein the second donor node is different from the first donor node.

Example Embodiment 53: The IAB node of Example Embodiment 49, wherein the re-establishment indication is different from a backhaul radio link failure (RLF) indication, the backhaul RLF indication being used to inform the one or more child nodes of a failure of a recovery from an RLF.

Example Embodiment 54: The IAB node of Example Embodiment 49, wherein the re-establishment indication is transmitted by a physical layer signaling.

Example Embodiment 55: The IAB node of Example Embodiment 49, wherein the re-establishment indication is transmitted by a Medium Access Control (MAC) signaling.

Example Embodiment 56: The IAB node of Example Embodiment 49, wherein the re-establishment indication is transmitted by a Backhaul Adaptation Protocol (BAP) signaling.

Example Embodiment 57: The IAB node of Example Embodiment 49, wherein the re-establishment indication is broadcasted in system information.

Example Embodiment 58: A child node that communicates with an integrated access and backhaul (IAB) node, the child node comprising: receiver circuitry configured to receive, from the IAB node, a re-establishment indication: processor circuitry configured to initiate an RRC re-establishment procedure, based on the re-establishment indication; wherein during the re-establishment procedure, one or more cells that served by the IAB node are considered as candidate cells.

Example Embodiment 59: The child node of Example Embodiment 58, wherein the re-establishment indication is different from a backhaul radio link failure (RLF) indication, the backhaul RLF indication being used to notify that the IAB node fails to recover from an RLF.

Example Embodiment 60: The child node of Example Embodiment 58, wherein the re-establishment indication is transmitted by a physical layer signaling.

Example Embodiment 61: The child node of Example Embodiment 58, wherein the re-establishment indication is transmitted by a Medium Access Control (MAC) signaling.

Example Embodiment 62: The child node of Example Embodiment 58, wherein the re-establishment indication is transmitted by a Backhaul Adaptation Protocol (BAP) signaling.

Example Embodiment 63: The child node of Example Embodiment 58, wherein the re-establishment indication is broadcasted in system information.

Example Embodiment 64: An integrated access and backhaul (IAB) donor equipped with at least one radio interface to serve an IAB node, and at least one inter-node interface to communicate with an access node, the IAB donor comprising: processor circuitry configured to: perform a first context transfer to send an RRC context of the IAB node; initiate, based on the first context transfer, a second context transfer to send RRC contexts of child nodes that the IAB donor is serving through the IAB node; transmitter circuitry configured to transmit, to the access node, the RRC context of the IAB node and the RRC contexts of child nodes.

Example Embodiment 65: The IAB donor of Example Embodiment 64, wherein the first context transfer is performed during a context retrieval procedure in which the access node requests a retrieval of the RRC context of the IAB node.

Example Embodiment 66: The IAB donor of Example Embodiment 64, wherein the first context transfer is performed during a handover procedure to handover the IAB node to the access node.

Example Embodiment 67: A method for an integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more child nodes, the method comprising: establishing an RRC connection with a first donor node, and; performing an update of the RRC connection to be used for a second donor node; transmitting, using the second interface, a re-establishment indication, upon performing the update of the RRC connection; wherein: the re-establishment indication is configured to require each of the one or more child nodes initiate an RRC re-establishment procedure, and; during the RRC re-establishment procedure, the one or more cells are considered as candidate cells.

Example Embodiment 68: The method of Example Embodiment 67, wherein the update of the RRC connection includes an RRC re-establishment procedure to the second donor node.

Example Embodiment 69: The method of Example Embodiment 67, wherein the update of the RRC connection includes an RRC reconfiguration with sync procedure to the second donor node.

Example Embodiment 70: The method of Example Embodiment 67, wherein the second donor node is different from the first donor node.

Example Embodiment 71: The method of Example Embodiment 67, wherein the re-establishment indication is different from a backhaul radio link failure (RLF) indication, the backhaul RLF indication being used to inform the one or more child nodes of a failure of a recovery from an RLF.

Example Embodiment 72: The method of Example Embodiment 67, wherein the re-establishment indication is transmitted by a physical layer signaling.

Example Embodiment 73: The method of Example Embodiment 67, wherein the re-establishment indication is transmitted by a Medium Access Control (MAC) signaling.

Example Embodiment 74: The method of Example Embodiment 67, wherein the re-establishment indication is transmitted by a Backhaul Adaptation Protocol (BAP) signaling.

Example Embodiment 75: The method of Example Embodiment 67, wherein the re-establishment indication is broadcasted in system information.

Example Embodiment 76: A method for a child node that communicates with an integrated access and backhaul (IAB) node, the method comprising: receiving, from the IAB node, a re-establishment indication: initiating an RRC re-establishment procedure, based on the re-establishment indication, wherein during the re-establishment procedure, one or more cells that served by the IAB node are considered as candidate cells.

Example Embodiment 77: The method of Example Embodiment 76, wherein the re-establishment indication is different from a backhaul radio link failure (RLF) indication, the backhaul RLF indication being used to notify that the IAB node fails to recover from an RLF.

Example Embodiment 78: The method of Example Embodiment 76, wherein the re-establishment indication is transmitted by a physical layer signaling.

Example Embodiment 79: The method of Example Embodiment 76, wherein the re-establishment indication is transmitted by a Medium Access Control (MAC) signaling.

Example Embodiment 80: The method of Example Embodiment 76, wherein the re-establishment indication is transmitted by a Backhaul Adaptation Protocol (BAP) signaling.

Example Embodiment 81: The method of Example Embodiment 76, wherein the re-establishment indication is broadcasted in system information.

Example Embodiment 82: A method for an integrated access and backhaul (IAB) donor which communicates over at least one radio interface to serve an IAB node and at least one inter-node interface to communicate with an access node, the method comprising: performing a first context transfer to send an RRC context of the IAB node; initiating, based on the first context transfer, a second context transfer to send RRC contexts of child nodes that the IAB donor is serving through the IAB node; transmitting, to the access node, the RRC context of the IAB node and the RRC contexts of child nodes.

Example Embodiment 83: The method of Example Embodiment 82, wherein the first context transfer is performed during a context retrieval procedure in which the access node requests a retrieval of the RRC context of the IAB node.

Example Embodiment 84: The method of Example Embodiment 82, wherein the first context transfer is performed during a handover procedure to handover the IAB node to the access node.

Example Embodiment 85: An integrated access and backhaul (IAB) node which communicates over at least two radio interfaces including a first interface and a second interface, the first interface being configured to establish a radio resource control (RRC) connection with a donor node, the second interface being configured to serve one or more cells to communicate with one or more child nodes, the IAB node comprising: processor circuitry configured to detect a radio link failure (RLF) on the first interface; transmitter circuitry configured to transmit, using the second interface, to the one or more child nodes: node serving cell information comprising identifications of the one or more cells served by the IAB node, and; a backhaul RLF indication upon a failure of recovery from the RLF, wherein; the backhaul RLF indication is used by the one or more child nodes to trigger a re-establishment procedure, the re-establishment procedure being performed based on the node serving cell information.

Example Embodiment 86: The IAB node of Example Embodiment 85, wherein each of the identifications of the one or more cells is a physical cell ID.

Example Embodiment 87: The IAB node of Example Embodiment 85, wherein the node serving cell information is transmitted by a Backhaul Adaptation Protocol (BAP) signaling.

Example Embodiment 88: The IAB node of Example Embodiment 85, wherein the node serving cell information is broadcasted in system information.

Example Embodiment 89: A child node that communicates with an integrated access and backhaul (IAB) node, the child node comprising: receiver circuitry configured to receive from the IAB node: node serving cell information comprising identifications of one or more cells served by the IAB node, and; a backhaul radio link failure (RLF) indication indicating that the IAB node fails to recover from an RLF; processor circuitry configured to perform, upon receiving the backhaul RLF indication, a re-establishment procedure based on the node serving cell information.

Example Embodiment 90: The child node of Example Embodiment 89, wherein a cell identified by the node serving cell information is not considered as a candidate cell during the re-establishment procedure.

Example Embodiment 91: The child node of Example Embodiment 89, wherein a cell identified by the node serving cell information is de-prioritized during the re-establishment procedure.

Example Embodiment 92: The child node of Example Embodiment 89, wherein each of the identifications of the one or more cells is a physical cell ID.

Example Embodiment 93: The child node of Example Embodiment 89, wherein the node serving cell information is transmitted by a Backhaul Adaptation Protocol (BAP) signaling.

Example Embodiment 94: The child node of Example Embodiment 89, wherein the node serving cell information is broadcasted in system information.

Example Embodiment 95: A method for an integrated access and backhaul (IAB) node which communicates over at least two radio interfaces including a first interface and a second interface, the first interface being configured to establish a radio resource control (RRC) connection with a donor node, the second interface being configured to serve one or more cells to communicate with one or more child nodes, the method comprising: detecting a radio link failure (RLF) on the first interface; transmitting, using the second interface, to the one or more child nodes: node serving cell information comprising identifications of the one or more cells served by the IAB node, and; a backhaul RLF indication upon a failure of recovery from the RLF, wherein; the backhaul RLF indication is used by the one or more child nodes to trigger a re-establishment procedure, the re-establishment procedure being performed based on the node serving cell information.

Example Embodiment 96: The method of Example Embodiment 95, wherein each of the identifications of the one or more cells is a physical cell ID.

Example Embodiment 97: The method of Example Embodiment 95, wherein the node serving cell information is transmitted by a Backhaul Adaptation Protocol (BAP) signaling.

Example Embodiment 98: The method of Example Embodiment 95, wherein the node serving cell information is broadcasted in system information.

Example Embodiment 99: A method for a child node that communicates with an integrated access and backhaul (IAB) node, the method comprising: receiving from the IAB node: node serving cell information comprising identifications of one or more cells served by the IAB node, and; an backhaul radio link failure (RLF) indication indicating that the IAB node fails to recover from an RLF; upon receiving the backhaul RLF indication, performing a re-establishment procedure based on the node serving cell information.

Example Embodiment 100: The method of Example Embodiment 99, wherein a cell identified by the node serving cell information is not considered as a candidate cell in the re-establishment procedure.

Example Embodiment 101: The method of Example Embodiment 99, wherein a cell identified by the node serving cell information is de-prioritized during the re-establishment procedure.

Example Embodiment 102: The method of Example Embodiment 99, wherein each of the identifications of the one or more cells is a physical cell ID.

Example Embodiment 103: The method of Example Embodiment 99, wherein the node serving cell information is transmitted by a Backhaul Adaptation Protocol (BAP) signaling.

Example Embodiment 104: The method of Example Embodiment 99, wherein the node serving cell information is broadcasted in system information.

One or more of the following documents may be pertinent to the technology disclosed herein (all of which are incorporated herein by reference in their entirety):

| R2-1914383 | On Remaining Open Issues of IAB BH RLF | CATT |
|---|---|---|
| R2-1914737 | Further discussion on Backhaul RLF handling | Intel Corporation |
| R2-1914918 | Remaining issues on BH RLF notification | vivo |
| R2-1914919 | [Draft] LS on BH RLF notification verification | vivo |
| R2-1914920 | Discussion on IAB BH RLF report mechanism | vivo |
| R2-1914975 | IAB backhaul RLF handling | NEC |
| R2-1915115 | Discussion on BAP control PDU | ZTE, Sanechips |
| R2-1915119 | Discussion on IAB BH RLF handling | ZTE, Sanechips |
| R2-1915128 | Cell selection for IAB RLF recovery | Lenovo, Motorola Mobility |
| R2-1915129 | RLF notification to downstream IAB node | Lenovo, Motorola Mobility |
| R2-1915461 | Backhaul RLF Recovery | Huawei, HiSilicon |
| R2-1915477 | Further details on Backhaul link RLF Notification Types to Downstream Node(s) | Ericsson, Song |
| R2-1915598 | Possible issues on Backhaul RLF handling | Kyocera |
| R2-1915700 | BH link failure handling | Nokia, Nokia Shanghai Bell |
| R2-1915766 | Issue of loop topology after RLF | SHARP Corporation |
| R2-1915783 | Further details on Backhaul link RLF Notification Types to Downstream Node(s) | Ericsson |

-continued

| R2-1916057 | Remaining issues on IAB RLF | Samsung R&D Institute UK |
| R2-1916061 | Cell Selection for Backhaul RLF Recovery | Futurewei Technologies |
| R2-1916168 | BH RLF Notification Terminaton Layer | LG Electronics France |
| R2-1916169 | Resolving open issues on BH RLF | LG Electronics France |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

CROSS REFERENCE

This Nonprovisional application claims priority under 35 U.S.C. § 119 on provisional Application No. 62,975,687 on Feb. 12 2020, the entire contents of which are hereby incorporated by reference.

What is claimed is:

1. An integrated access and backhaul (IAB) node which communicates over at least two radio interfaces including a first interface and a second interface, the first interface being configured to establish a radio resource control (RRC) connection with at least one donor node, the second interface being configured to serve one or more cells to communicate with one or more child nodes, the IAB node comprising:

processor circuitry configured to:

establish an RRC connection with a first donor node, and perform an update of the RRC connection to be used for a second donor node; and transmitter circuitry configured to transmit, using the second interface, a re-establishment indication upon performing the update of the RRC connection, wherein:

the re-establishment indication is used to request that each of the one or more child nodes initiates an RRC re-establishment procedure, and the RRC re-establishment procedure is performed, by each of the one or more child nodes based on the re-establishment indication, without avoiding or de-prioritizing the one or more cells.

2. The IAB node of claim 1, wherein performing the update of the RRC connection includes performing an RRC re-establishment procedure to connect to the second donor node.

3. The IAB node of claim 1, wherein the update of the RRC connection includes an RRC reconfiguration and performing the update of the RRC connection comprises performing a sync procedure to sync to the second donor node.

4. The IAB node of claim 1, wherein the second donor node is different from the first donor node.

5. The IAB node of claim 1, wherein the re-establishment indication is different from a backhaul radio link failure (RLF) indication, the backhaul RLF indication being used to inform the one or more child nodes of a failure of a recovery from an RLF.

6. A child node that communicates with an integrated access and backhaul (IAB) node, the child node comprising:

receiver circuitry configured to receive, from the IAB node, a re-establishment indication; and processor circuitry configured to initiate an RRC re-establishment procedure based on the re-establishment indication, wherein the RRC re-establishment procedure is performed without avoiding or de-prioritizing one or more cells served by the IAB node.

7. The child node of claim 6, wherein the re-establishment indication is different from a backhaul radio link failure (RLF) indication, the backhaul RLF indication being used to notify that the IAB node fails to recover from an RLF.

\* \* \* \* \*